(12) United States Patent
Kajita et al.

(10) Patent No.: US 9,065,121 B2
(45) Date of Patent: Jun. 23, 2015

(54) SEPARATOR AND NONAQUEOUS ELECTROLYTE BATTERY

(75) Inventors: Atsushi Kajita, Fukushima (JP);
Yukako Fujimoto, Fukushima (JP);
Kazuhito Hatta, Fukushima (JP);
Manabu Aoki, Fukushima (JP);
Masatake Hayashi, Fukushima (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/595,709

(22) Filed: Aug. 27, 2012

(65) Prior Publication Data

US 2013/0059192 A1 Mar. 7, 2013

(30) Foreign Application Priority Data

Sep. 5, 2011 (JP) .................... 2011-193396
Nov. 30, 2011 (JP) .................... 2011-261623
Apr. 19, 2012 (JP) .................... 2012-095403

(51) Int. Cl.
*H01M 2/16* (2006.01)
*H01M 10/0525* (2010.01)

(52) U.S. Cl.
CPC ............ *H01M 2/166* (2013.01); *H01M 2/1653* (2013.01); *H01M 2/1686* (2013.01); *H01M 10/0525* (2013.01); *H01M 2220/20* (2013.10); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 3,159,507 A | * | 12/1964 | Abbe et al. ............ | 429/145 |
| 7,638,241 B2 | * | 12/2009 | Lee et al. .............. | 429/251 |
| 2010/0003588 A1 | * | 1/2010 | Sudou et al. .......... | 429/129 |
| 2011/0135991 A1 | * | 6/2011 | Sato ..................... | 429/145 |

FOREIGN PATENT DOCUMENTS

| | | | |
|---|---|---|---|
| JP | 2006278143 A | * | 10/2006 |
| JP | 2011-023241 | | 2/2011 |
| JP | 2011-154901 | | 8/2011 |

* cited by examiner

*Primary Examiner* — Patrick Ryan
*Assistant Examiner* — Haixia Zhang
(74) *Attorney, Agent, or Firm* — K&L Gates LLP

(57) ABSTRACT

A separator is provided. The separator includes a base layer and a surface layer, wherein the surface layer is on at least one side of the base layer, and wherein the surface layer is structured so as to collapse at time of charging to prevent damage to a negative electrode due to expansion thereof. A battery including the separator is also provided. An electric device, an electric vehicle, and an electrical storage device including the battery are further provided.

20 Claims, 15 Drawing Sheets

SEPARATOR AND NONAQUEOUS ELECTROLYTE BATTERY

CROSS REFERENCES TO RELATED APPLICATIONS

The present application claims priority to Japanese Priority Patent Application JP 2011-193396 filed in the Japan Patent Office on Sep. 5, 2011, Japanese Priority Patent Application JP 2011-261623 filed in the Japan Patent Office on Nov. 30, 2011, and Japanese Priority Patent Application JP 2012-095403 filed in the Japan Patent Office on Apr. 19, 2012, the entire content of which is hereby incorporated by reference.

BACKGROUND

The present application relates to a separator. In addition, the present application relates to a nonaqueous electrolyte battery having a separator between electrodes.

In recent years, attendant on the spreading of portable electronic information apparatuses such as cellphones, video cameras, notebook-sized personal computers, etc., it has been attempted to enhance the performance of these apparatuses and reduce them in size and weight. As power sources for these apparatuses, there have been used primary batteries which are disposable and secondary batteries which can be used repeatedly. From the viewpoint of good total balance of enhanced performance, reduced size, reduced weight, economy and the like, however, there has been an ever-increasing demand for nonaqueous electrolyte batteries, especially, lithium ion secondary batteries. In addition, further enhancement of performance and further reductions in size as to these apparatuses are being tried, and a further enhanced energy density is being demanded in regard of the nonaqueous electrolyte batteries such as lithium ion secondary batteries.

In order to achieve a drastic increase in the capacity of lithium ion secondary batteries, accordingly, an approach in which a metallic material or the like capable of being alloyed with lithium at the time of charging is used as a negative electrode active material in place of the carbonaceous negative electrode active materials used in the past has been proposed, as for example in Japanese Patent Laid-Open No. 2011-154901 and Japanese Patent Laid-Open No. 2011-023241 (hereinafter referred to as Patent Document 1 and Patent Document 2, respectively). Specifically, the use of silicon or tin or a compound thereof or the like as a metal-based negative electrode active material has been proposed. For instance, when used as a negative electrode active material in a lithium ion secondary battery, tin (Sn) is known to have a high theoretical capacity (about 994 mAh/g) which is much higher than the theoretical capacity of graphite (about 372 mAh/g). Furthermore, silicon (Si) has a much higher theoretical capacity (4199 mAh/g).

SUMMARY

However, the negative electrode active material layers formed using the negative electrode active materials proposed in Patent Documents 1 and 2 are very largely expanded at the time of charging, and the volume changes attendant on their expansion and contraction are on the level of no less than four fold. Therefore, the expansion of the negative electrode active material layer is accompanied by exertion of a tensile stress on a negative electrode current collector, which would cause plastic deformation of the negative electrode current collector, eventually leading to breakage of the current collector. Such a problem is not restricted to the negative electrode current collector but occurs also in a positive electrode current collector constituting a positive electrode which is stacked together with the negative electrode with a separator therebetween and which is in a pressed-against-each-other relationship with the negative electrode.

In addition, due to the expansion of a wound electrode body as a whole, an outer circumferential portion of the wound electrode body is pressed against the inner wall of the casing can, which may result in exertion of a shearing stress directed toward the center of winding of the wound electrode body on the positive electrode current collector and the negative electrode current collector. This may cause damages to the positive electrode current collector and the negative electrode current collector, or even breakage of the positive electrode current collector and/or the negative electrode current collector.

Thus, there is a need for a separator by which positive and negative electrodes can be restrained from being damaged or broken upon expansion of the negative electrode, and for a nonaqueous electrolyte battery in which the separator is used.

According to an embodiment of the present application, there is provided a separator for a nonaqueous electrolyte battery, including: a base material having a porous film; and a porous surface layer which is formed on a surface on one side of the base material, contains inorganic particles and a resin material, and has a rugged surface shape with an arithmetic mean surface roughness Sa of 1.0 to 4.0 μm.

According to another embodiment of the present application, there is provided a nonaqueous electrolyte battery including: an electrode body having a positive electrode and a negative electrode facing each other with a separator therebetween; and a nonaqueous electrolyte. In the nonaqueous electrolyte battery, the separator includes: a base material having a porous film; and a porous surface layer which is formed on a surface on one side of the base material, contains inorganic particles and a resin material, and having a rugged surface shape with an arithmetic mean surface roughness Sa of 1.0 to 4.0 μm.

According to a further embodiment of the present application, there is provided a nonaqueous electrolyte battery including: an electrode body having a positive electrode and a negative electrode facing each other with a separator therebetween, the separator including a porous film; and a nonaqueous electrolyte. The nonaqueous electrolyte battery further includes a porous layer which contains inorganic particles and a resin material and has a rugged surface shape with an arithmetic mean surface roughness Sa of 1.0 to 4.0 μm, the porous layer being provided between the separator and one of the positive electrode and the negative electrode facing each other with the separator therebetween.

According to yet another embodiment of the present application, there is provided a separator for a nonaqueous electrolyte battery, including: a base material having a porous film; and a porous surface layer which is formed on a surface on one side of the base material and contains inorganic particles and a resin material. In thee separator, the surface layer satisfies the following formula (1) and formula (2):

$$Qs > 0.50 \ (\text{mJ/cm}^2 \cdot \text{K}) \tag{1}$$

(wherein Qs is heat content per unit area of the surface layer), $$0.30 \times k0 < (S2/S1) \times kp < 0.70 \times kp, \text{ and } k0 < kp \tag{2}$$

(wherein k0 is thermal conductivity of the surface layer in the absence of a load due to pressure, kp is thermal conductivity of the surface layer in the presence of a load of 4000

N/cm², S1 is projected area of the surface layer, and S2 is contact area of the surface layer in the presence of a load of 4000 N/cm²).

In accordance with embodiments of the present application, at the time of expansion of a negative electrode active material layer, the surface layer of the separator is collapsed so as to absorb the expansion of the negative electrode active material layer.

By use of the separator according to an embodiment of the present application, it is possible to restrain electrodes from being damaged or broken due to expansion of a negative electrode active material layer at the time of charging.

According to an embodiment, a separator is provided. The separator includes a base layer and a surface layer, wherein the surface layer is on at least one side of the base layer, and wherein the surface layer is structured so as to collapse at time of charging to prevent damage to a negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the porous structure has a porosity that ranges from 60% to 90%.

In an embodiment, the surface layer has a three-dimensional structure.

In an embodiment, the surface layer has a surface roughness that ranges from 1 micron to 4 microns.

In an embodiment, the surface layer has a compression ratio (B/A) not less than 0.4, where A is a thickness of the surface layer under a load of 3.57 N/cm², and where B is a collapse amount of the surface layer under a load of 4000 N/cm².

In an embodiment, the surface layer includes at least one projection on at least a portion of the surface layer.

In an embodiment, the at least one projection ranges in size from 1 micron to 100 microns.

In another embodiment, a battery is provided. The battery including a separator and a negative electrode, wherein the separator includes a base layer and a surface layer, wherein the surface layer is on at least one side of the base layer, and wherein the surface layer is structured so as to collapse at time of charging to prevent damage to the negative electrode due to expansion thereof.

In an embodiment, a positive electrode is further provided, wherein at least one of the positive electrode and the negative electrode faces the separator.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

In further embodiments, an electric device, an electrical vehicle, and an electrical storage device including the battery are provided.

In yet another embodiment, a method of manufacturing a separator is provided. The method includes forming a base layer and a surface layer, wherein the surface layer is on at least one side of the base layer, and wherein the surface layer is structured so as to collapse at time of charging to prevent damage to a negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

In yet another embodiment, a method of manufacturing a battery is provided. The method includes forming a negative electrode and a separator, the separator including a base layer and a surface layer, wherein the surface layer is on at least one side of the base layer, and wherein the surface layer is structured so as to collapse at time of charging to prevent damage to the negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

Additional features and advantages are described herein, and will be apparent from the following Detailed Description and the figures.

DETAILED DESCRIPTION

Now, a best mode (hereafter, referred to as embodiments) for carrying out the present application will be described below. The description will be made in the following order.
1. First Embodiment (First example of the separator according to an embodiment of the present application
2. Second Embodiment (Second example of the separator according to an embodiment of the present application)
3. Third Embodiment (An example of cylindrical nonaqueous electrolyte battery using the separator according to an embodiment of the present application)
4. Fourth Embodiment (An example of rectangular type nonaqueous electrolyte battery using the separator according to an embodiment of the present application)
5. Fifth Embodiment (An example of laminated film type nonaqueous electrolyte battery using the separator according to an embodiment of the present application)
6. Sixth Embodiment (An example of battery pack using the nonaqueous electrolyte battery)
7. Seventh Embodiment (An example of electrical energy storage device using the nonaqueous electrolyte battery)

1. First Embodiment

A separator according to a first embodiment of the present application has a surface layer formed on a surface on at least one side of a base material, the surface layer having a rugged surface shape. Now, this separator will be described in detail below.

(1-1) Structure of Separator

Figure 1:
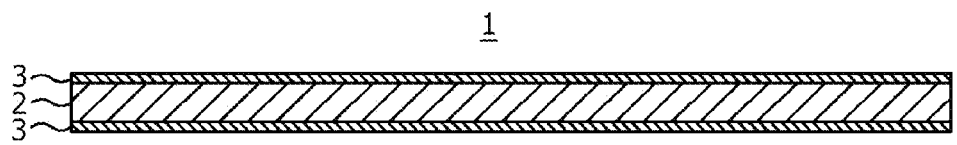
FIG. 1 is a sectional view showing the configuration of a separator according to a first embodiment of the present application.

As shown in FIG. 1, the separator 1 according to the first embodiment includes a base material 2 which has a porous film, and a surface layer 3 which is formed on a surface on at least one side of the base material 2. Incidentally, FIG. 1 shows an example of the separator 1 in which the surface layer 3 is formed on each of both principal surfaces of the base material 2. The separator 1 may have the surface layer 3 formed on the surface on either one side of the base material 2.

The separator 1 isolates a positive electrode and a negative electrode from each other in a battery, thereby preventing a short-circuit current from being generated due to contact between both the electrodes, and is impregnated with a nonaqueous electrolyte. The surface layer 3 of the separator 1 has a rugged surface shape, and projected portions thereof support the positive electrode or negative electrode facing the separator 1 to thereby maintain an appropriate distance between the base material 2 and the positive electrode or negative electrode. In addition, at the time of expansion of the negative electrode attendant on charging, the projected portions of the surface layer 3 are collapsed, thereby absorbing the expansion of the negative electrode. This makes it possible to reduce the stress exerted on the negative electrode due to the expansion of the negative electrode, and thereby to prevent the negative electrode from being damaged or broken. Besides, the positive electrode, which is stacked in relation to the negative electrode with the separator 1 therebetween and is in a pressed-against-each-other relation with the negative electrode, can also be prevented from being damaged or broken, since the expansion of the negative electrode is absorbed by the surface layer 3 of the separator 1.

The separator 1 according to an embodiment of the present application exhibits a remarkable effect when applied to a battery in which a metallic material or a metallic alloy material is used as a negative electrode active material. A negative electrode at which a metallic material or a metallic alloy material is used as the negative electrode active material shows marked expansion at the time of charging. Therefore, when the separator 1 according to an embodiment of the present application is applied to a battery in which a metallic material or a metallic alloy material is used as the negative electrode active material, the separator's preventive effect on damage/breakage of the electrodes owing to the absorption of the expansion of the negative electrode by the surface layer 3 is exhibited remarkably. In addition, the separator 1 may be applied also to batteries in which a carbon material such as graphite is used as the negative electrode active material.

Besides, the separator 1 according to an embodiment of the present application exhibits a further remarkable effect when applied to a battery including a wound electrode body in which a positive electrode and a negative electrode are stacked together, with the separator 1 therebetween, and are wound. In the wound electrode body, an expansion of the negative electrode is accompanied by exertion of a tensile stress in the winding direction of a negative electrode current collector, so that the negative electrode current collector undergoes plastic deformation more easily than a negative electrode current collector in a simply stacked electrode body. In this case, a negative electrode active material layer also undergoes cracking, exfoliation, flaking or the like. In addition, where the tensile stress is high, the negative electrode current collector may be broken. The use of the separator 1 according to an embodiment of the present application makes it possible to lessen that burden on the electrodes which arises from the wound structure of the wound electrode body, and further to attain an enhanced preventive effect on damage/breakage of the electrodes.

Now, the base material 2 and the surface layer 3 constituting the separator 1 will be described in detail below.

[Base Material]

The base material 2 is a porous film including an insulating film which has a high ion permeability and a predetermined mechanical strength. Where the separator 1 is applied to a nonaqueous electrolyte battery, a nonaqueous electrolyte solution is held in pores of the base material 2. On the one hand, the base material 2 is required to have a predetermined mechanical strength so as to serve as a principal part of the separator 1. On the other hand, the base material 2 is required to have such characteristic properties as high resistance to the nonaqueous electrolyte solution, a low reactivity, and low expansibility. Besides, when used in an electrode body having a wound structure, the base material 2 is required also to be flexible.

Preferable examples of a resin material for forming such a base material 2 as above-mentioned include polyolefin resins such as polypropylene, polyethylene, etc., acrylic resins, styrene resins, polyester resins, and nylon resins. Particularly, polyolefin resins, for example, polyethylenes such as low-density polyethylene, high-density polyethylene, linear polyethylene, etc. and low-molecular-weight wax portions thereof, or polypropylene, can be preferably used because they have appropriate melting temperatures and are easily available. In addition, a stacked structure of porous films of two or more of these resins, and a porous film formed by melting and kneading two or more of the resin materials, may also be used as the base material 2. A base material including a porous film formed from a polyolefin resin is excellent in the property for separation between the positive electrode and the negative electrode, whereby the possibility of internal short-circuiting can be lowered more assuredly.

Besides, the base material 2 may be in the form of a non-woven fabric. Examples of fibers for forming the non-woven fabric include aramid fibers, glass fibers, polyolefin fibers, polyethylene terephthalate (PET) fibers, and nylon fibers. Further, two or more kinds of such fibers may be used in mixture to form the non-woven fabric.

The thickness of the base material 2 can be set arbitrarily, insofar as the thickness is sufficient for maintaining a required strength. The base material 2 is preferably set to such a thickness that insulation between the positive electrode and the negative electrode is promised, short-circuiting and the like are thereby prevented, an ion permeability permitting cell reactions by way of the separator 1 to be carried out suitably is secured, and the volume efficiency of the active material layers contributing to the cell reactions in the battery can be made to be as high as possible. Specifically, the thickness of the base material 2 is preferably in the range of 5 to 20 nm.

In order to obtain the above-mentioned ion permeability, the porosity of the base material 2 is preferably in the range of 25 to 70%. It is to be noted here, however, that the porosity is preferably 50 to 90% in the case where a non-woven fabric is used as the base material 2. Though depending on the current value in practical use of the battery, characteristics such as porous structure of the base material 2, the thickness of the base material 2 and the like factors, a porosity below the above-mentioned range would hamper the migration of ions in the nonaqueous electrolyte solution related to charging and discharging. This results in that load characteristic is lowered and it becomes difficult to secure a sufficient capacity at the time of large-current discharge. On the other hand, a porosity above the above-mentioned range would lower the strength of the separator 1. Especially, in the separator 1 in which the surface layer 3 is provided at the surface as in the present application, it is a common practice to design the thickness of the base material 2 to be smaller by a value corresponding to the thickness of the surface layer 3, thereby ensuring that the thickness of the separator 1 as a whole is comparable to the thickness of a monolayer separator. Therefore, the strength of the separator 1 depends heavily on the strength of the base material 2, and the base material 2 is required to have a strength not lower than a predetermined level.

[Surface Layer]

The surface layer 3 is a porous layer which is formed on a surface on at least one side of the base material 2, and which has a rugged surface shape, whereby it is ensured that the expansion of a negative electrode attendant on charging is absorbed by collapse of part of the layer. The surface layer 3 is formed with a multiplicity of minute voids throughout the whole part thereof, so as to have an ion permeation function, a nonaqueous electrolyte solution holding function and the like for serving as the separator 1. When the separator 1 is applied to a nonaqueous electrolyte battery, therefore, the nonaqueous electrolyte solution is held in the pores possessed by the surface layer 3.

Figure 2:
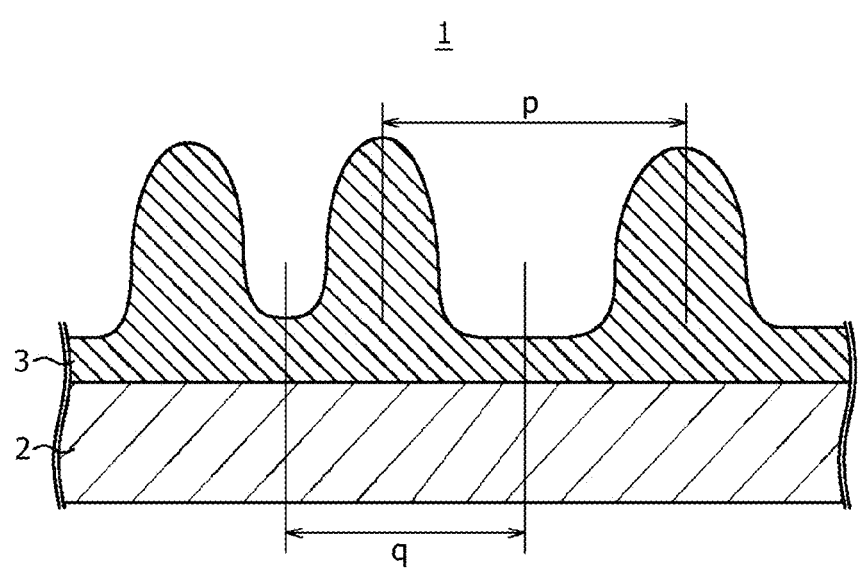
FIG. 2 is a sectional view showing in more detail the configuration of the separator according to the first embodiment of the present application.

FIG. 2 shows a sectional view of the separator 1. As shown in FIG. 2, the surface layer 3 of the separator 1 has a rugged surface shape so that tips of a plurality of projected portions thereof make contact with a positive electrode or negative electrode which is not shown in the figure.

The surface layer 3 functions as part of the separator 1 in a condition wherein the tips of the plurality of projected portions thereof make contact with at least one of a positive electrode and a negative electrode to thereby maintain an appropriate distance between the base material 2 and the at least one of the positive electrode and the negative electrode.

In order to possess such a function, the surface layer 3 in the present application is a porous layer containing a resin material and inorganic particles. The inorganic particles are dispersed in and supported by the resin material which is formed with a multiplicity of pores. With the inorganic particles thus contained in the surface layer 3, the rugged surface shape can be formed suitably.

Figure 3:
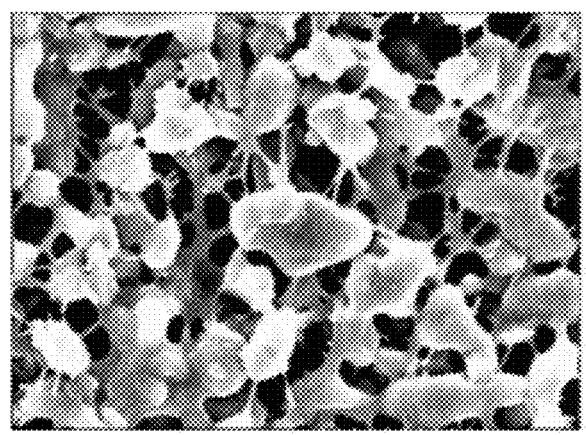
FIG. 3 is a secondary electron image obtained by a scanning electron microscope (SEM), showing the configuration of a surface layer of the separator according to the first embodiment of the present application.

The surface layer 3 may have a three-dimensional network structure as shown in FIG. 3. Incidentally, FIG. 3 is a secondary electron image obtained by a scanning electron microscope (SEM), showing the structure of the surface layer 3. The surface layer 3 having the three-dimensional network structure preferably has a three-dimensional network structure in which fibrils formed by fibrillation of the resin material constituting the surface layer 3 are continuously interconnected. The inorganic particles are supported by the resin material having this three-dimensional network structure, whereby the inorganic particles can be maintained in a disperse state without being interconnected.

The surface layer 3 in the present application as above-mentioned has the rugged surface shape, and the arithmetic mean roughness Sa of the surface is in the range of 1.0 to 4.0 µm. Here, the arithmetic mean roughness Sa of the surface is a factor obtained by extending a two-dimensional arithmetic mean roughness Ra to the three dimensions; specifically, the arithmetic mean roughness Sa is obtained by a method in which the volume of a zone surrounded by the surface shape curved surface and a mean plane is divided by the measurement area.

If the arithmetic mean surface roughness Sa is above the just-mentioned range, the strength of the projected portions of the surface layer 3 would be low as a whole, so that the projected portions of the surface layer 3 may be collapsed when the separator 1 is wound in a stacked state together with the positive electrode and the negative electrode. This makes it difficult to produce the wound electrode body while keeping an appropriate distance between the electrode and the separator. If the arithmetic mean surface roughness Sa is below the range, on the other hand, the function to absorb the expansion of the negative electrode would be low.

In the surface layer 3 having the arithmetic mean roughness Sa as above-mentioned, the pitch of projections or recesses in the rugged surface shape is preferably not more than 1.0 mm. If the pitch is more than 1.0 mm, the electrode would be bent or broken between a projected portion and another projected portion, making it very difficult to efficiently absorb the expansion of the negative electrode. In addition, there may arise a scattering of circumferential length in the wound electrode body, which may hamper uniform dispersion of stress and may bring about rupture or breakage of the electrode.

The size of the projected portions is preferably in the range of 1 to 100 nm. If the size of the projected portions is below this range, the strength of the projected portions would be so low as to cause easy collapse of the surface layer 3. If the size of the projected portions is above the range, on the other hand, it would be difficult for the surface layer 3 to be collapsed, and the effect to absorb the expansion of the negative electrode would be low. Incidentally, the size of the projected portions is the diameter of the projected portions as viewed from above. In addition, the aspect ratio {(height)/(width of bottom portion)} of the projected portions possessed by the surface layer 3 is preferably not less than 3. When the aspect ratio is not less than 3, it is possible to enhance the expansion-absorbing effect of the surface layer on the negative electrode active material.

Besides, the surface layer 3 having the arithmetic mean roughness Sa as above-mentioned preferably has a compression ratio B/A of not less than 0.4 (namely, B/A≥0.4), where A is the thickness of the surface layer 3 under a load of 3.57 $N/cm^2$, and B is the collapse amount of the surface layer 3 under a load of 4000 $N/cm^2$. This means that the surface layer 3 collapses by a factor of 40% or more under a load of 4000 $N/cm^2$, as compared with its state under a load of 3.57 $N/cm^2$. If the compression ratio B/A is below this range (B/A is less than 0.4), the function to absorb the expansion of the negative electrode would be low. Incidentally, the compression ratio B/A varies depending on such factors as the kind of the resin material constituting the surface layer 3, the mean particle diameter of the inorganic particles, the mixing ratio of the resin material and the inorganic particles, and the porosity. Therefore, it is preferable to appropriately control the selection of the resin material and the inorganic particles, the mixing amounts of the resin material and the inorganic particle, or the porosity, in such a manner that the surface layer 3 as a whole will have an appropriate compression ratio.

Incidentally, the compression ratio is calculated as follows. First, a cylindrical super-rigid pellet having a contact area of 0.25 $cm^2$ is placed on the surface layer 3 to be measured. Next, the surface layer 3 is compressed at a rate of 0.1 mm/minute by a compression tester, and the thickness of the surface layer 3 under a load of 3.57 $N/cm^2$ is determined Subsequently, a similar compression test is conducted to measure the thickness of the surface layer 3 under a load of 4000 $N/cm^2$. From the difference between the surface layer thickness under the load of 3.57 $N/cm^2$ and the surface layer thickness under the load of 4000 $N/cm^2$, the collapse amount of the surface layer 3 under the load of 4000 $N/cm^2$ is obtained.

The measurement of the collapse amount as just-mentioned is carried out for each of the cases where the number of the surface layer(s) 3 is changed from one to 5, 10, 15 and 20, respectively. The data thus obtained are plotted in a diagram wherein the number of the surface layers 3 is taken on the axis of abscissas, and the collapse amount under the load of 4000 $N/cm^2$ is taken on the axis of ordinates. The data thus plotted are subjected to straight-line approximation by the least squares method, the inclination of the straight line is calculated, and the inclination is adopted as the collapse amount per surface layer.

As an example, a base material 2 having a porous polyethylene film has a compression ratio B/A of about 0.15, and, hence, has a smaller collapse amount as compared with the surface layer 3. In other words, the expansion of the negative electrode is substantially absorbed by the surface layer 3. Accordingly, the base material 2 can satisfactorily exhibit an ion permeability, an electrolyte solution-holding property, a mechanical strength and the like necessary for serving as the separator.

Incidentally, the rugged surface shape of the surface layer 3 shown in FIG. 2 is merely an example, and the rugged surface shape of the surface layer 3 may be any shape that has the function as described in the present application. Examples of the rugged surface shape include a mottled (cratered) shape shown in FIGS. 4A and 4B, a lattice (waffle) shape shown in FIG. 4C, a dotted (pillared) shape shown in FIG. 4D, a pinholed shape shown in FIG. 4E, and a ridged shape shown in FIG. 4F.

Figure 4D:
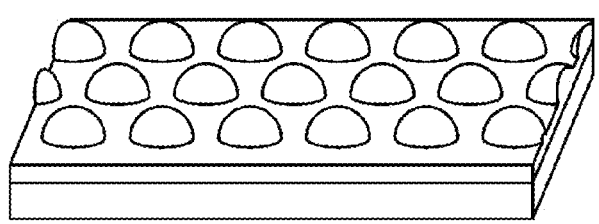
Figure 4E:
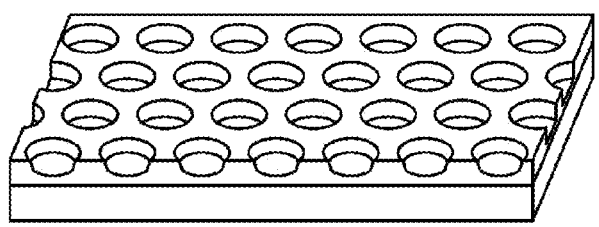
Figure 4F:
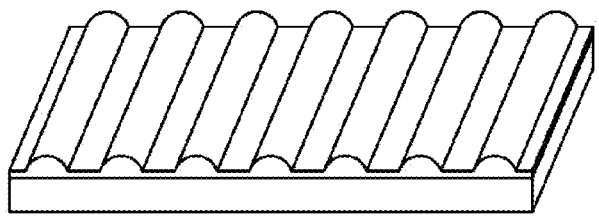
Figure 5A:
FIGS. 5A to 5F are sectional views showing another configuration of the rugged surface shape of the separator according to the first embodiment of the present application.
Figure 5B:
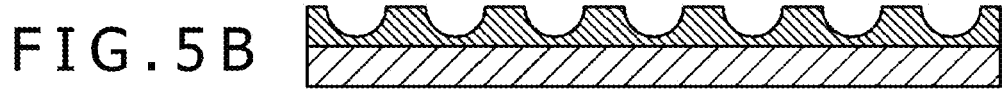
Figure 5C:
Figure 5D:
Figure 5E:
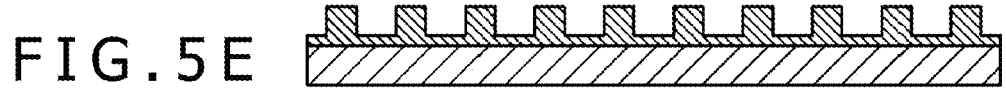
Figure 5F:
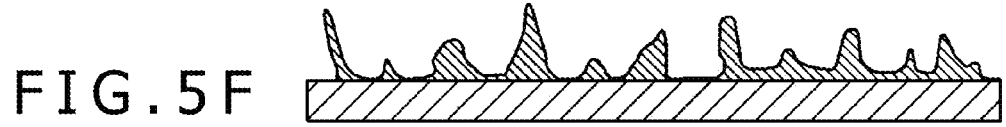

In addition, FIGS. 5A to 5F are sectional views of the separator 1, showing examples of the rugged surface shape of the surface layer 3. FIG. 5A is a sectional view in the case where the rugged surface shape is a dotted (pillared) shape shown in FIG. 4D; FIG. 5B is a sectional view in the case where the rugged surface shape is a pinholed shape shown in FIG. 4E; and FIG. 5C is a sectional view in the case where the rugged surface shape is a ridged shape shown in FIG. 4F. Besides, FIGS. 5D to 5F show other examples of the rugged surface shape; thus, a pyramided shape shown in FIG. 5D, a striped shape shown in FIG. 5E, and a random shape shown in FIG. 5F may also be adopted as the rugged surface shape.

The rugged surface shape of the surface layer 3 is preferably a random shape, for example. Examples of the random shape include a shape which is random in a one-dimensional direction, a shape which is random in two-dimensional directions, and a shape which is random in three-dimensional directions. The shape which is random in a one-dimensional direction means a shape which is random in the thickness direction of the surface layer 3 but is not random in in-plane directions of the surface layer 3. The shape which is random in two-dimensional directions means a shape which is not random in the thickness direction of the surface layer 3 but is random in in-plane directions of the surface layer 3. The shape which is random in three-dimensional directions means a shape which is random in in-plane directions of the surface layer 3 and is random in the thickness direction of the surface layer 3.

Figure 4A:
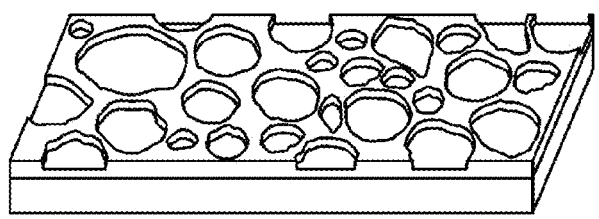
FIGS. 4A to 4F are perspective views showing a rugged surface shape of the separator according to the first embodiment of the present application.
Figure 4B:
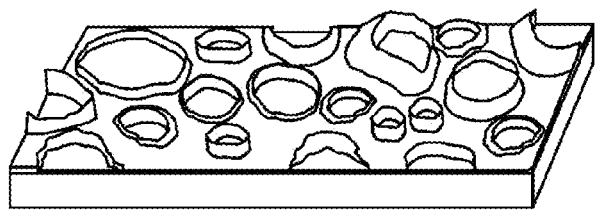
Figure 4C:
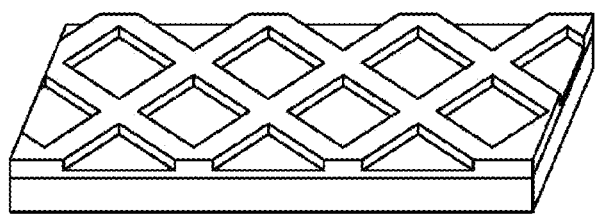

More specific examples of the random shape include cratered shapes shown in FIGS. 4A and 4B, and a random shape shown in FIG. 5F.

Here, the cratered shape means a shape which is random in two-dimensional directions or random in three-dimensional directions, which has at least roughly circular recessed portions and in which ridged portions are continued so as to surround the recessed portions. Incidentally, the roughly circular shape includes a true circular shape, an elliptic shape, and their distorted shapes and their combinations.

In the cratered shape, for example, the peak-to-peak distance of the projected portions surrounding the recessed portion, as indicated by line p in FIG. 2A, is made to be the size of the crater-like recesses (dents). Incidentally, the peak-to-peak distance is the largest one of the peak-to-peak distances which can be measured for one recessed portion. The interval of crater-like recesses (dents) is the center-to-center distance of adjacent crater-like recesses, as indicated by line q in FIG. 2A. The size of the crater-like recesses (dents) is, for example, 10 to 500 µm. The interval of the crater-like recesses is, for example, 1 to 10 µm.

Among the random shapes, the cratered shapes shown in FIGS. 4A and 4B are preferable, from the viewpoints of easy production and of absorption of expansions. The cratered shape which is random in three-dimensional directions as shown in FIG. 4B is more preferable than the cratered shape which is random in two-dimensional directions as shown in FIG. 4A.

The separator 1 in the present application may take the following configurations, according to the surface on which to form the surface layer 3 having the rugged surface shape.

[1. The Case where the Surface Layer Having a Rugged Surface Shape is Formed Only at the Surface Facing the Negative Electrode]

The surface layer 3 formed at the surface facing the negative electrode is in the state of making contact with the negative electrode which undergoes expansion attendant on charging. When the negative electrode expands, the surface layer 3 in contact with the negative electrode can directly absorb the expansion of the negative electrode.

In the case where the surface layer 3 is provided only at the surface facing the negative electrode, that surface of the separator 1 which faces the positive electrode may have the base material 2 exposed or may be provided with a flat surface layer 3. Particularly, it is preferable to provide a flat surface layer 3 at that surface of the separator 1 which faces the positive electrode.

The vicinity of the positive electrode accompanied by a high potential is liable to be put in an oxidizing environment, and it is known that a base material having polyolefin, particularly, a base material formed from polyethylene undergoes deterioration due to oxidative decomposition at the positive-electrode potential. The deterioration takes place more conspicuously, especially in a battery wherein the fully charged voltage is set at or above 4.25 V. Therefore, when a surface layer 3 including inorganic particles and a resin material resistance to heat and to oxidation is provided at the surface facing the positive electrode, the resistance to heat and oxidation is imparted to that surface of the separator 1 which faces the positive electrode, and the above-mentioned deterioration can be restrained. However, if the surface layer 3 at the surface facing the positive electrode has a rugged surface shape, oxidation-induced deterioration is liable to occur at the recessed portions, or thin portions, of the surface layer 3. Accordingly, in a battery wherein the fully charged voltage is set at or above 4.25 V, it is preferable that the function to effectively absorb the expansion of the negative electrode is imparted only to the surface layer 3 at the surface facing the negative electrode, whereas the surface layer 3 at the surface facing the positive electrode is set to have a flat surface shape, thereby restraining the deterioration of the separator 1.

[2. The Case where the Surface Layer Having a Rugged Surface Shape is Formed Only on the Surface Facing the Positive Electrode]

In the case where the fully charged voltage of a battery is set at or below 4.2 V, the oxidative decomposition of the polyethylene base material as above-mentioned is not liable to occur. On the other hand, in the case where a conductive metallic contaminant has penetrated into the inside of the battery, internal short-circuiting may be induced, leading to a lowered safety.

Where the metallic contaminant has entered between the positive electrode and the separator 1, the contaminant will in many cases be dissolved by the potential of the positive electrode, so that internal short-circuiting is not liable to be induced. Where the metallic contaminant has entered between the negative electrode and the separator 1, however, the risk of internal short-circuiting is increased, since the contaminant cannot be dissolved at the negative-electrode potential. In such an instance, if a uniform surface layer 3 is provided at the surface facing the negative electrode, the surface layer 3 having a thickness of not less than a predetermined value covers the metallic contaminant, whereby short-circuiting can be restrained. In addition, even where the surface layer 3 is provided only at that surface of the separator 1 which faces the positive electrode, the base material 2 is pressed toward the positive electrode side due to the expansion of the negative electrode, and the pressure can be absorbed by the surface layer 3 provided at the surface facing the positive electrode. Accordingly, while the function to effectively absorb the expansion of the negative electrode is imparted only to the surface layer 3 provided at the surface facing the positive electrode, the surface layer 3 provided at the surface facing the negative electrode can be made to function as a layer having an internal short-circuiting preventive function.

[3. The Case where the Surface Layer Having a Rugged Surface Shape is Formed at Each of Both Surfaces of the Base Material]

In the case where the necessity to take into account the problems concerning a high charged voltage and a metallic contaminant as above-mentioned is low, it is preferable to provide surface layers 3 at both surfaces of the base material 2. This ensures that the expansion-absorbing effect can be obtained at both surfaces of the base material 2.

The thickness of the surface layer 3 is preferably in the range of 5 to 20 µm. If the thickness is below this range, the function to absorb the expansion of the negative electrode would be low. If the thickness is above the range, on the other hand, the thickness of the separator 1 itself would be so large as to lead to a lowering in volume efficiency of the battery.

Here, the thickness of the surface layer 3 is preferably set in relation to the mean particle diameter of the inorganic particles. Specifically, the thickness of the surface layer 3 constituting the separator 1 according to an embodiment of the present application is preferably not less than five times the mean particle diameter of the inorganic particles; namely, it is preferable that T/D≥5, where T is the thickness of the surface layer 3, and D is the mean particle diameter of the inorganic particles. Here, in this first embodiment, the thickness T of the surface layer 3 is the thickness of the surface layer 3 when a load of 1 N is exerted thereon by use of a circular flat surface indenting tool having a diameter of 6 mm.

Where the mean particle diameter of the inorganic particles is too large as compared with the thickness of the surface layer 3, the surface layer 3 is not liable to be collapsed when the negative electrode expands. In addition, the strength of the separator 1 may be lowered, or coating properties may be lowered. The lowering in the strength of the separator 1 is due to damaging of the base material 2 by the inorganic particles pressed against the base material 2 when a pressure is exerted on the separator 1, because of the expansion of the negative electrode or exertion of an external pressure, in the case where the inorganic particles having a comparatively large mean particle diameter are used to form the surface layer 3. Besides, the lowering in the coating properties occurs because base material parts not coated with a coating liquid are generated in regions near the inorganic particles, if primary particles of the inorganic particles are too large, in the case where the surface layer 3 containing the inorganic particles is formed on the base material 2 by coating.

The above-mentioned thickness of the surface layer 3 is a numerical value of thickness upon formation of the separator 1. Attendant on the charging and discharging of the battery, the surface layer 3 is compressed, and the thickness of the layer is reduced. When a battery manufactured by use of the separator 1 according to an embodiment of the present application is disassembled after charged, the thickness of the surface layer 3 is smaller than the thickness upon formation of the separator 1. In a battery that has been charged at least once, however, a surface portion of the separator 1 has been compressed to be lower in porosity than other portions, and the thickness of the separator 1 at that time can be easily judged as smaller than the thickness upon formation of the separator 1.

Incidentally, the surface layer 3 has the rugged surface shape and, therefore, does not have a uniform thickness. In view of this, the thickness T of the surface layer 3 is the thickness as measured in the condition where a load of 1 N is exerted on the separator by use of a circular flat surface indenting tool having a diameter of 6 mm. Here, in the case where the surface layers 3 are formed respectively on both surfaces of the base material 2, the thickness T is the total thickness of the surface layers 3 formed respectively on both surfaces of the base material 2.

The porosity of the surface layer 3 is preferably set in the range of 60 to 90%, more preferably 80 to 90%, and still more preferably 85 to 90%. When the porosity of the surface layer 3 is in this range, the projected portions of the surface layer 3 have an appropriate strength, so that the projected portions of the surface layer 3 can support the electrode in such a manner as to keep an appropriate distance between the base material 2 and the electrode. In addition, even when the surface layer 3 is collapsed by expansion of the electrode, the degree of collapse is not high; therefore, the porosity of the collapsed part can be prevented from being lowered to such an extent as to hinder the cell reactions, and a porosity of not less than a predetermined value can be maintained. Accordingly, the battery characteristics can be restrained from being lowered.

Examples of the resin material constituting the surface layer 3 include fluorine-containing resins such as polyvinylidene fluoride or polytetrafluoroethylene; fluorine-containing rubbers such as vinylidene fluoride-tetrafluoroethylene copolymer or ethylene-tetrafluoroethylene copolymer; rubbers such as styrene-butadiene copolymer or a hydrogenated product thereof, acrylonitrile-butadiene copolymer or a hydrogenated product thereof, acrylonitrile-butadiene-styrene copolymer of a hydrogenated product thereof; methacrylate-acrylate copolymer, styrene-acrylate copolymer, acrylonitrile-acrylate copolymer, ethylene-propylene rubber, polyvinyl alcohol, and polyvinyl acetate; cellulose derivatives such as ethyl cellulose, methyl cellulose, hydroxyethyl cellulose, and carboxymethyl cellulose; polyphenylene ethers, polysulfones, polyether sulfones, polyphenylene sulfide, polyether-imides, polyimides, polyamides such as all-aromatic polyamides (aramids), polyamide-imides, polyacrylonitrile, polyvinyl alcohol, polyethers, polyacrylic acid resins or polyesters and the like resins having high heat resistance with at least one of melting point and glass transition temperature of not less than 180° C. These resin materials may be used either singly or as a mixture of two or more of them. Among others, polyvinylidene fluoride or an aramid or a polyamide-imide is preferably contained in the resin material constituting the surface layer 3.

Examples of the inorganic particles constituting the surface layer 3 include electrically insulating inorganic particles such as particles of metallic oxides, metallic oxide hydrates, metallic hydroxides, metallic nitrides, metallic carbides, and metallic sulfides. Examples of the metallic oxides which can be used preferably include aluminum oxide (alumina, $Al_2O_3$), magnesium oxide (magnesia, MgO), titanium oxide (titania, $TiO_2$), zirconium oxide (zirconia, $ZrO_2$), silicon oxide (silica, $SiO_2$), and yttrium oxide (yttria, $Y_2O_3$). Examples of the metallic oxide hydrates which can be used preferably include those in which water of hydration is bonded to the above-mentioned metallic oxides, such as aluminum oxide monohydrate (boehmite, $Al_2O_3.H_2O$). Examples of the metallic hydroxide which can be used preferably include aluminum hydroxide ($Al(OH)_3$). Examples of the metallic nitrides which can be used preferably include silicon nitride ($Si_3N_4$), aluminum nitride (AlN), boron nitride (BN), and titanium nitride (TiN). Examples of the metallic carbide which can be used preferably include silicon carbide (SiC) and boron carbide ($B_4C$). Examples of the metallic sulfide which can be used preferably include barium sulfate ($BaSO_4$). In addition, there can also be used minerals, for example, porous aluminosilicates such as zeolite ($M_{2/n}O.Al_2O_3.xSiO_2.yH_2O$, where M is a metallic element, $x \geq 2$, and $y \geq 0$), laminar silicates, barium titanate ($BaTiO_3$), or strontium titanate ($SrTiO_3$). Among these inorganic materials, preferred are alumina, boehmite, titania (especially, titania with the rutile structure), silica and magnesia, and more preferred is alumina.

One kind of these inorganic particles may be used singly, or two or more kinds of these inorganic particles may be used in a mixed state. The inorganic particles have oxidation resistance, as well; therefore, the surface layer 3 at the surface facing the positive electrode shows high resistance also to the oxidizing environment in the vicinity of the positive electrode at the time of charging. The shape of the inorganic particles is not specifically restricted, and may be any of a spherical shape, a fibrous shape and a random shape. Particularly, inorganic particles with a spherical shape are preferably used.

The inorganic particles preferably have a mean particle diameter of primary particles of not more than several micrometers, from the viewpoints of influence on the strength of the separator and coating properties. To be more specific, the mean particle diameter of the primary particles is preferably not more than 1.0 μm, more preferably in the range of 0.3 to 0.8 μm. The mean particle diameter of the primary particles as just-mentioned can be measured by a method in which a photograph obtained by use of an electron microscope is analyzed by a particle diameter measuring instrument.

If the mean particle diameter of the primary particles of the inorganic particles is too large, the surface layer 3 would not easily be collapsed at the time of expansion of the negative electrode, and such problems as a brittle separator or bad coating properties would be generated. Besides, in the case where the surface layer 3 containing the inorganic particles is formed on the base material 2 by coating, if the primary particles of the inorganic particles are too large, some parts of the base material 2 may be left uncoated with the coating liquid containing the inorganic particles.

In addition, the mixing ratio (by mass) of the inorganic particles to the resin material is preferably in the range from 70:30 to 98:2. In other words, the content of the inorganic particles in the surface layer 3 is preferably in the range of 70 to 98% by mass, based on the total mass of the inorganic particles and the resin material in the surface layer 3. If the content of the inorganic particles is below this range, the surface layer 3 would be low in strength. If the content of the inorganic particles is above the range, on the other hand, the amount of the resin material which supports the inorganic particles would be so small that it is difficult to form the surface layer 3.

(Organic Particles)

In place of the inorganic particles constituting the surface layer 3, electrically insulating organic particles may also be used. Examples of the material constituting the organic particles include polyvinylidene fluoride, polytetrafluoroethylene and the like fluorine-containing resins, vinylidene fluoride-tetrafluoroethylene copolymer, ethylene-tetrafluoroethylene copolymer and the like fluorine-containing rubbers, styrene-butadiene copolymer or hydrogenated product thereof, acrylonitrile-butadiene copolymer or hydrogenated product thereof, acrylonitrile-butadiene-styrene copolymer or hydrogenated product thereof, methacrylate-acrylate copolymer, styrene-acrylate copolymer, acrylonitrile-acrylate copolymer, ethylene propylene rubber, polyvinyl alcohol, polyvinyl acetate and the like rubbers, ethyl cellulose, methyl cellulose, hydroxyethyl cellulose, carboxymethyl cellulose and the like cellulose derivatives, polyphenylene ether, polysulfone, polyether sulfone, polyphenylene sulfide, polyether imides, polyimides, all-aromatic polyamides (aramides) and the like polyamides, polyamide imides, polyacrylonitrile, polyvinyl alcohol, polyethers, acrylic resins, polyesters and the like resins which have high thermal resistance with at least one of melting point and glass transition temperature thereof being not less than 180° C. These materials may be used either singly or as a mixture of two or more of them. The shape of the organic particles is not particularly limited, and may be any of spherical shape, ellipsoidal shape, plate-like shape, fibrous shape, cubic shape, random shape and the like.

(1-2) Method of Manufacturing the Separator

Now, the method of manufacturing the separator 1 provided with the surface layer 3 will be described below.

(1-2-1) First Method of Manufacturing the Separator

A first manufacturing method is a method in which a resin solution is transferred and applied onto the base material 2 according to a desired rugged surface shape, thereby forming the rugged surface shape of the surface layer 3.

In this method, first, a resin solution for forming the surface layer 3 is prepared. Specifically, a resin material and inorganic particles for constituting the surface layer 3 are mixed together in a predetermined mass ratio, the resulting mixture is added to a dispersing solvent, such as N-methyl-2-pyrrolidone, to dissolve the resin material, thereby obtaining the resin solution.

The dispersing solvent to be used for preparing the resin solution may be any solvent that can dissolve the resin material in the present application. Examples of the dispersing solvent include dimethylacetamide, dimethylformamide, dimethyl sulfoxide, toluene and acetonitrile, as well as N-methyl-2-pyrrolidone. Among these dispersing solvents, N-methyl-2-pyrrolidone is preferably used, from the viewpoint of dissolving power and high dispersing properties.

Next, the surface layer 3 is formed on a surface of the base material 2. The resin solution is transferred in a predetermined pattern onto the surface on at least one side of the base material 2 by offset printing, screen printing or the like, followed by removing the dispersing solvent.

(1-2-2) Second Method of Manufacturing the Separator

A second manufacturing method is a method in which a coating film formed by applying a resin solution to the base material 2 and drying the applied resin solution is partly removed, so as to form a rugged surface shape of the surface layer 3.

In this method, first, a resin solution for forming the surface layer 3 is prepared, like in the first manufacturing method. Subsequently, the resin solution is applied to the surface on at least one side of the base material 2 and dried, in such a manner as to obtain a substantially uniform thickness. Thereafter, the resulting coating film is partly removed according to the desired rugged surface shape, by scratching (scraping) or by using a pressure sensitive adhesive tape or the like.

(1-2-3) Third Method of Manufacturing the Separator

A third manufacturing method is a method in which a resin solution applied to the base material 2 is dried while kept in a predetermined shape, so as to form a rugged surface shape of the surface layer 3.

In this method, first, a resin solution for forming the surface layer 3 is prepared, like in the first manufacturing method, and the resin solution is uniformly applied to the surface of the base material 2. Subsequently, an external force is exerted on the resin solution by a printing plate having a desired rugged surface shape until the dispersing solvent is evaporated off, to thereby impart a rugged surface shape to the coating, followed by drying.

(1-2-4) Fourth Method of Manufacturing the Separator

A fourth manufacturing method is a method in which a good solvent for a dispersing solvent is nonuniformly applied to a resin solution applied to the base material 2, to thereby form a rugged surface shape of the surface layer 3.

Figure 6A:
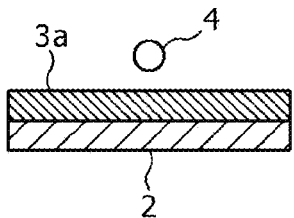
FIGS. 6A to 6C are sectional views illustrating an example of the method of forming the rugged surface shape of the separator according to the first embodiment of the present application.
Figure 6B:
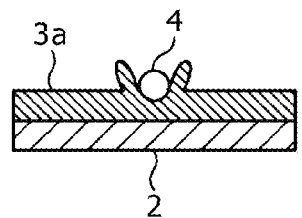
Figure 6C:
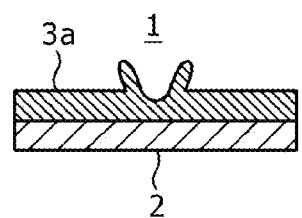

In this method, first, a resin solution for forming the surface layer 3 is prepared, like in the first manufacturing method, and the resin solution is uniformly applied to the surface of the base material 2. Subsequently, water or the like solvent which is poor solvent for the resin material dissolved in the resin solution and which is good solvent for the dispersing solvent used to dissolve the resin material is brought into nonuniform contact with the resin solution. In an example, as shown in FIGS. 6A to 6C, a water droplet 4 is made to collide against a coating layer 3a of the resin solution by use of a two-fluid nozzle or the like. In this case, a rugged surface shape is imparted to the coating layer 3a by the collision of the water droplet 4, and the coating layer 3a contacted by the water droplet 4 undergoes phase separation, whereby the rugged surface shape is fixed. Finally, hot-air drying is conducted. Consequently, the surface layer 3 having the rugged surface shape can be formed on the surface of the base material 2. In order to control the aspect ratio {(height)/(width of bottom portion)} of the projected portions thus formed, it suffices to regulate the force with which the water droplet is jetted from the two-fluid nozzle.

By use of such a method as above-described, the surface layer 3 is formed through a rapid poor solvent-induced phase separation phenomenon, and the surface layer 3 has a structure in which resin material skeletons are interconnected in the form of a fine three-dimensional network. Specifically, the resin material is dissolved, and the resin solution containing the inorganic particles is brought into contact with water or the like solvent which is poor solvent for the resin material and which is good solvent for the dispersing solvent used to dissolve the resin material, whereby solvent exchange is induced. As a result, rapid (high-rate) phase separation accompanied by spinodal decomposition takes place, whereby the resin material is fixed in a peculiar three-dimensional network structure. The surface layer 3 produced in this manner has a peculiar porous structure formed through utilization of the rapid poor solvent-induced phase separation phenomenon involving the spinodal decomposition, due to the presence of the poor solvent. Furthermore, this structure ensures that both an excellent property for impregnation with a nonaqueous electrolyte solution and an excellent ionic conductivity can be realized.

In the first to fourth manufacturing methods described above, the porosity of the surface layer 3 can be controlled by at least one of the following methods (i) to (iii).

(i) Regulation of Concentration of Solid Component in Resin Solution

The resin solution is used after the concentration of solid component (the inorganic particles and the resin material) in the resin solution is regulated to a desired concentration. As the proportion of the solid component in the resin solution is lower, the porosity of the surface layer 3 after completion of formation thereof can be made higher.

(ii) Regulation of Mass of Inorganic Particles Per Unit Volume

The mass of the inorganic particles per unit volume of the surface layer 3 is regulated. As the mass of the inorganic particles is greater, the porosity of the surface layer 3 after completion of formation thereof can be made higher.

(iii) Regulation of Good Solvent at the Time of Phase Separation of Resin Solution The state of the surface layer 3 can be controlled also by regulating the rate of the phase separation. The rate of the phase separation can be regulated, for example, by adding a small amount of the dispersing solvent to the above-mentioned good solvent used at the time of phase separation. Specifically, N-methyl-2-pyrrolidone is added in a small amount to water (which is a good solvent), and liquid droplets are made to collide against the resin material. In this case, as the amount of N-methyl-2-pyrrolidone mixed with water is larger, the rate of the phase separation is made lower. A most rapid phase separation takes place when the phase separation is caused using water alone as solvent. As the phase separation rate is lower, the porosity of the surface layer 3 after completion of formation thereof can be made higher.

(1-3) Modifications

It suffices for the surface layer 3 in the present application to be present at the boundary between the base material 2 and at least one of the positive electrode and the negative electrode; thus, the surface layer 3 may not necessarily be part (surface layer 3) of the separator 1. Specifically, as other embodiment of the present application, a structure may be adopted in which a separator having a configuration according to the related art (a separator composed only of the base material 2) is used and a resin layer equivalent to the surface layer 3 in the present application is formed on at least one of a positive electrode surface and a negative electrode surface. In the case where the resin layer is formed on at least one of the positive electrode surface and the negative electrode surface, the resin layer should be formed without fail on at least one of the positive electrode and the negative electrode which face each other with a single separator therebetween.

In addition, in a battery using a gel electrolyte layer which is a layer of a gelled nonaqueous electrolyte, a predetermined amount of inorganic particles may be contained in the gel electrolyte layer so that the gel electrolyte layer functions also as the surface layer in the present application. A gel electrolyte layer includes a nonaqueous electrolyte solution and a polymer which holds the nonaqueous electrolyte solution. Therefore, in the process in which a precursor solution containing the inorganic particles together with the nonaqueous electrolyte solution and the polymer is applied to the positive electrode and the negative electrode or to a separator surface and is then dried, the gel electrolyte layer may be formed while imparting thereto a rugged surface shape similar to the rugged surface shape in the present application, whereby a surface layer equivalent to the surface layer 3 in the present application can be formed between the positive electrode and the negative electrode.

2. Second Embodiment

A separator according to a second embodiment of the present application will now be described. The separator according to the second embodiment of the present application is the same as the separator according to the first embodiment, except that the surface layer having a rugged surface shape is configured as described below. In the following, therefore, the surface layer having the rugged surface shape will be described in detail, whereas detailed descriptions of the same configurations as the configurations in the first embodiment will be omitted, as appropriate.

(Surface Layer)

The surface layer 3 is a porous layer which is formed on the surface on at least one side of the base material 2 and which has a rugged surface shape. The surface layer 3 has an ion permeation function, a nonaqueous electrolyte solution holding function and the like for serving as the separator 1, and is formed with a multiplicity of minute voids throughout the whole part thereof. When the separator 1 is applied to a nonaqueous electrolyte battery, a nonaqueous electrolyte solution is held in the pores possessed by the surface layer 3. The surface layer 3 of the separator 1 has the rugged surface shape so that tips of projected parts formed in plurality make contact with the positive electrode or negative electrode (not shown). The rugged surface shape of the surface layer 3 may be any shape that has the function described in the present application. For instance, the rugged surface shape may be the same as the rugged surface shape according to the first embodiment.

The surface layer 3 functions as part of the separator 1 in the condition wherein the tips of its projected portions formed in plurality make contact with at least one of the positive electrode and the negative electrode so as to keep an appropriate distance between the base material 2 and the at least one of the positive electrode and the negative electrode.

In order to have such a function, the surface layer 3 in the present application is a porous layer which contains a resin material (binder) and inorganic particles. The inorganic particles are dispersed in and supported by the resin material which is formed with a multiplicity of pores. By containing the inorganic particles, the surface layer 3 can suitably have the rugged surface shape. As the resin material (binder) and the inorganic particles, the same resin material and inorganic particles as those in the first embodiment can be used. In addition, the surface layer 3 may have a three-dimensional network structure, like in the first embodiment. The surface layer 3 having the three-dimensional network structure preferably has a three-dimensional network structure in which fibrils formed through fibrillation of the resin material constituting the surface layer 3 are continuously interconnected. The inorganic particles are supported by the resin material having the three-dimensional network structure, whereby the inorganic particles can be kept in a dispersed state without being interconnected.

The surface layer 3 having the rugged surface shape in the present application is so configured that the quantity of heat transferred from the electrode to the base material 2 (for example, a polyolefin base material) is reduced and the heat is dispersed, whereby concentration of heat in the base material 2 upon abnormal heat generation at the electrode is restrained. Such a surface layer 3 satisfies, for example, the formula (1)

and formula (2) set forth below. When the surface layer 3 satisfying the formula (1) and the formula (2) is provided, a sufficient chemical short-circuit resistance is obtained, the tips of the rugged surface shape (the tips of the projected portions) are prevented from becoming too sharp-pointed, and diffusion of heat into the base material 2 can be significantly reduced. Incidentally, the parameters in the formula (1) and the formula (2) vary depending on the kind of the resin material constituting the surface layer 3, the mean particle diameter of the inorganic particles in the surface layer 3, the mixing ratio of the resin material and the inorganic particles, the porosity of the surface layer 3, the surface roughness of the surface layer 3, etc.

$$Qs > 0.50 \text{ (mJ/cm}^2\cdot\text{K)} \qquad (1)$$

(wherein Qs is heat content per unit area of the surface layer);

$$0.30 \times k0 < (S2/S1) \times kp < 0.70 \times kp, \text{ and } k0 < kp \qquad (2)$$

(wherein k0 is thermal conductivity of the surface layer in the absence of a load due to pressure, kp is thermal conductivity of the surface layer in the presence of a load of 4000 N/cm$^2$, S1 is projected area of the surface layer, and S2 is contact area of the surface area in the presence of a load of 4000 N/cm$^2$).

Since the surface layer 3 satisfies the condition of Qs>0.50 (mJ/cm$^2$·K), the quantity of heat generated in the electrode and transferred to the base material 2 can be suppressed. Incidentally, the heat content Qs per unit area of the surface layer can be determined, for example, according to the following formula:

$$Qs=\{[\text{specific heat (J/kg·K) of inorganic particles}]\times[\text{areal density (kg/cm}^2\text{) of surface layer}]\times[\text{mass fraction of inorganic particles}]\}+\{[\text{specific heat (J/kg·K) of binder}]\times[\text{areal density (kg/cm}^2\text{) of surface layer}]\times[\text{mass fraction of binder}]\}$$

Figure 7:
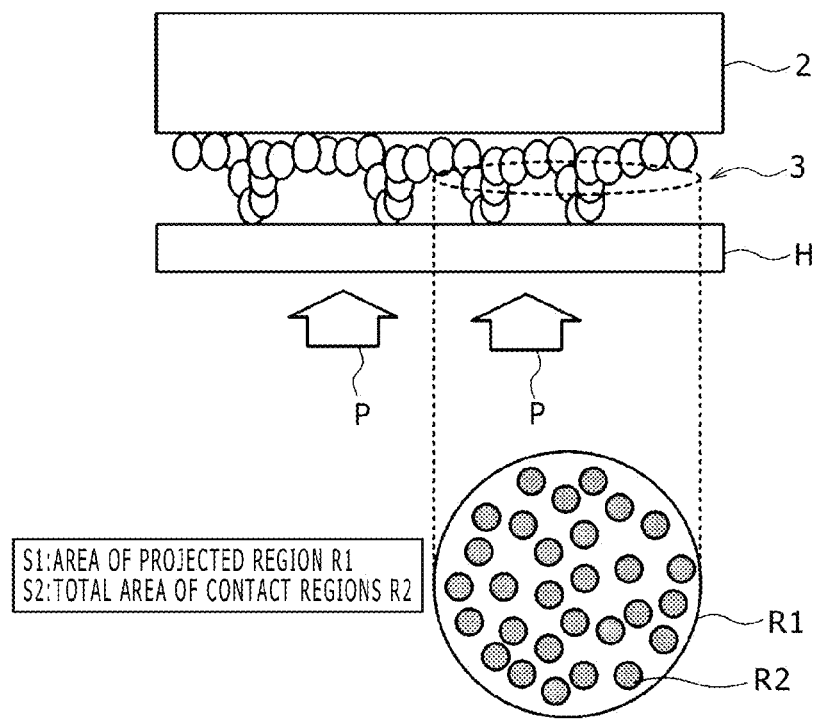
FIG. 7 is a schematic view for illustrating the method of calculating an area ratio S2/S1.

The area ratio S2/S1 can be determined, for example, as follows. First, as shown in FIG. 7, a super-rigid pellet H is placed on the surface layer 3 to be measured. Next, as indicated by arrows P, a load of 4000 N/cm$^2$ is exerted by use of a compression tester. Thereafter, using a three-dimensional measuring instrument, the surface of the separator (surface layer 3) is observed, and, in a predetermined region R1 at a position corresponding to a thickness of 2 μm from the surface, the other area than voids (namely, the contact area S2 which is the total area of contact regions R2 in FIG. 7) is calculated. Besides, the area of the predetermined region R1 is calculated as the area 51 of the projected region of the surface layer 3. The area ratio S2/S1 is preferably in the range of, for example, 0.30<S2/S1<0.70. If the area ratio S2/S1 is not more than 0.30, the contact area of the surface layer is so small that bent passages (paths of ions) in the separator are scattered greatly, resulting in that scattering of current density would increase and the chemical short-circuit resistance would be lowered, although heat transfer from the electrode can be restrained more favorably. If the area ratio S2/S1 is not less than 0.70, on the other hand, too much heat would be transferred from the electrode.

The thermal conductivity k0 is the thermal conductivity in the absence of a load due to pressure. The thermal conductivity k0 can be determined, for example, as follows. The thermal conductivity k0 is calculated from the thermal conductivity (W/m·K) of the inorganic particles, the volumetric proportion (in one-dimensional direction) of the inorganic particles, the thermal conductivity (W/m·K) of the binder, and the volumetric proportion (in one-dimensional direction) of the binder, by the following formula:

Thermal conductivity $k0$={[thermal conductivity $k$ of inorganic particles]×[volumetric proportion (in one-dimensional direction) of inorganic particles]}+[thermal conductivity $k$ of binder]×[volumetric proportion (in one-dimensional direction) of binder]}

The "volumetric proportion (in one-dimensional direction) of inorganic particles" can be obtained, for example, as "(volumetric ratio of inorganic particles)$^{1/3}$/{(volumetric ratio of inorganic particles)$^{1/3}$+(volumetric ratio of binder)$^{1/3}$}." Similarly, the "volumetric proportion (in one-dimensional direction) of binder" can be obtained, for example, as "(volumetric ratio of binder)$^{1/3}$/{(volumetric ratio of inorganic particles)$^{1/3}$+(volumetric ratio of binder)$^{1/3}$}." The thermal conductivity k0 is preferably in the range of, for example, 0.5 (W/m·K)<k0<20 (W/m·K).

The thermal conductivity kp is the thermal conductivity of the surface layer under a load of 4000 N/cm$^2$. For example, let the thermal conductivity of the surface layer 3 under a load of X N/cm$^2$ (X<4000) be kx, then there is established a relation of k0<kx<kp. Thus, the surface layer 3 satisfies the relational formula of k0<kp. The surface layer 3 in the present application has voids between the inorganic particles. When a load is exerted on the surface layer 3, therefore, the area of contact between the inorganic particles in the surface layer 3 is increased, as compared with the case where no load is exerted. Consequently, the thermal conductivity of the surface layer 3 is enhanced in proportion to the magnitude of the load exerted thereon. The thermal conductivity kp is preferably in the range of, for example, 1.0 (W/m·K)<kp<30 (W/m·K).

The thermal conductivity kp can be obtained, for example, as follows. The thermal conductivity kp is calculated from the thermal conductivity (W/m·K) of the inorganic particles, the volumetric proportion (in one-dimensional direction) of the inorganic particles, the thermal conductivity (W/m·K) of the binder, the volumetric proportion (in one-dimensional direction) of the binder, and the compression ratio (B/A). The compression ratio is represented by B/A, where A is the thickness of the surface layer 3 under a load of 3.57 N/cm$^2$, and B is the collapse amount of the surface layer 3 under a load of 4000 N/cm$^2$. The compression ratio (B/A) is measured in the same manner as in the first embodiment. Since the compression ratio corresponds to the collapse amount of the surface layer 3 in the one-dimensional direction, the compression ratio (B/A) corresponds to the fact that the distance between inorganic particles is shortened by (B/A)×100 [%]. From the foregoing, Thermal conductivity $kp$={[thermal conductivity $k$ of inorganic particles]×[volumetric proportion (in one-dimensional direction) of inorganic particles]}+{[thermal conductivity $k$ of binder]×[volumetric proportion (in one-dimensional direction) of binder]}.

The "volumetric proportion (in one-dimensional direction) of inorganic particles" can be obtained, for example, as "(volumetric ratio of inorganic particles)$^{1/3}$/{(volumetric ratio of binder)$^{1/3}$+[1−compression ratio (B/A)]×(volumetric ratio of binder)$^{1/3}$}." Similarly, the "volumetric proportion (in one-dimensional direction) of binder" can be obtained, for example, as "{[1−compression ratio (B/A)]×(volumetric ratio of binder)$^{1/3}$/{(volumetric ratio of inorganic particles)$^{1/3}$+[1−compression ratio (B/A)]×(volumetric ratio of binder)$^{1/3}$}."

A battery has incorporated therein a mechanism for cutting off a current upon heat generation in the battery, for the purpose of securing safety. As an example of this contrivance, a shut-down mechanism may be mentioned, wherein a separator produced by stretching (orienting) a polyolefin resin is so designed that micropores in the film are closed at a high temperature, thereby cutting off the current. When the polyolefin resin is abnormally heated due to heat generation in the electrode or by Li crystallization and a melting point of the resin is exceeded, the resin is melted (melt-down), possibly causing short-circuit through the contact between the positive and negative electrodes. Especially where an electrode liable to expand is used, the area of contact between the separator and the electrode serving as a heat source is so large that a large quantity of heat cannot be diffused sufficiently, and the separator may be melted.

On the other hand, in the case of the separator in the present application configured as above-described, the area of contact between the separator and the electrode is kept small, even under the condition where the separator is compressed due to the expansion of the electrode. Accordingly, transfer of heat from the electrode to the separator is suppressed. Thus, a function to prevent the above-mentioned melt-down is secured.

Figure 8:
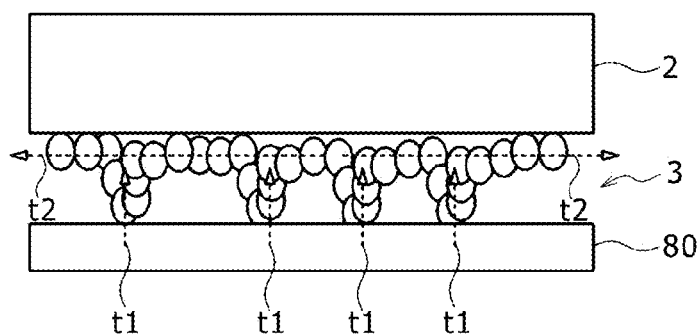
FIG. 8 is a schematic view for illustrating the operation and effect of the surface layer of the separator according to an embodiment of the present application.

In the separator in the present application, the surface layer 3 is configured as above-mentioned, whereby the quantity of heat transferred from the electrode to the base material 2 (for example, a polyolefin base material or the like) is suppressed. In addition, heat is diffused by the surface layer 3 which has a high heat content, whereby concentration of heat in the base material 2 is restrained even upon abnormal heat generation in the electrode. Specifically, in the separator in the present application, the rugged surface shape of the surface layer 3 keeps the area of contact between the separator and the electrode at a level of, for example, less than 70%, even under the condition where the surface layer 3 is compressed due to expansion of the electrode. Since the contact area between an electrode 80 (FIG. 8) and the surface layer 3 is kept below 70%, it is possible to reduce the quantity of heat generated in the electrode 80 and transferred into the base material 2 through the contact portions between the electrode 80 and the surface layer 3 as indicated by arrows t1 in FIG. 8. In addition, since the heat content Qs per unit area of the surface layer 3 is set in the range of Qs>0.50 (mJ/cm$^2$·K), the rate of transfer of heat toward the base material 2 as indicated by arrows t1 can be lowered, and the heat can be dispersed by the surface layer 3 in the in-plane directions as indicated by arrows t2. As a result of these functions, the quantity of heat generated in the electrode 80 and transferred to the base material 2 is suppressed. This ensures that even upon abnormal heat generation in the electrode, concentration of the heat in the base material 2 can be restrained, so that the risk of short-circuiting between the electrodes due to melt-down of the base material 2 can be reduced.

In the separator in the present application, the surface layer 3 satisfies the formula (1) or the formula (2); in addition, the surface layer 3 preferably have an arithmetic mean surface roughness Sa in the range of 1.0 to 4.0 μm, from the same viewpoint as mentioned in the first embodiment. The surface layer 3 as above is a porous layer which is able to suppress the quantity of heat transferred to the base material 2 (for example, a polyolefin base material) and to diffuse heat and which is able to absorb the expansion of the negative electrode attendant on charging, by being partly collapsed. The reason why the arithmetic mean surface roughness Sa is set in the range of 1.0 to 4.0 μm is the same as in the first embodiment.

In the surface layer 3 having the arithmetic mean roughness Sa in above-mentioned range, the pitch of ruggedness (projections or recesses) in the rugged surface shape is preferably not more than 1.0 mm, for the same reason as in the first embodiment. In addition, the size of the projected portions is preferably in the range of 1 to 100 μm, for the same reason as in the first embodiment. Furthermore, the aspect ratio ((height)/(width of bottom portion)) of the projected portions possessed by the surface layer 3 is preferably not less than 3, for the same reason as in the first embodiment.

Besides, the surface layer 3 having the arithmetic mean roughness Sa in the above-mentioned range preferably has a compression ratio B/A of not less than 0.4, namely, it satisfies B/A≥0.4, where A is the thickness of the surface layer 3 under a load of 3.57 N/cm$^2$ and B is the collapse amount of the surface layer 3 under a load of 4000 N/cm$^2$, for the same reason as in the first embodiment. This means that the surface layer 3 collapses by a factor of 40% or more under a load of 4000 N/cm$^2$, as compared with its state under a load of 3.57 N/cm$^2$. If the compression ratio B/A is below 0.4, the function to absorb the expansion of the negative electrode would be lowered. Therefore, it is preferable to ensure that the surface layer 3 as a whole has an appropriate compression ratio, by appropriately controlling the selection of the resin material and the inorganic particles, the mixing amounts of the resin material and the inorganic particles, and the porosity of the surface layer 3. The method for measuring the compression ratio is the same as in the first embodiment.

As an example, a base material 2 composed of a porous film of polyethylene has a compression ratio B/A of about 0.15, and its collapse amount is smaller as compared with the surface layer 3. In other words, the expansion of the negative electrode is substantially absorbed by the surface layer 3. Accordingly, the base material 2 is able to exhibit satisfactorily an ion permeability, an electrolyte solution holding property, a mechanical strength and the like necessary for serving as a separator.

(Method of Manufacturing the Separator)

The separator according to the second embodiment as described above can be produced by a manufacturing method similar to the manufacturing method in the first embodiment.

3. Third Embodiment

In a third embodiment, a cylindrical nonaqueous electrolyte battery using the separator according to the first embodiment will be described.

(3-1) Configuration of Nonaqueous Electrolyte Battery
Structure of Nonaqueous Electrolyte Battery]

Figure 9:
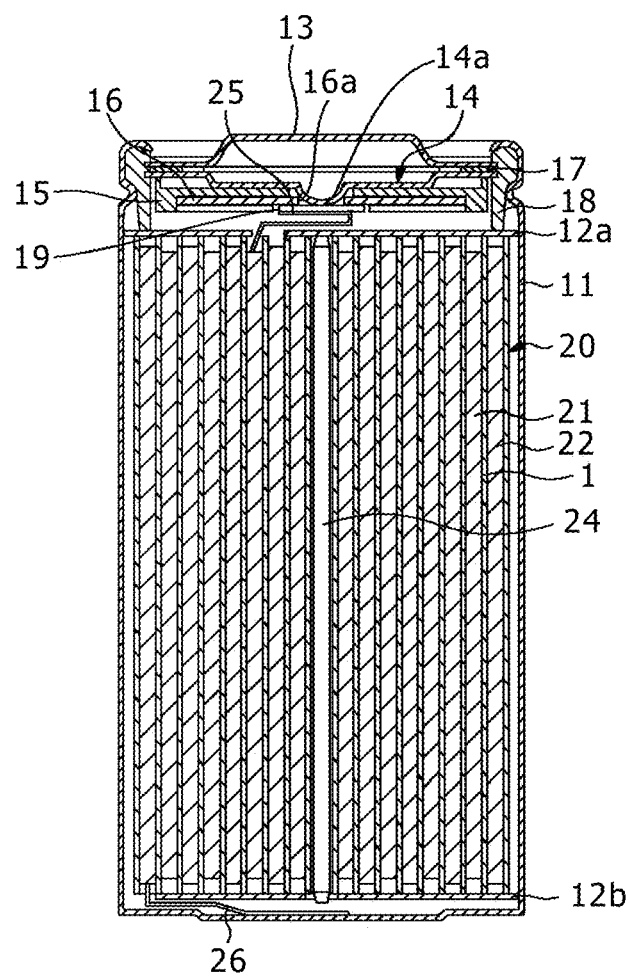
FIG. 9 is a sectional view showing the configuration of a cylindrical nonaqueous electrolyte battery according to a third embodiment of the present application.

FIG. 9 is a sectional view showing an example of a nonaqueous electrolyte battery 10 according to the third embodiment. The nonaqueous electrolyte battery 10 is, for example, a nonaqueous electrolyte secondary battery capable of being charged and discharged. The nonaqueous electrolyte battery 10 is a so-called cylindrical type battery, wherein a wound electrode body 20 in which a strip-shaped positive electrode 21 and a strip-shaped negative electrode 22 stacked together with the separator 1 in the present application therebetween are wound is disposed together with a liquid nonaqueous electrolyte (hereinafter referred to as nonaqueous electrolyte solution, when appropriate) (not shown) in the inside of a substantially hollow cylindrical battery can 11.

The battery can 11 is formed, for example, from nickel-plated iron, and has its one end portion closed and its other end portion open. In the inside of the battery can 11, a pair of insulating plates 12a and 12b are disposed orthogonally to the wound circumferential surface in such a manner as to clamp the wound electrode body 20 therebetween.

Examples of the material for the battery can 11 include iron (Fe), nickel (Ni), stainless steel (SUS), aluminum (Al), and titanium (Ti). The battery can 11 may be plated, for example, with nickel or the like, for the purpose of preventing electrochemical corrosion by the nonaqueous electrolyte solution attendant on the charging/discharging of the nonaqueous electrolyte battery 10. A battery lid 13 as a positive electrode lead plate and a safety valve mechanism and a heat-sensitive resistor (PTC: Positive Temperature Coefficient) element 17 which are provided on the inside of the battery lid 13 are attached to the open end portion of the battery can 11 by caulking, with a gasket 18 (for insulative sealing) therebetween.

The battery lid 13 is formed, for example, from the same material as the battery can 11, and is provided with an opening through which a gas generated inside the battery is exhausted. The safety valve mechanism has a safety valve 14, a disk holder 15 and a cut-off disk 16 sequentially stacked on one another. A projected portion 14a of the safety valve 14 is connected to a positive electrode lead 25 led out from the wound electrode body 20, through a sub-disk 19 so disposed as to cover a hole 16a provided in a central portion of the cut-off disk 16. The structure in which the safety valve 14 and the positive electrode lead 25 are interconnected through the sub-disk 19 prevents the positive electrode lead 25 from being drawn in through the hole 16a at the time of reversal of the safety valve 14. In addition, the safety valve mechanism is electrically connected to the battery lid 13 through the heat-sensitive resistor element 17.

The safety valve mechanism has a configuration such that when the pressure inside the nonaqueous electrolyte battery 10 is raised to or above a predetermined value due to short-circuiting inside the battery or external heating of the battery or the like, the safety valve 14 is reversed (in shape) to break the electrical connection between the projected portion 14a and the battery lid 13 and the wound electrode body 20. Specifically, when the safety valve 14 is reversed, the positive electrode lead 25 is pressed by the cut-off disk 16, whereby the safety valve 14 and the positive electrode lead 25 are disconnected from each other. The disk holder 15 is formed of an insulating material, whereby the safety valve 14 and the cut-off disk 16 are insulated from each other when the safety valve 14 is reversed.

In addition, when a gas is further generated inside the battery and the pressure inside the battery is further raised, part of the safety valve 14 is ruptured so that the gas can be exhausted to the battery lid 13 side.

Besides, the cut-off disk 16 is provided, for example, with a plurality of vent holes (not shown) in the periphery of the hole 16a. This configuration ensures that when a gas is generated from the wound electrode body 20, the gas can be effectively exhausted to the battery lid 13 side.

The heat-sensitive resistor element 17 has a resistance which increases with a rise in temperature, to break the electrical connection between the battery lid 13 and the wound electrode body 20, thereby cutting off the current; thus, the heat-sensitive resistor element 17 prevents abnormal heat generation from occurring due to an excessive current. The gasket 18 is formed, for example, from an insulating material, and its surface is coated with asphalt.

The wound electrode body 20 contained in the nonaqueous electrolyte battery 10 is wound around a center pin 24. In the wound electrode body 20, the positive electrode 21 and the negative electrode 22 are stacked together with the separator 1 therebetween and the stacked layer is wound in the longitudinal direction.

The positive electrode lead 25 is connected to the positive electrode 21, whereas a negative electrode lead 26 is connected to the negative electrode 22. As above-mentioned, the positive electrode lead 25 is electrically connected to the battery lid 13 by being welded to the safety valve 14, whereas the negative electrode lead 26 is welded and electrically connected to the battery can 11.

Figure 10:
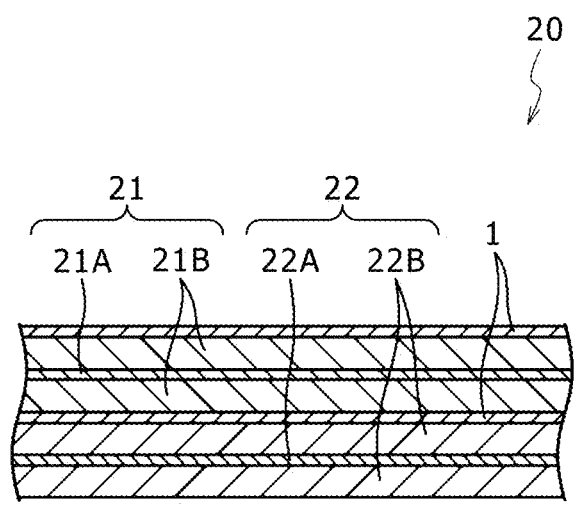
FIG. 10 is a sectional view showing, in an enlarged form, part of a wound electrode body contained in the cylindrical nonaqueous electrolyte battery shown in FIG. 7.

FIG. 10 shows, in an enlarged form, part of the wound electrode body 20 shown in FIG. 9. Now, the positive electrode 21, the negative electrode 22, and the separator 1 will be described in detail below.

[Positive Electrode]

The positive electrode 21 has, for example, a configuration in which a positive electrode active material layer 21B is provided on each of both surfaces of a positive electrode current collector 21A having a pair of opposite-side surfaces. Incidentally, though not shown, the positive electrode active material layer 21B may be provided on only one side of the positive electrode current collector 21A. The positive electrode current collector 21A is composed, for example, of a metallic foil such as an aluminum foil.

The positive electrode active material layer 21B is configured, for example, to contain a positive electrode active material, a conductive agent, and a binder. The positive electrode active material includes at least one of positive electrode materials capable of occluding and releasing lithium, and, if necessary, may include other materials such as a binder and a conductive agent.

Preferable examples of the positive electrode materials capable of occluding and releasing lithium include such lithium-containing compounds as lithium oxide, lithium phosphate, lithium sulfide and lithium-containing intercalation compounds, which may be used as a mixture of two or more of them. In order to enhance energy density, it is preferable to use a lithium-containing compound which contains lithium and a transition metal element and oxygen (O). Examples of such a lithium-containing compound as just-mentioned include lithium composite oxides having a laminar rock salt structure represented by the chemical formula (I) below, and lithium composite phosphate having an olivine structure represented by the chemical formula (II) below. Among the lithium-containing compounds, preferred are those which contain at least one selected from the group composed of cobalt (Co), nickel (Ni), manganese (Mn) and iron (Fe), as the transition metal element. Examples of such lithium-containing compounds as just-mentioned include lithium composite oxides having a laminar rock salt structure represented by the chemical formula (III), (IV) or (V) below, lithium composite oxides having a spinel structure represented by the chemical formula (VI) below, and lithium composite phosphates having an olivine structure represented by the chemical formula (VII) below. Specific examples of such lithium-containing compounds include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(1-y)}X_z \quad (I)$$

(wherein M1 is at least one selected from among the Group 2 to Group 15 elements exclusive of nickel (Ni) and manganese (Mn); X is at least one selected from among the Group 16 and Group 17 elements exclusive of oxygen (O); p, q, r, y, and z are numbers in the ranges of 0≤p≤1.5, 0≤q≤1.0, 0≤r≤1.0, −0.10≤y≤0.20, and 0≤z≤0.2)

$$Li_aM2_bPO_4 \quad (II)$$

(wherein M2 is at least one selected from among the Group 2 to Group 15 elements; a and b are numbers in the ranges of 0≤a≤2.0, and 0.5≤b≤2.0)

$$Li_fMn_{(1-g-h)}Ni_gM3_hO_{(1-j)}F_k \quad (III)$$

(wherein M3 is at least one selected from the group composed of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); f, g, h, j and k are numbers in the ranges of $0.8 \leq f \leq 1.2$, $0 \leq g \leq 0.5$, $0 \leq h \leq 0.5$, $g+h<1$, $-0.1 \leq j \leq 0.2$, and $0 \leq k \leq 0.1$; incidentally, the composition of lithium varies depending on the charged/discharged state, and the value of f is the value in a fully discharged state.)

$$Li_m Ni_{(1-n)} M4_n O_{(1-p)} F_q \qquad (IV)$$

(wherein M4 is at least one selected from the group composed of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); m, n, p and q are numbers in the ranges of $0.8 \leq m \leq 1.2$, $0.005 \leq n \leq 0.5$, $-0.1 \leq p \leq 0.2$, $0 \leq q \leq 0.1$; incidentally, the composition of lithium varies depending on the charged/discharged state, and the value of m is the value in a fully discharged state.)

$$Li_r Co_{(1-s)} M5_s O_{(1-t)} F_u \qquad (V)$$

(wherein M5 is at least one selected from the group composed of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); r, s, t and u are numbers in the ranges of $0.8 \leq r \leq 1.2$, $0 \leq s \leq 0.5$, $-0.1 \leq t \leq 0.2$, and $0 \leq u \leq 0.1$; incidentally, the composition of lithium varies depending on the charged/discharged state, and the value of r is the value in a fully discharged state.)

$$Li_v Mn_{(1-w)} M6_w O_x F_y \qquad (VI)$$

(wherein M6 is at least one selected from the group composed of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); v, w, x and y are numbers in the ranges of $0.9 \leq v \leq 1.1$, $0 \leq w \leq 0.6$, $3.7 \leq x \leq 4.1$, and $0 \leq y \leq 0.1$; incidentally, the composition of lithium varies depending on the charged/discharged state, and the value of v is the value in a fully discharged state.)

$$Li_z M7 PO_4 \qquad (VII)$$

(wherein M7 is at least one selected from the group composed of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); z is a number in the range of $0.9 \leq z \leq 1.1$; incidentally, the composition of lithium varies depending on the charged/discharged state, and the value of z is the value in a fully discharged state.)

Furthermore, composite particles in which surfaces of core particles of at least one of the above-mentioned lithium-containing compounds are coated with fine particles of at least one of other lithium-containing compounds may be adopted, from the viewpoint that higher electrode packing properties and cycle characteristic can be obtained.

Other examples of the positive electrode material capable of occluding and releasing lithium include oxides, disulfides, chalcogenides, and conductive polymers. Examples of the oxides include vanadium oxide ($V_2O_5$), titanium dioxide ($TiO_2$) and manganese dioxide ($MnO_2$). Examples of the disulfides include iron disulfide ($FeS_2$), titanium disulfide ($TiS_2$) and molybdenum disulfide ($MoS_2$). Examples of the chalcogenides are particularly preferably laminar compounds or spinel compounds, and examples thereof include niobium selenide ($NbSe_2$). Examples of the conductive polymers include sulfur, polyaniline, polythiophene, polyacetylene and polypyrrole. Naturally, the positive electrode material may be other material than the above-mentioned. Besides, the above-mentioned series of positive electrode materials may be used as an arbitrary mixture of two or more of them.

In addition, examples of the material which can be used as the conductive agent include carbon materials such as carbon black or graphite. As the binder, there is used at least one selected from the group which includes resin materials such as polyvinylidene fluoride (PVdF), polytetrafluoroethylene (PTFE), polyacrylonitrile (PAN), styrene-butadiene rubber (SBR), or carboxymethyl cellulose (CMC), and copolymers based on these resin materials.

[Negative Electrode]

The negative electrode 22 has, for example, a structure in which a negative electrode active material layer 22B is provided on each of both surfaces of a negative electrode current collector 22A which has a pair of opposite surfaces. Incidentally, though not shown in the drawing, a structure may be adopted in which the negative electrode active material layer 22B is provided on the surface on only one side of the negative electrode current collector 22A. The negative electrode current collector 22A is composed, for example, of a metallic foil such as a copper foil.

The negative electrode active material layer 22B contains as a negative electrode active material at least one of negative electrode materials capable of occluding and releasing lithium, and may contain, if necessary, other materials such as the same conductive agent and binder as those used in the positive electrode active material layer 21B.

Incidentally, in this nonaqueous electrolyte battery 10, the electrochemical equivalent of the negative electrode material capable of occluding and releasing lithium is higher than the electrochemical equivalent of the positive electrode 21; theoretically, therefore, lithium metal would not be precipitated on the negative electrode 22 during charging.

Examples of the negative electrode material capable of occluding and releasing lithium include carbon materials such as non-graphitizable carbon, easily-graphitizable carbon, graphite, pyrolytic carbons, cokes, glassy carbons, baked products of organic polymer compounds, carbon fibers, and active carbon. The cokes include pitch cokes, needle cokes and petroleum cokes. The baked products of organic polymer compounds are carbonized products obtained by baking a polymeric material such as phenol resin or furan resin at an appropriate temperature, and some of them are classified as non-graphitizable carbon or easily-graphitizable carbon. These carbon materials are preferable because they show very little change in crystal structure generated upon charging/discharging, make it possible to obtain a high charging/discharging capacity, and make it possible to obtain a good cycle characteristic. Especially, the graphite is preferable because it has a high electrochemical equivalent and makes it possible to obtain a high energy density. In addition, the non-graphitizable carbon is preferable because it makes it possible to obtain an excellent cycle characteristic. Furthermore, those carbon materials which have a low charging/discharging potential, specifically, those which have a charging/discharging potential approximate to the charging/discharging potential of lithium metal, are preferable because they promise easy realization of a battery with an enhanced energy density.

Examples of the negative electrode material capable of occluding and releasing lithium include those materials which are capable of occlusion and release of lithium and which contain at least one selected from among metallic elements and semi-metallic elements as a constituent element. The use of such a material makes it possible to obtain a high energy density. Particularly, the use of such a material together with a carbon material is preferable because a high energy density and an excellent cycle characteristic can be obtained thereby. This negative electrode material may be a metallic element or semi-metallic element in an elemental state, or its alloy or its compound, and may be a material which has, at least at part thereof, a phase of one or more kinds of such elements, alloys and compounds. Incidentally, in the present application, the alloys include not only those alloys which are composed of two or more metallic elements but also those alloys which contain at least one metallic element and at least one semi-metallic element. Besides, the alloy may contain a non-metallic element. Examples of the structure of this negative electrode material include a solid solution, a eutectic (eutectic mixture), and an intermetallic compound, of which two or more may be coexistent.

Examples of the metallic or semi-metallic element for constituting the negative electrode material include those metallic or semi-metallic elements which are capable of forming an alloy with lithium. Specific examples of such metallic or semi-metallic elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be either crystalline or amorphous.

The negative electrode material is preferably a material which contains as a constituent element a metallic element or semi-metallic element of Group 4B in the short form of the Periodic Table, for example, lithium titanate ($Li_4Ti_5O_{12}$), more preferably a material which contains at least one of silicon (Si) and tin (Sn) as a constituent element, and particularly preferably a material which contains at least silicon as a constituent element. Silicon (Si) and tin (Sn) have a high capability to occlude and release lithium, thereby making it possible to obtain a high energy density. Examples of the negative electrode material containing at least one of silicon and tin include elemental silicon, silicon alloys, silicon compounds, elemental tin, tin alloys, tin compounds, and materials having a phase of at least one selected from among these elements, alloys and compounds at least at part thereof.

Examples of silicon alloys include those alloys which contain at least one selected from the group composed of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr), as a second constituent element other than silicon. Examples of tin alloys include those alloys which contain at least one selected from the group composed of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr), as a second constituent element other than tin (Sn).

Examples of tin (Sn) compounds and silicon (Si) compounds include those compounds which contain oxygen (O) or carbon (C), and the compounds may contain the above-mentioned second constituent element(s) other than tin (Sn) or silicon (Si).

Among the negative electrode materials, preferred are SnCoC-containing materials which contain cobalt (Co), tin (Sn) and carbon (C) as constituent elements, wherein carbon content is 9.9 to 29.7% by mass, and the content of cobalt (Co) is 30 to 70% by mass based on the total content of tin (Sn) and cobalt (Co). With the composition in such a range, a high energy density can be obtained, and an excellent cycle characteristic can be obtained.

This SnCoC-containing material may further contain other constituent element, as necessary. Examples of the other constituent element include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi), and two or more of them may be contained in the SnCoC-containing material. When the SnCoC-containing material contains the other constituent element(s), capacity or cycle characteristic of the battery can be further enhanced.

Preferably, the SnCoC-containing material has a phase which contains tin (Sn), cobalt (Co) and carbon (C), and the phase has a lowly crystalline structure or an amorphous structure. In addition, in the SnCoC-containing material, preferably, at least part of the carbon (C) present as a constituent element is bonded to the metallic or semi-metallic element present as other constituent element. A lowering in cycle characteristic is considered to arise from aggregation or crystallization of tin (Sn) or the like, and bonding of carbon (C) with other element can restrain such aggregation or crystallization.

As a measuring method for examining the bonded state of elements, there may be mentioned the X-ray photoelectron spectroscopy (XPS), for example. In the case where graphite is analyzed by XPS, the peak of 1s orbit of carbon (C1s) appears at 284.5 eV on an instrument having undergone such an energy calibration that the peak of 4f orbit of gold (Au4f) appears at 84.0 eV. Besides, in the case of surface contaminant carbon, the peak appears at 284.8 eV. On the other hand, in the case where the charge density of carbon element is raised, for example, where carbon is bonded with a metallic or semi-metallic element, the C1s peak appears in a range below 284.5 eV. Thus, when the peak of an associated wave of C1s obtained for an SnCoC-containing material appears in a range below 284.5 eV, it shows that at least part of the carbon contained in the SnCoC-containing material is bonded with a metallic or semi-metallic element present as other constituent element.

Incidentally, in XPS measurement, compensation of an energy axis for spectrum is conducted by use of the peak of C1s, for example. Normally, surface contaminant carbon is present on a surface; in view of this, the peak of C1s of the surface contaminant carbon is assumed to be 284.8 eV, and this is used as an energy reference. In the XPS measurement, the waveform of the peak of C1s is obtained as a waveform which contains both the peak of surface contaminant carbon and the peak of carbon present in the SnCoC-containing material. Therefore, the peak of the surface contaminant carbon and the peak of the carbon present in the SnCoC-containing material are separated by analyzing the waveform by use of a commercially available software, for example. In the waveform analysis, the position of a main peak present on the minimum binding energy side is taken as an energy reference (284.8 eV).

[Separator]

The separator 1 is the same as that in the first embodiment.

[Nonaqueous Electrolyte Solution]

The nonaqueous electrolyte solution contains an electrolyte salt and a nonaqueous solvent for dissolving the electrolyte salt.

The electrolyte salt contains, for example, one or more of light metal compounds such as lithium salts. Examples of the lithium salts include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl) and lithium bromide (LiBr). Among these lithium salts, preferred is at least one selected from the group having lithium hexafluorophosphate, lithium tetrafluoroborate, lithium perchlorate and lithium hexafluoroarsenate, and more preferred is lithium hexafluorophosphate.

Examples of the nonaqueous solvent include lactone solvents such as γ-butyrolactone, γ-valerolactone, δ-valerolactone or ε-caprolactone; carbonate solvents such as ethylene carbonate, propylene carbonate, butylenes carbonate, vinylene carbonate, dimethyl carbonate, ethyl methyl carbonate or diethyl carbonate; ether solvents such as 1,2-dimethoxyethane, 1-ethoxy-2-methoxyethane, 1,2-diethoxyethane, tetrahydrofuran or 2-methyltetrahydrofuran; nitrile solvents such as acetonitrile; sulfolane solvents; phosphoric acids; phosphate solvents; and pyrrolidones. The nonaqueous solvents may be used either singly or as a mixture of two or more of them.

Besides, as the nonaqueous solvent, a mixture of a cyclic carbonate and a liner carbonate is preferably used, and a nonaqueous solvent containing a compound obtained by fluorinating at least one of hydrogen atoms of a cyclic carbonate or linear carbonate is more preferably used. Preferable example of the fluorinated compound include fluoroethylene carbonate (4-fluoro-1,3-dioxolan-2-one: FEC) and difluoroethylene carbonate (4,5-difluoro-1,3-dioxolan-2-one; DFEC). The use of such a fluorinated compound as the nonaqueous solvent ensures that charge-discharge cycle characteristic of the battery can be enhanced even in the case where a negative electrode 22 containing a compound of silicon (Si), tin (Sn), germanium (Ge) or the like is used as the negative electrode active material. Among others, difluoroethylene carbonate is preferable for use as the nonaqueous solvent, since it has an excellent cycle characteristic improving effect.

In addition, the nonaqueous electrolyte solution may be held by a polymer compound to constitute a gel electrolyte. The polymer compound for holding the nonaqueous electrolyte solution may be any polymer compound that is gelled through absorption of the nonaqueous solvent. Examples of such a polymer compound include fluorine-containing polymer compounds such as polyvinylidene fluoride (PVdF) or a copolymer containing vinylidene fluoride (VdF) and hexafluoropropylene (HFP) in repeating units; ether polymer compounds such as polyethylene oxide (PEO) or a crosslinked product containing polyethylene oxide (PEO); and polymer compounds containing polyacrylonitrile (PAN), polypropylene oxide (PPO) or polymethyl methacrylate (PMMA) in repeating units. These polymer compounds may be used either singly or as a mixture of two or more of them.

From the viewpoint of oxidation-reduction stability, particularly, a fluorine-containing polymer compound is desirably used; among others, a copolymer containing vinylidene fluoride and hexafluoropropylene as constituents is preferably used. Furthermore, the copolymer may contain a monoester of an unsaturated bibasic acid such as monomethyl maleate (MMM), a halogenated ethylene such as chlorotrifluoroethylene (PCTFE), a cyclic carbonate of an unsaturated compound such as vinylene carbonate (VC), an epoxy group-containing acryl vinyl monomer or the like as a constituent, whereby more higher characteristics can be obtained.

(3-2) Method of Manufacturing the Nonaqueous Electrolyte Battery

[Method of Producing the Positive Electrode]

The positive electrode active material, the conductive agent and the binder are mixed to prepare a positive electrode mixture, which is dispersed in a solvent such as N-methyl-2-pyrrolidone, to prepare a pasty positive electrode mixture slurry. Next, the positive electrode mixture slurry is applied to the positive electrode current collector 21A, and the solvent is dried off, followed by compression molding by use of a roll press or the like to form the positive electrode active material layer 21B, thereby producing the positive electrode 21.

[Method of Producing the Negative Electrode]

The negative electrode active material and the binder are mixed to prepare a negative electrode mixture, which is dispersed in a solvent such as N-methyl-2-pyrrolidone, to prepare a pasty negative electrode mixture slurry. Next, the negative electrode mixture slurry is applied to the negative electrode current collector 22A, and the solvent is dried off, followed by compression molding by use of a roll press or the like to form the negative electrode active material layer 22B, thereby producing the negative electrode 22.

[Preparation of Nonaqueous Electrolyte Solution]

The nonaqueous electrolyte solution is prepared by dissolving the electrolyte salt in the nonaqueous solvent.

[Assembly of the Nonaqueous Electrolyte Battery]

The positive electrode lead 25 is attached to the positive electrode current collector 21A by welding or the like, and the negative electrode lead 26 is attached to the negative electrode current collector 22A by welding or the like. Thereafter, the positive electrode 21 and the negative electrode 22 are wound, together with the separator 1 in the present application therebetween, to produce the wound electrode body 20.

Subsequently, a tip portion of the positive electrode lead 25 is welded to the safety valve mechanism, and a tip portion of the negative electrode lead 26 is welded to the battery can 11. Thereafter, the wound surfaces of the wound electrode body 20 are clamped between a pair of insulating plates 12 and 13, and the resulting assembly is contained into the inside of the battery can 11. After the wound electrode body 20 is thus contained in the battery can 11, the nonaqueous electrolyte solution is poured into the inside of the battery can 11, to impregnate the separator 1 with the nonaqueous electrolyte solution. Thereafter, the battery lid 13, the safety valve mechanism including the safety valve 14 and the like, and the heat-sensitive resistor element 17 are fixed to the opening end portion of the battery can 11 by caulking, with the gasket 18 therebetween. As a result, the nonaqueous electrolyte battery 10 according to an embodiment of the present application as shown in FIG. 9 is formed.

When this nonaqueous electrolyte battery 10 is charged, for example, lithium ions are released from the positive electrode active material layer 21B, and are occluded into the negative electrode active material layer 22B through the nonaqueous electrolyte solution with which the separator 1 is impregnated. When the nonaqueous electrolyte battery 10 is subjected to discharging, for example, lithium ions are released from the negative electrode active material layer 22B, and are occluded into the positive electrode active material layer 21B through the nonaqueous electrolyte solution with which the separator 1 is impregnated.

In addition, as a modification, a configuration may be adopted in which the base material 2 in the first embodiment is used as the separator, and surface layers similar to the surface layer 3 in the present application are provided on surfaces of the positive electrode 21 and the negative electrode 22.

<Effect>

In the cylindrical nonaqueous electrolyte battery in which the separator in the present application is used, the expansion of the negative electrode attendant on charging can be absorbed by the surface layer 3 of the separator 1. Therefore, rupture of the electrode can be restrained from occurring, without lowering the battery characteristics of the cylindrical nonaqueous electrolyte battery.

4. Fourth Embodiment

In a fourth embodiment, a rectangular type nonaqueous electrolyte battery using the separator according to the first embodiment will be described.

(4-1) Configuration of Nonaqueous Electrolyte Battery

Figure 11:
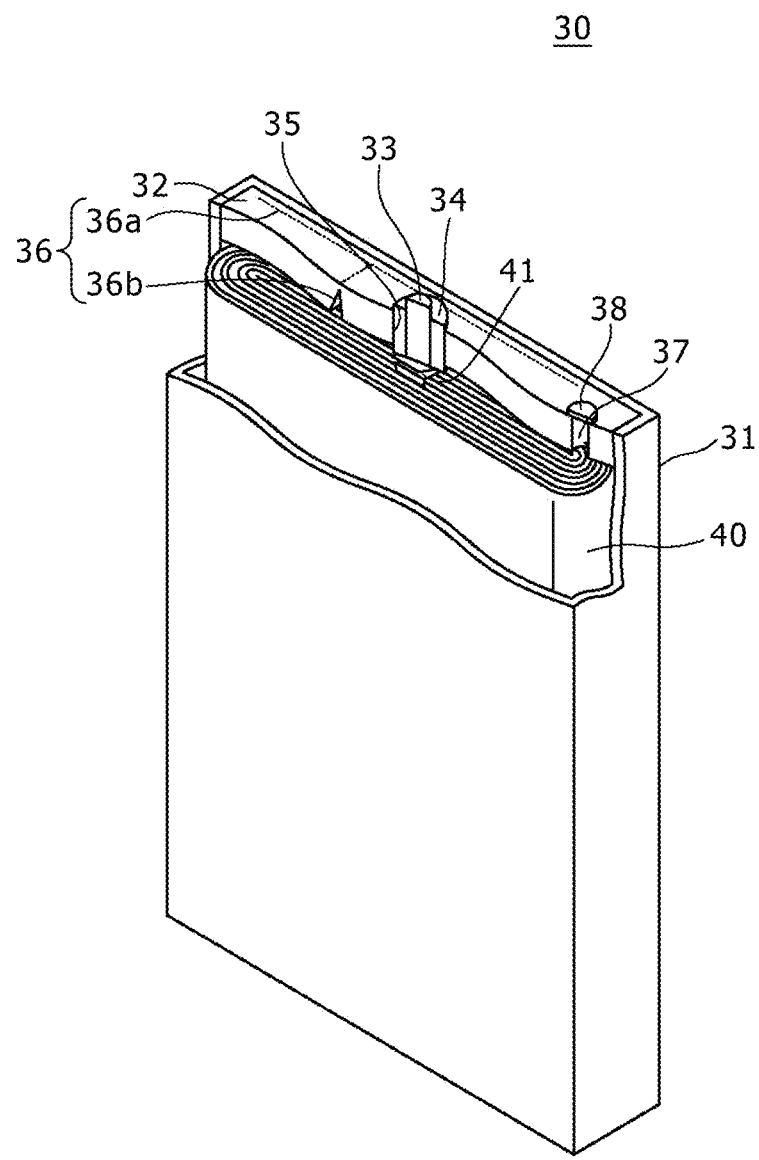
FIG. 11 is a schematic view showing the configuration of a rectangular type nonaqueous electrolyte battery according to a fourth embodiment of the present application.

FIG. 11 illustrates the configuration of a nonaqueous electrolyte battery 30 according to the fourth embodiment. The nonaqueous electrolyte battery is a so-called rectangular type battery, wherein a wound electrode body 40 is contained in a rectangular casing can 31.

The nonaqueous electrolyte battery 30 includes the rectangular casing can 31, the wound electrode body 40 as a power generation element contained in the casing can 31, a battery lid 32 which closes an opening of the casing can 31, and an electrode pin 33 provided at a substantially central portion of the battery lid 32.

The casing can 31 is formed as a hollow bottomed body from a conductive metal such as iron (Fe). The inner surfaces of the casing can 31 has preferably been subjected to such a treatment as nickel plating or coating with a conductive coating material, to enhance the conductivity of the casing can 3. In addition, the outer circumferential surfaces of the casing can 31 may be protected by covering with an outer covering label formed of plastic sheet, paper or the like, or by coating with an insulating coating material. The battery lid 32 is formed from a conductive metal such as iron (Fe), like the casing can 31.

The wound electrode body 40 is configured in the same manner as in the third embodiment, and is obtained by stacking a positive electrode and a negative electrode, with the separator in the present application therebetween, and winding the stack into an oblong shape. In the case where a material containing at least one selected from among metallic and semi-metallic elements as a constituent element is used as a negative electrode active material, a surface layer including a low-porosity layer and a high-porosity layer of the separator in the present application is preferably provided so as to face at least a negative electrode side surface. The positive electrode, the negative electrode, the separator and the nonaqueous electrolyte solution are the same as those in the first embodiment or the third embodiment, and, therefore, detailed descriptions of them are omitted. Besides, a gelled nonaqueous electrolyte layer (gel electrolyte layer) having a nonaqueous electrode solution held by a polymer compound may be formed between the separator and each of the positive electrode and the negative electrode.

The wound electrode body 40 configured as above is provided with a multiplicity of positive electrode terminals 41 connected to a positive electrode current collector, and with a multiplicity of negative electrode terminals connected to a negative electrode current collector. The positive electrode terminals 41 and the negative electrode terminals are all led out to one axial-directional end of the wound electrode body 40. The positive electrode terminals 41 are connected to the lower end of the electrode pin 33 by a firmly attaching section such as welding. In addition, the negative electrode terminals are connected to the inner surface of the casing can 31 by the firmly attaching section such as welding.

The electrode pin 33 has a conductive shaft member, and is held by an insulating body 34, with its head portion protruded at the top end. Through the insulating body 34, the electrode pin 33 is fixed to a substantially central portion of the battery lid 32. The insulating body 34 is formed from a highly insulating material, and is fitted in a through-hole 35 provided on a surface side of the battery lid 32. Besides, the electrode pin 33 is passed through the through-hole 35, and tip portions of the positive electrode terminals 41 are fixed to a bottom surface of the electrode pin 33.

The battery lid 32 provided with the electrode pin 33 and the like as above-mentioned is fitted in the opening of the casing can 31, and contact surfaces of the casing can 31 and the battery lid 32 are joined to each other by the firmly attaching section such as welding. As a result, the opening of the casing can 31 is sealed with the battery lid 32 in a gas-tight and liquid-tight manner. The battery lid 32 is provided with an internal pressure releasing mechanism 36 by which, upon a rise in the pressure inside the casing can 31 to or above a predetermined value, part of the battery lid 32 is broken so that the internal pressure is relieved (released) to the exterior.

The internal pressure releasing mechanism 36 includes two first opening grooves 36a (one of the first opening grooves 36a is not shown) formed in the inner surface of the battery lid 32 so as to extend rectilinearly in the longitudinal direction, and a second opening groove 36b also formed in the inner surface of the battery lid 32 so as to extend in a widthwise direction orthogonal to the longitudinal direction and to communicate at both ends thereof with the two first opening grooves 36a. The two first opening grooves 36a are provided in parallel to each other, in the inner vicinity of two major-edge-side edges located to face each other in the width direction of the battery lid 32, in such a manner as to extend along the major-edge-side outer edges of the battery lid 32. Besides, the second opening groove 36b is provided on longitudinal-directionally one side of the electrode pin 33 so as to be located at a substantially central portion between one minor-edge-side outer edge and the electrode pin 33.

The first opening grooves 36a and the second opening groove 36b are each formed, for example, in such a shape that the sectional shape is a V-shape opening on the lower side. Incidentally, the shapes of the first opening grooves 36a and the second opening groove 36b are not restricted to the V-shape shown in the present embodiment; thus, for example, the shapes of the first opening grooves 36a and the second opening groove 36b may be a U-shape or semicircular shape.

An electrolyte solution inlet 37 is provided to penetrate the battery lid 32. The electrolyte solution inlet 37 is to be used for pouring in the nonaqueous electrolyte solution therethrough after the battery lid 32 and the casing can 31 are caulked to each other, and is sealed with a seal member 38 after the nonaqueous electrolyte solution is poured in. Therefore, in the case of producing the wound electrode body by preliminarily forming a gel electrolyte between the separator and each of the positive electrode and the negative electrode, the electrolyte solution inlet 37 and the seal member 38 may be omitted.

[Separator]

The separator is configured in the same manner as in the first embodiment.

[Nonaqueous Electrolyte Solution]

As the nonaqueous electrolyte solution, the one described in the third embodiment can be used. Besides, a gel electrolyte having a nonaqueous electrolyte solution held by a polymer compound, as described in the third embodiment, may also be used.

(4-2) Method of Manufacturing the Nonaqueous Electrolyte Battery

This nonaqueous electrolyte battery can be manufactured, for example, in the following manner.

[Method of Producing the Positive Electrode and the Negative Electrode]

The positive electrode and the negative electrode can be produced by the same method as in the third embodiment.

[Assembly of the Nonaqueous Electrolyte Battery]

In the same manner as in the third embodiment, the positive electrode and the negative electrode and the separator in the present application are stacked and wound, to produce the wound electrode body 40 wound into an oblong shape. Subsequently, the wound electrode body 40 is contained in the rectangular casing can 31 formed from a metal such as aluminum (Al) or iron (Fe).

Then, the electrode pin 33 provided at the battery lid 32 and the positive electrode terminal 41 led out from the wound electrode body 40 are connected. Thereafter, sealing with the battery lid 32 is conducted, and, for example under a reduced pressure, the nonaqueous electrolyte solution is poured in through the electrolyte solution inlet 37, followed by sealing with the seal member 38. In this manner, the nonaqueous electrolyte battery can be obtained.

In addition, as a modification, a configuration may be adopted in which the base material 2 in the first embodiment is used as the separator, and a layer similar to the surface layer 3 in the present application is provided on each of surfaces of the positive electrode and the negative electrode.

<Effect>

In the fourth embodiment, the same effect as that in the third embodiment can be obtained.

5. Fifth Embodiment

In a fifth embodiment, a laminated film type nonaqueous electrolyte battery using the separator according to the first embodiment will be described.

(5-1) Configuration of the Nonaqueous Electrolyte Battery

Figure 12:
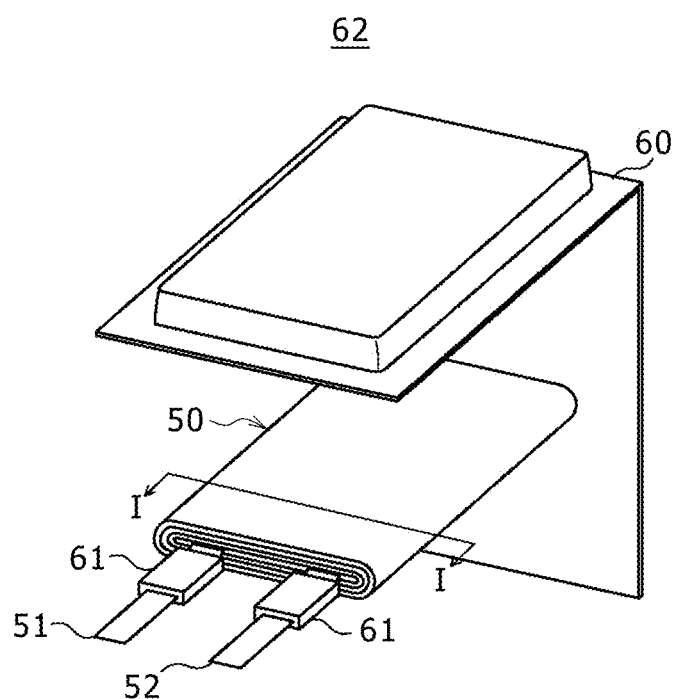
FIG. 12 is an exploded perspective view showing the configuration of a laminated film type nonaqueous electrolyte battery according to a fifth embodiment of the present application.

FIG. 12 shows the configuration of a nonaqueous electrolyte battery 62 according to the fifth embodiment. This nonaqueous electrolyte battery 62 is a so-called laminated film type battery, wherein a wound electrode body 50 with a positive electrode lead 51 and a negative electrode lead 52 attached thereto is contained in the inside of a film-shaped outer covering member 60.

The positive electrode lead 51 and the negative electrode lead 52 are led out, for example, in the same direction from the inside to the outside of the outer covering member 60. The positive electrode lead 51 and the negative electrode lead 52 are formed from a metallic material such as aluminum, copper, nickel or stainless steel, for example, and are formed in the shape of a thin sheet or netting.

The outer covering member 60 is formed, for example, from a laminated film having resin layers formed respectively on both sides of a metallic layer. The laminated film has a structure in which an outside resin layer is formed on that surface of the metallic layer which is exposed to the outside of the battery, and an inside resin layer is formed on that surface of the metallic layer which is on the inside of the battery and which faces a power generation element such as the wound electrode body 50.

The metallic layer plays a most important role of preventing penetration of moisture, oxygen or light from the outside to the inside thereof and protecting the contents on the inside thereof. For the metallic layer, aluminum (Al) is most often used, from the viewpoint of lightness, extensibility, cost, and workability. The outside resin layer has beauty in external appearance, toughness, flexibility and the like, and is formed by use of such a resin material as nylon or polyethylene terephthalate (PET). The inside resin layer is a portion to be melted by heat or ultrasound and fused together; therefore, polyolefin resins are suitable, and non-oriented polypropylene (CPP) is often used, for forming the inside resin layer. An adhesive layer may be provided, if necessary, between the metallic layer and each of the outside resin layer and the inside resin layer.

The outer covering member 60 is provided with a recess for containing the wound electrode body 50. The recess is formed, for example by deep drawing, from the side of the inside resin layer toward the outside resin layer, and the inside resin layer is disposed to face the wound electrode body 50. The facing inside resin layers of the outer covering member 60 are in secure contact with each other at an outer edge portion of the recess, by fusing or the like. A secure contact film 61 is disposed between the outer covering member 60 and each of the positive electrode lead 51 and the negative electrode lead 52, for enhancing the adhesion between the inside resin layer of the outer covering member 60 and each of the positive electrode lead 51 and the negative electrode lead 52 which are formed from a metallic material. The secure contact film 61 is formed from a resin material which is high in property for adhesion to metallic materials; examples of this resin material include polyolefin resins such as polyethylene, polypropylene, modified polyethylene or modified polypropylene.

Incidentally, the outer covering member 60 may be formed by using, in place of the aluminum laminated film in which the metallic layer is formed of aluminum (Al), a laminated film with other structure or a polymer film (e.g., polypropylene film) or a metallic film.

Figure 13:
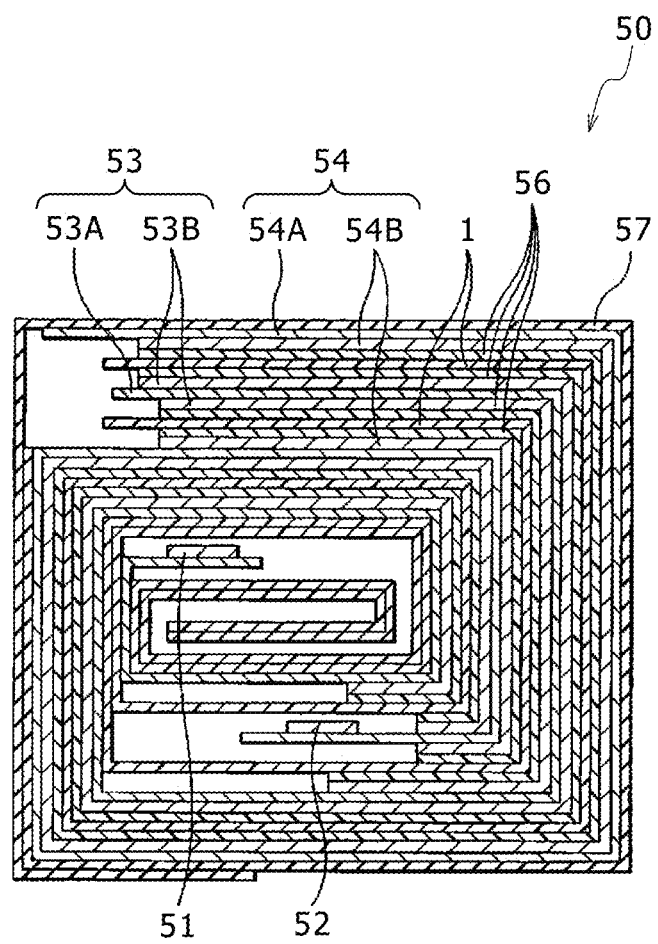
FIG. 13 is a sectional view showing a sectional configuration along line I-I of the wound electrode body shown in FIG. 10.

FIG. 13 shows a sectional structure along line I-I of the wound electrode body 50 shown in FIG. 12. The wound electrode body 50 has a structure in which a positive electrode 53 and a negative electrode 54 stacked together, with a separator 1 and a gel electrolyte 56 therebetween, and are wound. An outermost circumferential portion of the wound electrode body 50 is protected with a protective tape 57, if necessary.

[Positive Electrode]

The positive electrode 53 has a structure in which a positive electrode active material layer 53B is provided on one side, or on each of both sides, of a positive electrode current collector 53A. The configurations of the positive electrode current collector 53A and the positive electrode active material layer 53B are the same as the configurations of the positive electrode current collector 21A and the positive electrode active material layer 21B in the third embodiment described above.

[Negative Electrode]

The negative electrode 54 has a structure in which a negative electrode active material layer 54B is provided on one side, or on each of both sides, of a negative electrode current collector 54A, wherein the negative electrode active material layer 54B is so disposed as to face the positive electrode active material layer 53B. The configurations of the negative electrode current collector 54A and the negative electrode active material layer 54B are the same as the configurations of the negative electrode current collector 22A and the negative electrode active material layer 22B in the third embodiment described above.

[Separator]

The separator 1 is the same as in the first embodiment.

[Nonaqueous Electrolyte]

A gel electrolyte 56 is a nonaqueous electrolyte, includes a nonaqueous electrolyte solution and a polymer compound serving as a holding body for holding the nonaqueous electrolyte solution, and is in a so-called gelled state. A gelled electrolyte is preferable because it makes it possible to obtain a high ionic conductivity and to prevent leakage of liquid from the battery. Incidentally, in the nonaqueous electrolyte battery 62 in the fifth embodiment, the same nonaqueous electrolyte solution as in the third embodiment may be used in place of the gelled electrolyte 56.

(5-2) Method of Manufacturing the Nonaqueous Electrolyte Battery

This nonaqueous electrolyte battery 62 can be manufactured, for example, in the following manner.

[Method of Producing the Positive Electrode and the Negative Electrode]

The positive electrode 53 and the negative electrode 54 can be produced by the same method as in the third embodiment.

[Assembly of the Nonaqueous Electrolyte Battery]

Both surfaces of each of the positive electrode 53 and the negative electrode 54 are coated with a precursor solution containing the nonaqueous electrolyte solution, the polymer compound and a mixed solvent, and the mixed solvent is evaporated off, to form layers of the gel electrolyte 56. Thereafter, the positive electrode lead 51 is attached to an end portion of the positive electrode current collector 53A by welding, and the negative electrode lead 52 is attached to an end portion of the negative electrode current collector 54A by welding.

Next, the positive electrode 53 and the negative electrode 54 provided with the layers of the gel electrolyte 56 are stacked together, with the separator 1 therebetween, to form a stacked body. The stacked body is wound in the longitudinal direction thereof, and the protective tape 57 is adhered to the outermost circumferential portion of the wound body, to form the wound electrode body 50. Finally, for example, the wound electrode body 50 is sandwiched between portions of the outer covering member 60, and outer edge portions of the outer covering member 60 are adhered to each other by heat fusing or the like, to seal the wound electrode body 50 in the outer covering member 60. In this instance, the secure contact film 61 is inserted between the outer covering member 60 and each of the positive electrode lead 51 and the negative electrode lead 52. As a result, the nonaqueous electrolyte battery 62 shown in FIGS. 12 and 13 is completed.

In addition, this nonaqueous electrolyte battery 62 may be produced in the following manner. First, the positive electrode 53 and the negative electrode 54 are produced in the above-mentioned manner, and the positive electrode lead 51 and the negative electrode lead 52 are attached to the positive electrode 53 and the negative electrode 54, respectively. Thereafter, the positive electrode 53 and the negative electrode 54 are stacked together, with the separator 1 therebetween, then the stacked body is wound, and the protective tape 57 is adhered to the outermost circumferential portion of the wound body, to form the wound electrode body 50. Next, the wound electrode body 50 is sandwiched between portions of the outer covering member 60, and the peripheral edges exclusive of one edge of the portions are heat fused to form the outer covering member 60 into a bag-like form, thereby containing the wound electrode body 50 inside the outer covering member 60. Subsequently, an electrolyte composition containing a monomer as raw material for the polymer compound, a polymerization initiator and, optionally, other material such as a polymerization inhibitor together with the nonaqueous electrolyte solution is prepared, and is poured into the inside of the outer covering member 60.

After the electrolyte composition is poured in, the opening of the outer covering member 60 is sealed off by heat fusing in a vacuum atmosphere. Next, heat is applied, to polymerize the monomer into a polymer compound, thereby forming the gel electrolyte 56 in a gelled state. In this manner, the nonaqueous electrolyte battery 62 as shown in FIGS. 12 and 13 is assembled.

Furthermore, in the case where a nonaqueous electrolyte solution is used in place of the gel electrolyte 56 in the nonaqueous electrolyte battery 62, the positive electrode 53 and the negative electrode 54 are stacked together, with the separator 1 therebetween, the stacked body is wound, and the protective tape 57 is adhered to the outermost circumferential portion of the wound body, to form the wound electrode body 50. Next, the wound electrode body 50 is sandwiched between portions of the outer covering member 60, the peripheral edges exclusive of one edge of the portions are heat fused to form the outer covering member 60 into a bag-like form, thereby containing the wound electrode body 50 inside the outer covering member 60. Subsequently, the nonaqueous electrolyte solution is poured into the inside of the outer covering member 60, and the opening of the outer covering member 60 is sealed off by heat fusing in a vacuum atmosphere, to assemble the nonaqueous electrolyte battery 62.

(5-3) Other Example of Laminated Film Type Nonaqueous Electrolyte Battery

Figure 14A:
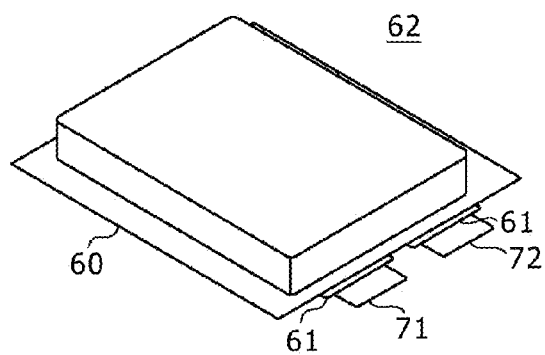
FIGS. 14A to 14C are exploded perspective views showing the configuration of a laminated film type nonaqueous electrolyte battery in which a stacked electrode body is used.
Figure 14B:
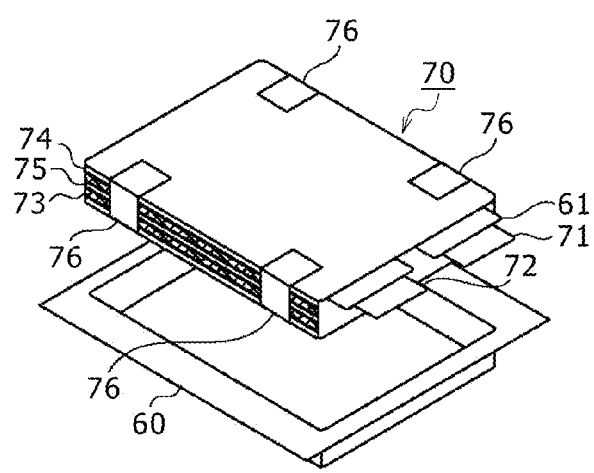
Figure 14C:
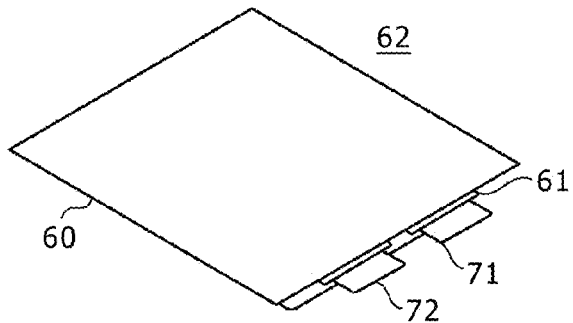

While the nonaqueous electrolyte battery 62 having the wound electrode body 50 covered with the outer covering member 60 has been described in the fifth embodiment, a stacked electrode body 70 may be used in place of the wound electrode body 50, as shown in FIGS. 14A to 14C. FIG. 14A shows an outer appearance of a nonaqueous electrolyte battery 62 in which the stacked electrode body 70 is contained; FIG. 14B is an exploded perspective view showing the manner in which the stacked electrode body 70 is contained in the outer covering member 60; and FIG. 14C is an external appearance view, as viewed from the bottom side, of the nonaqueous electrolyte battery 62 shown in FIG. 14A.

The stacked electrode body 70 has a structure in which a positive electrode 73 and a negative electrode 74 which are rectangular are stacked together, with a separator 75 therebetween, and the stacked electrode body 70 is fixed by use of fixing members 76. A positive electrode lead 71 connected to the positive electrode 73 and a negative electrode lead 72 connected to the negative electrode 74 are led out from the stacked electrode body 70, and a secure contact film 61 is provided between the outer covering member 60 and each of the positive electrode lead 71 and the negative electrode lead 72. The separator 75 is immersed by the nonaqueous electrolyte solution. In addition, for example, a gel electrolyte layer may be formed on the surfaces of the positive electrode 73 and the negative electrode 74.

Incidentally, the method of forming the gel electrolyte or the method of pouring the nonaqueous electrolyte solution and the method of heat fusing the outer covering member 60 are the same as in the case of using the wound electrode body 50 described in (5-2).

Besides, as a modification, a configuration may be adopted in which the base material 2 in the first embodiment is used as the separator, and a layer similar to the surface layer 3 in the present application is provided on each of the surfaces of the positive electrode 53 and the negative electrode 54, or the positive electrode 73 and the negative electrode 74.

<Effect>

In the fifth embodiment, the same effect as in the third embodiment can be obtained. Particularly, in a battery in which a laminated film is used as an outer covering material, a holding effect on the electrode body as that of a metallic can is small, so that a burden may be exerted on the electrode body, due to vibrations during transportation of the battery, for example. When the separator having the surface layer as in the present application is used, on the other hand, it is possible to obtain a restraining effect on rupture or breakage of the current collector due to vibrations during transportation or the like.

6. Sixth Embodiment

In a sixth embodiment, a battery pack provided with nonaqueous electrolyte batteries using the separator according to the first embodiment will be described.

Figure 15:
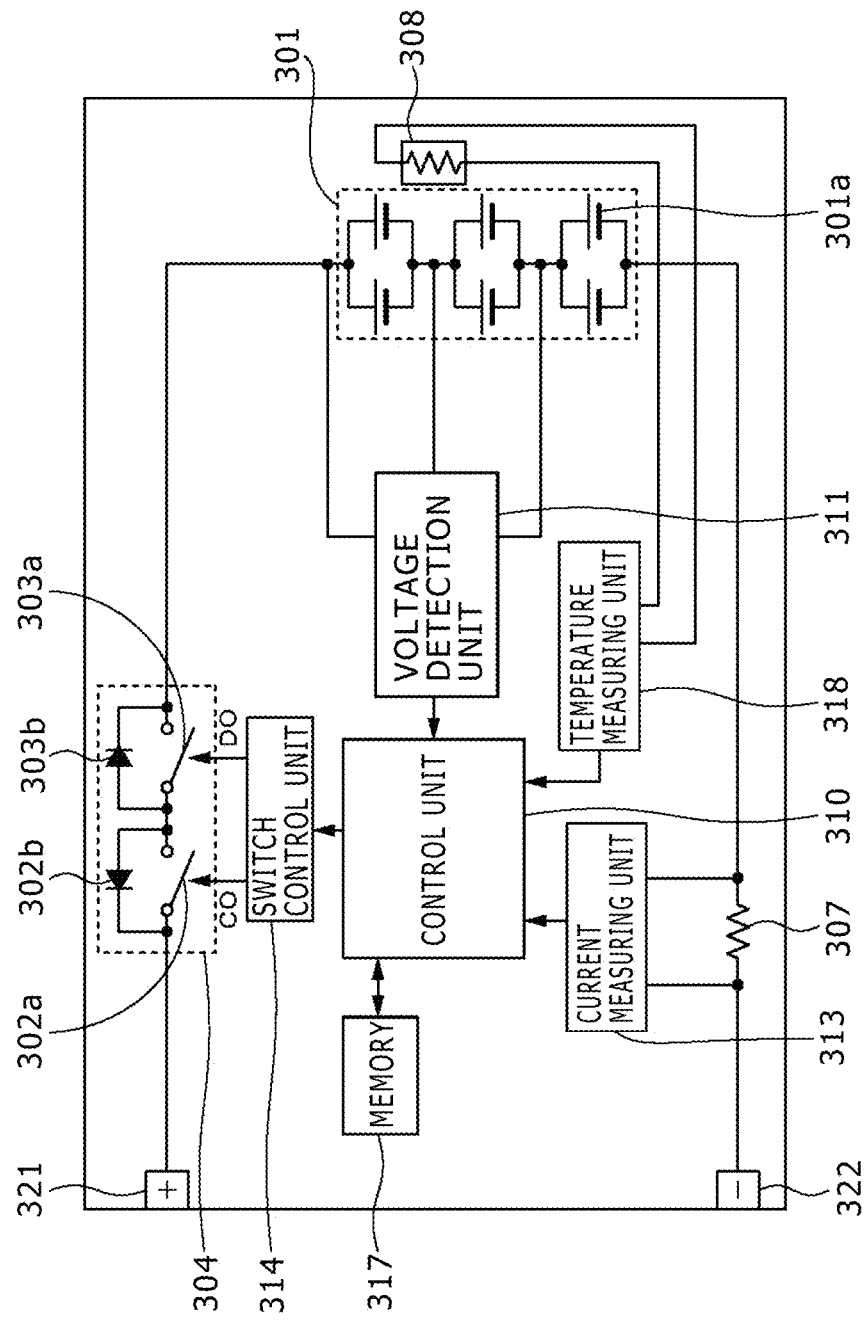
FIG. 15 is a block diagram showing an example of circuit configuration of a battery pack according to an embodiment of the present application.

FIG. 15 is a block diagram showing an example of circuit configuration in the case where the nonaqueous electrolyte battery in the present application is applied to a battery pack. The battery pack includes a battery assembly 301, a casing, a switch unit 304 including a charging control switch 302a and a discharging control switch 303a, a current detecting resistor 307, a temperature detecting element 308, and a control unit 310.

In addition, the battery pack includes a positive electrode terminal 321 and a negative electrode terminal 322. At the time of charging, the positive electrode terminal 321 and the negative electrode terminal 322 are connected respectively to a positive electrode terminal and a negative electrode terminal of a charger, and charging is conducted. Besides, at the time of using an electronic apparatus, the positive electrode terminal 321 and the negative electrode terminal 322 are connected respectively to a positive electrode terminal and a negative electrode terminal of the electronic apparatus, and discharging is performed.

The battery assembly 301 has a plurality of nonaqueous electrolyte batteries 301a connected in series and/or in parallel. The nonaqueous electrolyte batteries 301a are the nonaqueous electrolyte batteries according to an embodiment of the present application. Incidentally, while a case wherein six nonaqueous electrolyte batteries 301a are connected in a two-in-parallel three-in-series (2P3S) pattern is shown in FIG. 15, any other connection method of connecting the batteries in an n-in-parallel m-in-series (n and m are integers) pattern may be adopted.

The switch unit 304 includes the charging control switch 302a and a diode 302b as well as the discharging control switch 303a and a diode 303b, and is controlled by the control unit 310. The diode 302b has a polarity which is in reverse direction relative to a charging current flowing in the direction from the positive electrode terminal 321 toward the battery assembly 301 and which is in forward direction relative to a discharging current flowing in the direction from the negative electrode terminal 322 toward the battery assembly 301. The diode 303b has a polarity which is in forward direction relative to a charging current and which is in reverse direction relative to a discharging current. Incidentally, while the switch unit is provided on the plus (+) side in this example, it may be provided on the minus (−) side.

The charging control switch 302a is controlled by the control unit 310 so as to be turned OFF when the battery voltage reaches an overcharge detection voltage, whereby a charging current is prevented from flowing into a current path of the battery assembly 301. After the charging control switch 302a is turned OFF, only discharging is permitted to take place through the diode 302b. In addition, the charging control switch 302a is controlled by the control unit 310 so as to be turned OFF when a large current flows during charging, whereby a charging current flowing into the current path of the battery assembly 301 is cut off.

The discharging control switch 303a is controlled by the control unit 310 so as to be turned OFF when the battery voltage reaches an overdischarge detection voltage, whereby a discharge current is prevented from flowing in the current path of the battery assembly 301. After the discharging control switch 303a is turned OFF, only charging is permitted to take place through the diode 303b. Besides, the discharging control switch 303a is controlled by the control unit 310 so as to be turned OFF when a large current flows during discharging, whereby a discharge current flowing in the current path of the battery assembly 301 is cut off.

The temperature detection element 308 is, for example, a thermistor, is provided in the vicinity of the battery assembly 301, measures the temperature of the battery 301, and supplies the measured temperature to the control unit 310. A voltage detection unit 311 measures the voltages of the battery assembly 301 and the nonaqueous electrolyte batteries 301a constituting the battery assembly 301, performs A/D conversion of the measured voltages, and supplies the converted voltage values to the control unit 310. A current measuring unit 313 measures a current by use of a current detection resistor 307, and supplies the measured current to the control unit 310.

Based on the voltages and the current inputted from the voltage detection unit 311 and the current measuring unit 313, a switch control unit 314 controls the charging control switch 302a and the discharging control switch 303a in the switch unit 304. When the voltage of any of the nonaqueous electrolyte batteries 301a is lowered to or below the overcharge detection voltage or the overdischarge detection voltage and when a large current flows abruptly, the switch control unit 314 sends a control signal to the switch unit 304, whereby overcharge, overdischarge and overcurrent charging/discharging are prevented from occurring.

Here, for example, in the case where the nonaqueous electrolyte battery is a lithium ion secondary battery, the overcharge detection voltage is set to be, for example, 4.20 V±0.05 V, and the overdischarge detection voltage is set to be, for example, 2.4 V±0.1 V.

As the charging/discharging control switches, for example, semiconductor switches such as MOSFETs can be used. In this case, parasitic diodes of the MOSFETs function as the diodes 302b and 303b. Where P-channel FETs are used as the charging/discharging control switches, the switch control unit 314 supplies control signals DO and CO respectively to respective gates of the charging control switch 302a and the discharging control switch 303a. Where the charging control switch 302a and the discharging control switch 303a are of the P-channel type, they are turned ON by a gate potential lower than a source potential by not less than a predetermined value. In other words, during normal charging and discharging operations, the control signals CO and DO are set at a low level, whereby the charging control switch 302a and the discharging control switch 303a are kept in an ON state.

In case of overcharge or overdischarge, for example, the control signals CO and DO are set to a high level, whereby the charging control switch 302a and the discharging control switch 303a are put into an OFF state.

A memory 317 may be composed of a RAM or ROM; for example, it is composed of an EPROM (Erasable Programmable Read Only Memory), which is a nonvolatile memory. In the memory 317, numerical values obtained through arithmetic operations by the control unit 310, internal resistance values of the nonaqueous electrolyte batteries 301a in the initial state measured at the stage of production process, etc. are preliminarily stored, and can be rewritten, as required. In addition, a fully charged capacity of the nonaqueous electrolyte battery 301a may be preliminarily stored in the memory 317, whereby it is possible to calculate, for example, a residual capacity of the nonaqueous electrolyte battery 301a, in cooperation with the control unit 310.

In a temperature detection unit 318, temperature is measured by use of the temperature detection element 308, whereby a charging/discharging control is conducted upon abnormal heat generation, or compensation in calculation of the residual capacity is performed.

7. Seventh Embodiment

In a seventh embodiment, description will be made of such apparatuses as an electronic apparatus, an electric vehicle and an electrical energy storage device on which the nonaqueous electrolyte batteries according to the third to fifth embodiments and the battery pack according to the sixth embodiment are mounted. The nonaqueous electrolyte batteries and the battery pack described in the third to sixth embodiment can be used for supplying electric power to such apparatuses as electronic apparatuses, electric vehicles and electrical energy storage devices.

Examples of the electronic apparatuses include notebook-sized personal computers, PDAs (Personal Digital Assistants), cellphones, portable handsets of cordless phones, video movies, digital still cameras, e-books, electronic dictionaries, music players, radio sets, headphones, game players, navigation systems, memory cards, pacemakers, hearing aids, electric power tools, electric shavers, refrigerators, air conditioners, television sets, stereophonic sound systems, water heaters, microwaves, dish washers, washing machines, driers, lighting apparatuses, toys, medical apparatuses, robots, load conditioners, and signals.

In addition, examples of the electric vehicles include railroad vehicles, golf carts, electric carts, and electric automobiles (inclusive of hybrid cars), and the nonaqueous electrolyte batteries and battery pack are used as a driving power source or an auxiliary power source for these electric vehicles.

Examples of the electrical energy storage devices include electric power-accumulating power sources for use in houses or other buildings or in power generation facilities.

Among the above-mentioned application examples, specific examples of an electrical energy storage system using the electrical energy storage device to which the nonaqueous electrolyte battery in the present application is applied will be described below.

The electrical energy storage system may, for example, be configured as follows. A first electrical energy storage system is an electrical energy storage system in which the electrical energy storage device is charged by a power generation device which generates electric power from renewable energy. A second electrical energy storage system is an electrical energy storage system in which the electrical energy storage device is provided and electric power is supplied to an electronic apparatus connected to the electrical energy storage device. A third electrical energy storage system is an electronic apparatus supplied with electric power from the electrical energy storage device. These electrical energy storage systems are each embodied as a system for contriving efficient supply of electric power in cooperation with an external electric power supply network.

In addition, a fourth electrical energy storage system is an electric vehicle including a converter which is supplied with electric power from the electrical energy storage device and converts the electric power into a driving force for the vehicle, and a controller which performs information processing related to vehicle control on the basis of information about the electrical energy storage device. A fifth electrical energy storage system is an electric power system which includes a power information transmission/reception unit for transmitting and receiving signals to and from other apparatus by way of a network, and in which charging/discharging control on the electrical energy storage device is performed based on information received by the transmission/reception unit. A sixth electrical energy storage system is an electric power system which is supplied with electric power from the electrical energy storage device or in which electric power is supplied to the electrical energy storage device from a power generation device or an electric power network. Now, the electrical energy storage systems will be described below.

(7-1) Electrical Energy Storage System in a House, as Application Example

Figure 16:
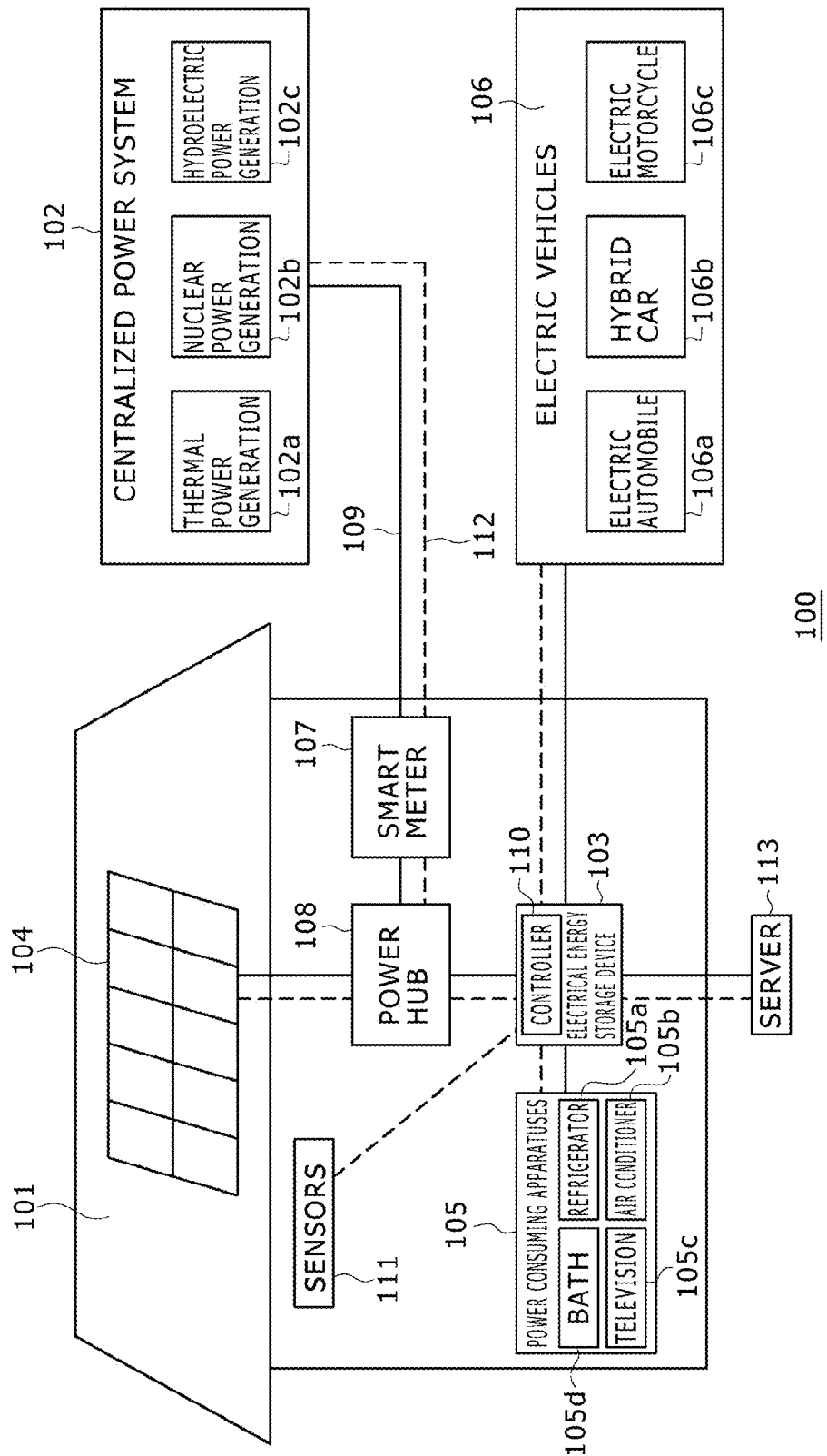
FIG. 16 is a schematic view showing an application of the nonaqueous electrolyte battery according to an embodiment of the present application to an electrical energy storage system for home use.

An example in which the electrical energy storage device using the nonaqueous electrolyte battery in the present application is applied to an electrical energy storage system for houses will be described below, referring to FIG. 16. For example, in an electrical energy storage system 100 for a house 101, electric power is supplied to an electrical energy storage device 103 from a centralized power system 102 such as thermal power generation 102a, nuclear power generation 102b or hydroelectric power generation 102c by way of an electric power network 109, an information network 112, a smart meter 107, a power hub 108 and the like. In addition, electric power is supplied to the electrical energy storage device 103 from an independent power source such as a home power generation device 104. The electric power supplied to the electrical energy storage device 103 is stored. Electric power to be used in the house 101 is fed by use of the electrical energy storage device 103. This electrical energy storage system is not restricted to the house 101, and a similar electrical energy storage system can also be used for buildings.

The house 101 is provided therein with the home power generation device 104, power consuming apparatuses 105, the electrical energy storage device 103, a controller 110 for controlling the apparatuses, the smart meter 107, and sensors 111 for picking up various kinds of information. The apparatuses are connected by the electric power network 109 and the information network 112. Solar cells, fuel cells or the like are utilized as the home power generation device 104, and the electric power thus generated is supplied to the power consuming apparatuses 105 and/or the electrical energy storage device 103. The power consuming apparatuses 105 include refrigerator 105a, air conditioner 105b, television set 105c, and bath 105d. Further, the power consuming apparatuses 105 include electric vehicles 106. The electric vehicles 106 include electric automobile 106a, hybrid car 106b, and electric motorcycle 106c.

The nonaqueous electrolyte battery according to an embodiment of the present application is applied to the electrical energy storage device 103. The nonaqueous electrolyte battery in the present application may, for example, be composed of the above-mentioned lithium ion secondary battery. The smart meter 107 has the function to measure the amount of commercial power consumed and to transmit the measured power consumption to an electric power company. The electric power network 109 may be based on one of DC (direct current) power supply, AC (alternative current) power supply and non-contact power supply, or a combination of two or more of them.

The sensors 111 include, for example, human sensor, luminance sensor, object detection sensor, power consumption sensor, vibration sensor, contact sensor, temperature sensor, and IR sensor. The pieces of information picked by the sensors 111 are transmitted to the controller 110. Based on the information transmitted from the sensors 111, the weather condition and human conditions and the like are grasped, and the power consuming apparatuses 105 are automatically controlled, whereby energy consumption can be minimized. Furthermore, the controller 110 can transmit information about the house 101 to an external electric power company or the like through internet.

Processings such as branching of electric power lines and DC-AC conversion are carried out by the power hub 108. Examples of the transmission system for the information network 112 connected to the controller 110 include methods in which a communication interface such as UART (Universal Asynchronous Receiver-Transmitter) is used, and methods in which a sensor network based on a radio communication standard such as Bluetooth, ZigBee, and Wi-Fi. The Bluetooth system is applied to multimedia communication, wherein one-to-many connection type communication can be performed. ZigBee uses a physical layer according to IEEE (Institute of Electrical and Electronics Engineers) 802.15.4, which is a name for a short-distance radio network standard called PAN (Personal Area Network) or W (Wireless) PAN.

The controller 110 is connected to an external server 113. The server 113 may be managed by one of the house 101, the electric power company and a service provider. Examples of the information transmitted or received by the server 113 include power consumption information, life pattern information, power rate, weather information, natural disaster information, and information about power transaction. Transmission and reception of these kinds of information may be conducted from/to a power consuming apparatus (e.g., TV set) in the inside of the home or from/to a device (e.g., cellphone or the like) in the outside of the home. These pieces of information may be displayed, for example, on a TV set, a cellphone, a PDA or the like.

The controller 110 for controlling the devices or apparatuses includes a CPU (Central Processing Unit), a RAM (Random Access Memory), and a ROM (Random Access Memory), and, in this example, it is contained in the electrical energy storage device 103. The controller 110 is connected with the electrical energy storage device 103, the home power generation device 104, the power consuming apparatuses 105, the sensors 111, and the server 113 through the information network 112, and has the function to control, for example, the amount of commercial power used and the amount of power generated. Incidentally, the controller 110 may further have other functions such as a function to perform power transactions on an electric power market.

Thus, not only the power supplied from the centralized power system 102 such as thermal power generation 102a, nuclear power generation 102b and hydroelectric power generation 102c but also the power generated by the home power generation device 104 (photovoltaic power generation, wind power generation) can be stored in the electrical energy storage device 103. Therefore, even when the power generated by the home power generation device 104 fluctuates, it is possible to perform such a control as to keep constant the quantity of power transmitted to the exterior or to discharge electric power in a quantity required. For example, a mode of use can be realized in which the power obtained by photovoltaic power generation is stored in the electrical energy storage device 103, and nighttime power with a low rate is stored in the electrical energy storage device 103 at night, whereas the power thus stored in the electrical energy storage device 103 is discharged for use in the daytime when the power rate is high.

Incidentally, while an example in which the controller 110 is contained in the electrical energy storage device 103 has been described in the present example, the controller 110 may be contained in the smart meter 107, or may be configured independently. Furthermore, the electrical energy storage system 100 may be used for a plurality of homes in an apartment house or for a plurality of independent houses.

(7-2) Electrical Energy Storage System in a Vehicle, as Application Example

Figure 17:
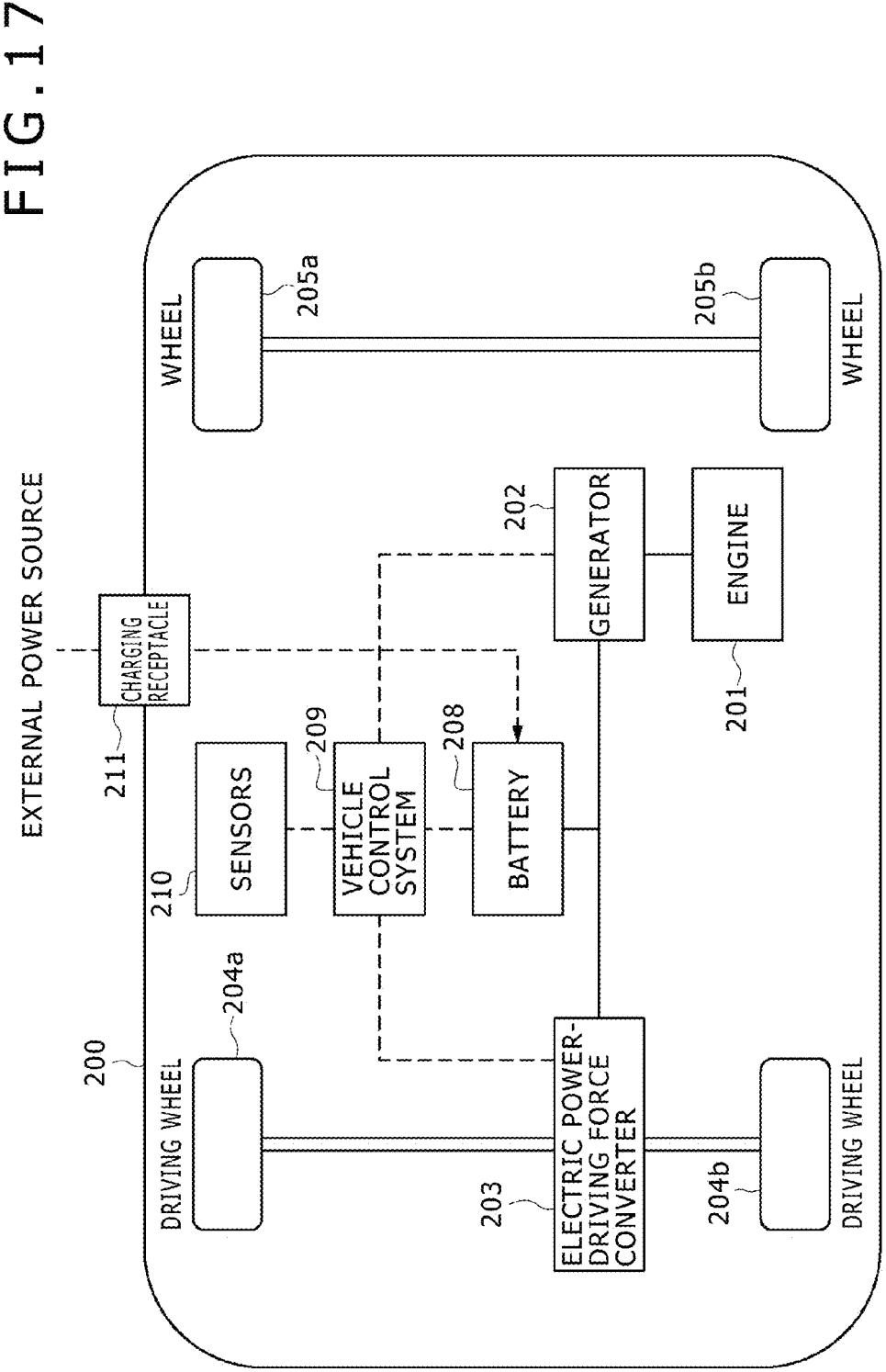
FIG. 17 is a schematic view showing schematically an example of the configuration of a hybrid vehicle adopting a series hybrid system to which an embodiment of the present application is applied.

An example of application of the present application to an electrical energy storage system for a vehicle will be described below, referring to FIG. 17. FIG. 17 schematically shows the configuration of a hybrid vehicle adopting a series hybrid system to which the present application is applied. A series hybrid system refers to a vehicle which travels through the function of an electric power-to-driving force converter while using electric power generated by a generator actuated by an engine or using the electric power thus generated and once stored in a battery.

The hybrid vehicle 200 includes, mounted thereon, an engine 201, a generator 202, an electric power-driving force converter 203, a driving wheel 204a, a driving wheel 204b, a wheel 205a, a wheel 205b, a battery 208, a vehicle control system 209, sensors 210, and a charging receptacle 211. The nonaqueous electrolyte battery in the present application as above-described is applied to the battery 208.

The hybrid vehicle 200 travels by use of the electric power-driving force converter 203 as a motive power source. An example of the electric power-driving force converter 203 is a motor. The electric power-driving force converter 203 is actuated by the electric power supplied from the battery 208, and the rotating force of the electric power-driving force converter 203 is transmitted to the driving wheels 204a and 204b. Incidentally, with DC-AC conversion or AC-DC conversion used at required parts, both an AC motor and a DC motor can be applied to the electric power-driving force converter 203. The sensors 210 are used for controlling the engine rotating speed, for controlling the opening (throttle position) of a throttle valve (not shown) or for other purposes, through the function of the vehicle control system 209. The sensors 210 include a velocity sensor, an acceleration sensor, and an engine rotating speed sensor.

The rotating force of the engine 201 is transmitted to the generator 202, and the electric power generated by the generator 202 actuated by the rotating force can be stored in the battery 208.

When the hybrid vehicle 200 is decelerated by a braking mechanism (not shown), a resisting force during the deceleration is applied as a rotating force to the electric power-driving force converter 203, and regenerative electric power generated by the electric power-driving force converter 203 actuated by this rotating force is stored in the battery 208.

When the battery 208 is connected to a power source external to the hybrid vehicle 200, the electric power can be supplied from the external power source to the battery 208 through the charging receptacle 211 as an input port, whereby the electric power thus supplied can be stored in the battery 208.

Though not shown, an information processing device may be provided which performs information processing related to vehicle control on the basis of information about the nonaqueous electrolyte batteries. Examples of such an information processing device include an information processing device which functions to display the residual battery capacity on the basis of the information about the residual capacities of the batteries.

Thus, a series hybrid vehicle which travels through the function of a motor while using the electric power generated by a generator actuated by an engine or using the electric power thus generated and once stored in a battery has been described above as an example of application of the present application. However, the present application can be effectively applied also to a parallel hybrid vehicle in which an output of an engine and an output of a motor are both utilized as drive source and in which three modes, namely, a mode of traveling based only on the engine, a mode of traveling based only on the motor, and a mode of traveling based on both the engine and the motor, are selectively used through switching, as desired. Furthermore, the present application can effectively applied also to a so-called electric vehicle which travels through driving by only a driving motor, without use of an engine.

EXAMPLES

Now, the present application will be described in detail based on Examples, but the configuration of the present application is not to be restricted to the following Examples.

<Example 1-1> to <Example 1-18> and <Comparative Example 1-1> to <Comparative Example 1-3>

In Examples 1-1 to 1-18 and Comparative Examples 1-1 to 1-3, evaluation of battery characteristics was conducted by using separators having a base material provided on both sides thereof with surface layers formed by varying a rugged surface shape, an arithmetic mean roughness Sa or the like.

Example 1-1

Fabrication of Positive Electrode

A positive electrode mixture was prepared by mixing 91% by mass of lithium cobaltate ($LiCoO_2$) as a positive electrode active material, 6% by mass of carbon black as a conductive material and 3% by mass of polyvinylidene fluoride (PVdF) as a binder. The positive electrode mixture was dispersed in N-methyl-2-pyrrolidone (NMP) used as a dispersing medium, to form a positive electrode mixture slurry. The positive electrode mixture slurry was applied to both sides of a positive electrode current collector composed of a 12 nm-thick strip-shaped aluminum foil in such a manner that part of the positive electrode current collector was left exposed. Thereafter, the dispersing medium of the positive electrode mixture slurry thus applied was evaporated off, followed by compression molding by a roll press, to form a positive electrode active material layer. Finally, a positive electrode terminal was attached to the exposed part of the positive electrode current collector, to form a positive electrode.

[Fabrication of Negative Electrode]

First, a silicon based material $SiO_x$ (core part) was obtained by a gas atomizing method. Thereafter, a silicon based material $SiO_y$ (coating part) lower in crystallinity than the core part was deposited on a surface of the core part by a powder vapor deposition method, to obtain a negative electrode active material. In the core part, the half-value width was 0.6°, the crystallite size was 90 nm, and the mean particle diameter was 4 μm; in the coating part, the mean thickness was 500 nm, and the mean coverage was 70%.

Incidentally, in the case of forming the silicon based material ($SiO_x$) of the core part, the quantity of oxygen introduced during melting and solidification of the raw material (silicon) was regulated, to control the composition (oxidized state). In the case of forming the silicon based material ($SiO_y$) of the coating part, the quantity of oxygen or hydrogen introduced during deposition of the raw material (silicon) was regulated, to control the composition. In the power vapor deposition method, a deflection type electron-beam evaporation source was used, the deposition rate was 2 nm/sec, and a vacuum condition at a pressure of $1\times10^{-3}$ Pa was created by a turbo molecular pump.

A negative electrode mixture was prepared by mixing 80% by mass of a silicon based material as a negative electrode active material and 20% by mass (on dry basis) of a polyamic acid solution as a precursor of a polyimide serving as a binder. The negative electrode mixture was dispersed in N-methyl-2-pyrrolidone (NMP) used as a dispersing medium, to produce a negative electrode mixture slurry. Incidentally, NMP and N,N-dimethylacetamide (DMAC) were used as solvents for the polyamic acid solution. The negative electrode mixture slurry was applied to both sides of a negative electrode current collector composed of a 15 μm-thick strip-shaped copper foil in such a manner that part of the negative electrode current collector was left exposed. Thereafter, the dispersing medium of the negative electrode mixture slurry thus applied was evaporated off, followed by compression molding by use of a roll press and baking at 400° C. in a vacuum atmosphere for one hour. By this, the polyimide as the binder was produced, and a negative electrode active material layer was formed. Finally, a negative electrode terminal was attached to the exposed part of the negative electrode current collector, to obtain a negative electrode.

[Fabrication of Separator]

A 13 μm-thick porous film of polyethylene (PE) was used as a base material. Surface layers were formed respectively on both sides of the base material in the following manner. First, alumina ($Al_2O_3$) having a mean particle diameter of 0.5 μm as inorganic particles and polyvinylidene fluoride (PVdF) as a resin material were mixed in a mass ratio of 9:1, and the mixture was dispersed in N-methyl-2-pyrrolidone (NMP), to prepare a resin solution. The mean particle diameter D of the inorganic particles is a median diameter (D50) of the particle diameter measured by laser diffractometry.

Subsequently, the resin solution was transferred onto each of both sides of the base material in such a manner as to obtain a rugged surface shape in a pyramidal pattern. Then, 70° C. hot air was blown to the resin solution applied to the base material, to evaporate off N-methyl-2-pyrrolidone. As a result, a separator was obtained in which surface layers each having a thickness of 5.5 μm (total thickness of both sides: 11 μm), having a rugged surface shape in a pyramidal pattern, and containing the inorganic particles and the resin material were provided respectively on both sides of the base material.

In this case, the resin solution was transferred in such a manner that the separator surface had the arithmetic mean roughness Sa of 1.1 μm, whereby the rugged surface shape was produced. Incidentally, the arithmetic mean roughness Sa was calculated by measuring the surface shape by a non-contact type surface shape measurement system VertScan (made by Ryoka Systems Inc.) based on a photo interference method. The measurement region was 469.84 nm×353.06 nm.

In addition, the compression ratio of the surface layers was 0.4. The compression ratio was calculated as B/A, where A is the thickness of the surface layer (the surface layer separated from the base material) under a load of 3.57 N/cm$^2$, and B is the collapse amount of the surface layer under a load of 4000 N/cm$^2$.

The compression ratio was calculated in the following manner. First, a cylindrical super-rigid pellet having a contact area of 0.25 cm$^2$ was placed on the surface layer to be measured. Next, the surface layer was compressed at a rate of 0.1 mm/min by a compression tester, to obtain the thickness of the surface layer under a load of 3.57 N/cm$^2$. Subsequently, the thickness of the surface layer under a load of 4000 N/cm$^2$ was measured in the same manner. From the difference between the surface layer thickness under the load of 3.57 N/cm$^2$ and the surface layer thickness under the load of 4000 N/cm$^2$, the collapse amount under the load of 4000 N/cm$^2$ was obtained.

The measurement of the collapse amount as just-mentioned was carried out for each of the cases where the number of the surface layer(s) was changed from one to 5, 10, 15 and 20, respectively. The data thus obtained were plotted in a diagram in which the number of the surface layers is taken on the axis of abscissas, and the collapse amount under the load of 4000 N/cm$^2$ is taken on the axis of ordinates. The data thus plotted were subjected to straight-line approximation by the least squares method, the inclination of the straight line was calculated, and the inclination was adopted as the collapse amount per surface layer.

In addition, the ratio T/D of the surface layer thickness (the total thickness of the surface layers on both sides of the base material) T to the mean particle diameter D of the inorganic particles was 22. In this case, the surface layer had a rugged surface shape, and did not have a uniform thickness. The surface layer thickness (the total thickness of the surface layers on both sides) T was the surface layer thickness when a load of 1 N was exerted on the surface layers by use of a circular flat surface indenting tool having a diameter of 6 mm.

[Preparation of Nonaqueous Electrolyte Solution]

In a nonaqueous solvent formed by mixing ethylene carbonate (EC), vinylene carbonate (VC) and diethyl carbonate (DEC) in a mass ratio of 30:10:60, lithium hexafluorophosphate (LiPF$_6$) as an electrolyte salt was dissolved in a concentration of 1 mol/dm$^3$, to prepare a nonaqueous electrolyte solution.

[Assembly of Cylindrical Type Battery]

A positive electrode, a negative electrode, and a separator provided on each of both sides thereof with a surface layer having a rugged surface shape were stacked together in the order of the positive electrode, the separator and the negative electrode. The stacked body was wound a large number of times in the longitudinal direction thereof, and a winding finish portion was fixed by a pressure sensitive adhesive tape, to form a wound electrode body. Next, a positive electrode terminal was joined to a safety valve bonded to a battery lid, and a negative electrode lead was connected to a negative electrode can. The wound electrode body was clamped between a pair of insulating plates, the assembly was contained in the inside of a battery can, and thereafter a center pin was inserted into the center of the wound electrode body.

Subsequently, the nonaqueous electrolyte solution was poured from above the insulating plate into the inside of the cylindrical battery can. Finally, a safety valve mechanism (including the safety valve, a disk holder, and a shut-off disk), a PTC element and the battery lid were mounted in the opening of the battery can, and were caulked to seal off the opening, with an insulating seal gasket therebetween. As a result, a cylindrical type battery as shown in FIG. 9, having a diameter of 18 mm, a height of 65 mm (ICR18650 size) and a battery capacity of 3500 mAh was fabricated.

Example 1-2

A cylindrical type battery was fabricated in the same manner as in Example 1-1, except that the rugged surface shape of the separator surface had a pattern of ridges extending in the widthwise direction (TD direction) of the separator, with an arithmetic mean roughness Sa of 1.1 μm. In Example 1-2, the compression ratio of the surface layer was 0.4.

The separator in Example 1-2 was formed in the following manner. The same resin solution as in Example 1-1 was applied to both sides of the base material, in the same thickness and uniformly. Subsequently, a comb-shaped squeegee with a pitch of 0.5 mm was put on the resin solution, and a rugged shape with a pattern of ridges extending in the widthwise direction (TD direction) of the separator was formed on each side of the base material. Finally, 70° C. hot air was blown to the resin solution on the surfaces of the base material to evaporate off N-methyl-2-pyrrolidone, to obtain a separator in which a surface layer containing inorganic particles and a resin material and having a rugged surface shape with a pattern of ridges was provided on each side of the base material. Incidentally, the base material of the separator was formed by stretching in the longitudinal direction thereof, with the longitudinal direction (winding direction) being MD direction and the widthwise direction being TD direction.

Example 1-3

A cylindrical type battery was fabricated in the same manner as in Example 1-1, except that the rugged surface shape of the separator surface had a pattern of ridges extending in the longitudinal direction (MD direction) of the separator, with an arithmetic mean roughness Sa of 1.2 μm. In Example 1-3, the compression ratio of the surface layer was 0.4.

The separator in Example 1-3, having surface layers with a pattern of ridges, was formed by the same method as in Example 1-2, except that a comb-shaped squeegee with a pitch of 0.5 mm was used to form a rugged surface shape with a pattern of ridges extending in the longitudinal direction (MD direction) of the separator.

Example 1-4

A cylindrical type battery was fabricated in the same manner as in Example 1-3, except that in forming the surface layers having a rugged surface shape with a pattern of ridges, the force with which the squeegee was pressed against the resin solution was so controlled that the arithmetic mean roughness Sa of the separator surfaces would be 1.5 μm. In Example 1-4, the compression ratio of the surface layer was 0.5.

Example 1-5

A cylindrical type battery was fabricated in the same manner as in Example 1-3, except that in forming the surface layers having a rugged surface shape with a pattern of ridges, the force with which the squeegee was pressed against the resin solution was so controlled that the arithmetic mean roughness Sa of the separator surfaces would be 1.8 μm. In Example 1-5, the compression ratio of the surface layer was 0.7.

Example 1-6

A cylindrical type battery was fabricated in the same manner as in Example 1-1, except that the rugged surface shape of the separator surface had a pattern of craters with an arithmetic mean roughness Sa of 1.1 μm. In Example 1-6, the compression ratio of the surface layer was 0.4.

Figure 18B:
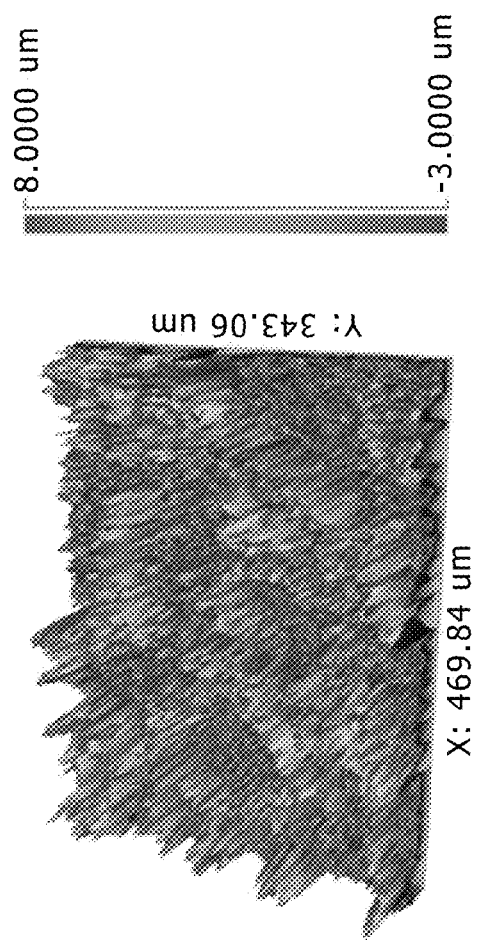
FIG. 18B shows the results of three-dimensional measurement by a non-contact type surface shape measurement system VertScan (made by Ryoka Systems Inc.), using a photo interference method, of a separator surface obtained in Example 1-6.
Figure 18A:
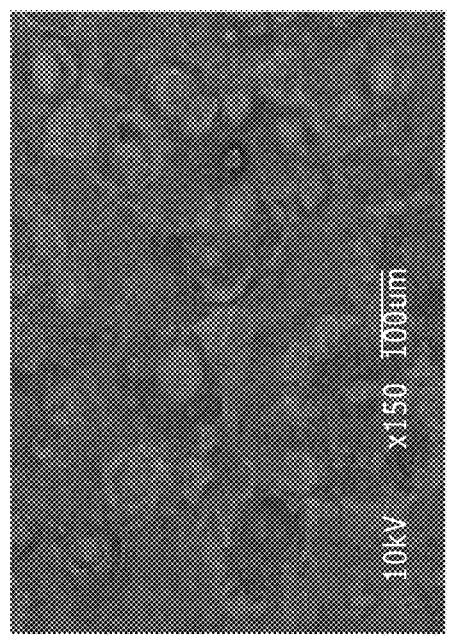
FIG. 18A is a secondary electron image obtained by a scanning electron microscope (SEM) of a separator surface obtained in Example 1-6.

The separator in Example 1-6 was formed in the following manner. A resin solution was applied to both sides of a base material in the same manner as in Example 1-1. Subsequently, water droplets jetted from a two-fluid nozzle were permitted to collide against the resin solution, to form crater-shaped dents. Finally, 70° C. hot air was blown to the resin solution on the surfaces of the base material to evaporate off N-methyl-2-pyrrolidone, to obtain a separator in which a surface layer containing inorganic particles and a resin material and having a rugged surface shape with a pattern of craters was provided on each side of the base material. FIG. 18A shows an SEM image of the separator surface obtained in Example 1-6, and FIG. 18B shows the rugged surface shape of the separator surface measured by a non-contact surface shape measurement system VertScan (made by Ryoka Systems Inc.) using a photo interference method (FIG. 18 presenting FIG. 18B in colors has been filed as a written submission of evidence of the present application). The crater-like dents were 10 to 500 μm in size, and the intervals thereof were not more than 1 mm. The widths of bottom portions of a plurality of projected portions forming the outlines of the craters were 1 to 10 μm, the heights of the projected portions were 5 to 15 μm, and the aspect ratios ((height)/(width of bottom portion)) of the projected portions were 0.5 to 15.

Example 1-7

A cylindrical type battery was fabricated in the same manner as in Example 1-6, except that in forming the surface layers having a rugged surface shape with a pattern of craters, the force with which the water droplets were jetted from the two-fluid nozzle was so controlled that the arithmetic mean roughness Sa of the separator surface would be 1.5 μm. In Example 1-7, the compression ratio of the surface layer was 0.6.

Example 1-8

A cylindrical type battery was fabricated in the same manner as in Example 1-6, except that in forming the surface layers having a rugged surface shape with a pattern of craters, the force with which the water droplets were jetted from the two-fluid nozzle was so controlled that the arithmetic mean roughness Sa of the separator surface would be 1.8 μm. In Example 1-8, the compression ratio of the surface layer was 0.6.

Example 1-9

A cylindrical type battery was fabricated in the same manner as in Example 1-3, except that silica ($SiO_2$) was used in place of alumina as the inorganic particles for forming the surface layers and that the force with which the squeegee was pressed against the resin solution was so controlled that the arithmetic mean roughness Sa of the separator surface would be 1.1 μm. In Example 1-9, the compression ratio of the surface layer was 0.4.

Example 1-10

A cylindrical type battery was fabricated in the same manner as in Example 1-3, except that silica ($SiO_2$) was used in place of alumina as the inorganic particles for forming the surface layers and that the force with which the squeegee was pressed against the resin solution was so controlled that the arithmetic mean roughness Sa of the separator surface would be 1.4 μm. In Example 1-10, the compression ratio of the surface layer was 0.5.

Example 1-11

A cylindrical type battery was fabricated in the same manner as in Example 1-3, except that silica ($SiO_2$) was used in place of alumina as the inorganic particles for forming the surface layers and that the force with which the squeegee was pressed against the resin solution was so controlled that the arithmetic mean roughness Sa of the separator surface would be 1.8 μm. In Example 1-11, the compression ratio of the surface layer was 0.6.

Example 1-12

A cylindrical type battery was fabricated in the same manner as in Example 1-4, except that a nonwoven fabric formed from polyethylene terephthalate (PET) fibers was used in place of the porous film of polyethylene (PE) as the base material. In Example 1-12, the arithmetic mean roughness Sa of the separator surface was 1.5 μm, and the compression ratio of the surface layer was 0.5.

Example 1-13

A separator was produced in the same manner as in Example 1-6, except that boehmite ($Al_2O_3 \cdot H_2O$) was used in place of alumina as the inorganic particles for forming the surface layer and that a surface layer having a rugged surface shape with a pattern of craters was formed. In Example 1-13, the compression ratio of the surface layer was 0.4.

Example 1-14

A separator was produced in the same manner as in Example 1-6, except that boehmite was used in place of alumina as the inorganic particles for forming the surface layer, that a surface layer having a rugged surface shape with a pattern of craters was formed, and that the force with which the water droplets were jetted from the two-fluid nozzle was so controlled that the arithmetic mean roughness Sa of the separator surface would be 1.6 μm. In Example 1-14, the compression ratio of the surface layer was 0.5.

Example 1-15

A separator was produced in the same manner as in Example 1-6, except that boehmite was used in place of alumina as the inorganic particles for forming the surface layer, that a surface layer having a rugged surface shape with a pattern of craters was formed, and that the force with which the water droplets were jetted from the two-fluid nozzle was so controlled that the arithmetic mean roughness Sa of the separator surface would be 1.8 μm. In Example 1-15, the compression ratio of the surface layer was 0.7.

Example 1-16

A separator was produced in the same manner as in Example 1-3, except that boehmite was used in place of alumina as the inorganic particles for forming the surface layer, and that a surface layer having a rugged surface shape with a pattern of ridges (MD direction) was formed.

Example 1-17

A separator was produced in the same manner as in Example 1-3, except that boehmite was used in place of alumina as the inorganic particles for forming the surface layer, that a surface layer having a rugged surface shape with a pattern of ridges (MD direction), and that the force with which the squeegee was pressed against the resin solution was so controlled that the arithmetic mean roughness Sa of the separator surface would be 1.4 μm.

Example 1-18

A separator was produced in the same manner as in Example 1-3, except that boehmite was used in place of alumina as the inorganic particles for forming the surface layer, that a surface layer having a rugged surface shape with a pattern of ridges (MD direction) was formed, and that the force with which the squeegee was pressed against the resin solution was so controlled that the arithmetic mean roughness Sa of the separator surface would be 1.7 μm.

Comparative Example 1-1

Figure 19B:
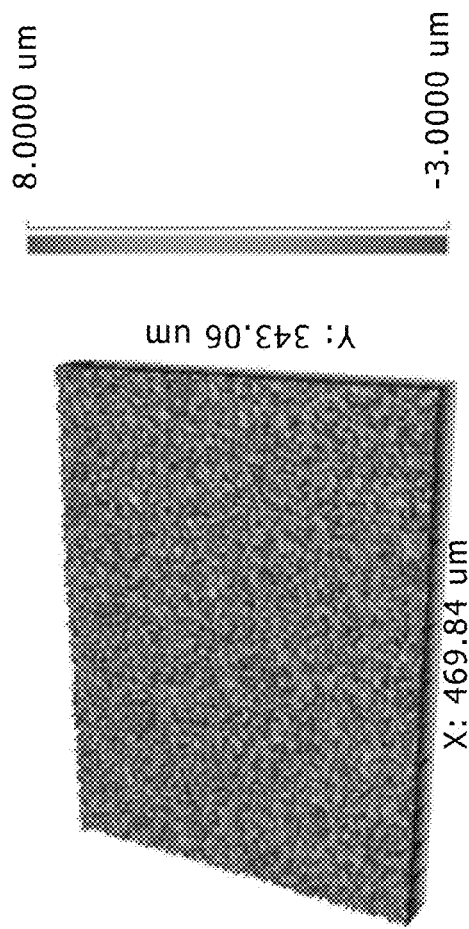
FIG. 19B shows the results of three-dimensional measurement by a non-contact type surface shape measurement system VertScan (made by Ryoka Systems Inc.), using a photo interference method, of the separator surface obtained in Comparative Example 1-1.
Figure 19A:
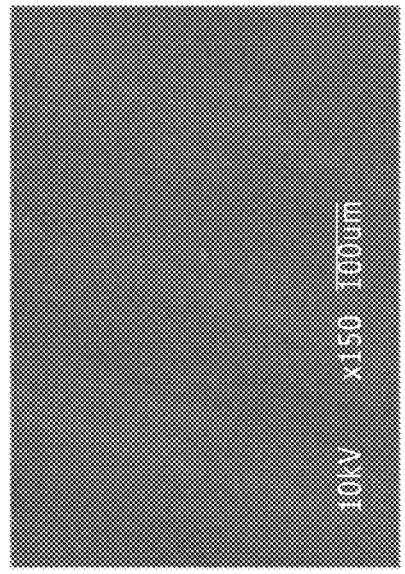
FIG. 19A is a secondary electron image obtained by a scanning electron microscope (SEM) of a separator surface obtained in Comparative Example 1-1.

A cylindrical type battery with a separator surface being a uniform surface was fabricated in the same manner as in Example 1-2, except that the formation of the surface layer with the rugged surface shape with a pattern of ridges by use of a squeegee was omitted. In Comparative Example 1-1, the arithmetic mean roughness Sa of the separator surface was 0.4 μm, and the compression ratio of the surface layer was 0.1. FIG. 19A shows an SEM image of the separator surface obtained in Comparative Example 1-1, and FIG. 19B shows the rugged surface shape of the separator surface measured by a non-contact surface shape measurement system VertScan (made by Ryoka Systems Inc.) using a photo interference method (FIG. 19 presenting FIG. 19B in colors has been filed as a written submission of evidence of the present application).

Comparative Example 1-2

A cylindrical type battery was fabricated in the same manner as in Example 1-3, except that in forming the surface layers having a rugged surface shape with a pattern of ridges extending in the longitudinal direction (MD direction) of the separator, the force with which the squeegee was pressed against the resin solution was so controlled that the arithmetic mean roughness Sa of the separator surface would be 0.8 μm. In Comparative Example 1-2, the compression ratio of the surface layer was 0.2.

Comparative Example 1-3

A cylindrical type battery was fabricated in the same manner as in Example 1-3, except that in forming the surface layers having a rugged surface shape with a pattern of ridges extending in the longitudinal direction (MD direction) of the separator, the force with which the squeegee was pressed against the resin solution was so controlled that the arithmetic mean roughness Sa of the separator surface would be 4.1 μm. In Comparative Example 1-3, the compression ratio of the surface layer was 0.2.

[Evaluation of Battery]

(a) Checking of Foil Rupture

Each of the cylindrical type batteries obtained in Examples and Comparative Examples was subjected to constant-current charging in a 23° C. atmosphere at a charging current of 0.5 C until the battery voltage reached 4.2 V, and then to constant-voltage charging at a battery voltage of 4.2V, and the charging was finished when the charging current became 50 mA. Thereafter, each of the cylindrical type batteries was disassembled, and the presence/absence of rupture of the electrode was checked by visual inspection.

(b) Examination of Cycle Characteristic

Each of the cylindrical type batteries obtained in Examples and Comparative Examples was subjected to constant-current charging in a 23° C. atmosphere at a charging current of 0.5 C until the battery voltage reached 4.2 V, and then to constant-voltage charging at a battery voltage of 4.2V, and the charging was finished when the charging current became 50 mA. Thereafter, each battery was subjected to constant-current discharging at a discharge current of 0.5 C until the battery voltage was lowered to 2.5 V, and the discharge capacity in this instance was adopted as a first-cycle discharge capacity.

Subsequently, each battery was subjected to 200 charge-discharge cycles under the above-mentioned charging and discharging conditions, and the discharge capacity upon the 200th cycle was measured. Capacity retention rate upon 200 charge-discharge cycles was calculated from the following formula.

Capacity retention rate [%]={(Discharge capacity at 200th cycle)/(First-cycle discharge capacity)}×100

(c) Evaluation of Level of Foil Rupture Varied Due to Differences in Rugged Surface Shape Each of the cylindrical type batteries obtained in Examples 1-1 to 1-8 and Examples 1-13 to 1-18 was subjected to constant-current charging in a 23 atmosphere at a charging current of 0.5 C until the battery voltage reached 4.2 V, and then to constant-voltage charging at a battery voltage of 4.2 V, and the charging was finished when the charging current became 50 mA. Thereafter, each of the cylindrical type batteries was disassembled, and the state of the electrode foil was checked by visual inspection. Evaluation was made based on the following criterion.

A: Little damage to foil was observed.

B: No crack or the like was found, but foil deformation was observed.

C: Crack or the like damage was observed in some of the specimens.

The results of evaluation are set forth in Table 1 below.

TABLE 1

| | Base material | | | Surface layer | | | | | | | Evaluation of level of foil rupture | Capacity retention rate (%) |
|---|---|---|---|---|---|---|---|---|---|---|---|---|
| | | | | Inorganic | | | | Arithmetic mean roughness, Sa (μm) | Compression ratio, B/A | Thickness/Inorganic particle diameter | Foil rupture | | |
| | Material | Thickness (μm) | Resin material | Inorganic particles | particle diameter (μm) | Thickness (μm) | Rugged surface shape | | | | | | |
| Example 1-1 | porous film of PE | 13 | PVdF | alumina | 0.5 | 11 | pyramids | 1.1 | 0.4 | 22 | absent | B | 89 |
| Example 1-2 | | | | | | | ridges (TD direction) | 1.1 | 0.4 | | absent | C | 90 |
| Example 1-3 | | | | | | | ridges (MD direction) | 1.2 | 0.4 | | absent | C | 90 |
| Example 1-4 | | | | | | | | 1.5 | 0.5 | | absent | B | 89 |
| Example 1-5 | | | | | | | | 1.8 | 0.7 | | absent | A | 89 |
| Example 1-6 | | | | | | | craters | 1.1 | 0.4 | | absent | A | 90 |
| Example 1-7 | | | | | | | | 1.5 | 0.6 | | absent | A | 90 |
| Example 1-8 | | | | | | | | 1.8 | 0.6 | | absent | A | 89 |
| Example 1-9 | | | | silica | 0.5 | 11 | ridges (MD direction) | 1.1 | 0.4 | | absent | | 88 |
| Example 1-10 | | | | | | | | 1.4 | 0.5 | | absent | | 91 |
| Example 1-11 | | | | | | | | 1.8 | 0.6 | | absent | | 88 |
| Example 1-12 | nonwoven fabric of PE | 13 | PVdF | alumina | 0.5 | 11 | ridges (MD direction) | 1.5 | 0.5 | | absent | | 92 |
| Example 1-13 | porous film of PE | 13 | PVdF | boehmite | 0.5 | 11 | craters | 1.1 | 0.4 | 22 | absent | A | 90 |
| Example 1-14 | | | | | | | craters | 1.6 | 0.5 | | absent | A | 89 |
| Example 1-15 | | | | | | | craters | 1.8 | 0.7 | | absent | A | 89 |
| Example 1-16 | | | | | | | ridges (MD) | 1.2 | 0.4 | 22 | absent | C | 88 |
| Example 1-17 | | | | | | | ridges (MD) | 1.4 | 0.5 | | absent | B | 90 |
| Example 1-18 | | | | | | | ridges (MD) | 1.7 | 0.6 | | absent | A | 89 |
| Comparative Example 1-1 | porous film of PE | 13 | PVdF | alumina | 0.5 | 11 | nil (uniform) | 0.4 | 0.1 | 22 | present | — | |
| Comparative Example 1-2 | | | | | | | ridges (MD direction) | 0.8 | 0.2 | | present | — | |
| Comparative Example 1-3 | | | | | | | ridges (MD direction) | 4.1 | 0.2 | | present | — | |

As seen from Table 1, the cylindrical type batteries obtained in Examples by using the separator provided with the surface layers containing the inorganic particles and the resin material and having the rugged surface shape with an arithmetic mean roughness Sa of not less than 1.0 μm were free of rupture of the electrode due to the first-time charging, and showed a very high cycle characteristic represented by a capacity retention rate upon the 200th cycle of 88 to 92%.

On the other hand, the cylindrical type battery obtained in Comparative Example 1-1 by using the separator having the flat surface layers on both sides of the base material suffered rupture of the electrode due to the first-time charging. In addition, the cylindrical type battery obtained in Comparative Example 1-2 by using the separator provided with the surface layers having an arithmetic mean surface roughness Sa of less than 1.0 μm had a slight ruggedness and insufficient compressibility, although a rugged surface shape with a pattern of ridges was observed; consequently, the battery suffered rupture of the electrode due to the first-time charging. Further, the cylindrical type battery obtained in Comparative Example 1-3 by using the separator provided with the surface layers which had a rugged surface shape but the arithmetic mean surface roughness Sa was in excess of 4.0 μm had structural weakness of the projected portions of the surface layers, due to the excessively large arithmetic mean roughness Sa, and showed collapse of the projected portions of the surface layers at the time of winding. Besides, in measurement of compression ratio, the collapse under an initial load of 3.57 N/cm² was large (in other words, the thickness A of the surface layers under the load of 3.57 N/cm² was small), and the measured value of compression was 0.3. In addition, even in the cratered surface layer, in the case where the size of the crater-like recesses (dents) was not more than 5 μm, it tended to be very difficult to sufficiently absorb the expansion, since the void size was too small as compared with the particle lump size relevant to the expansion of the electrode active material. Besides, in the case where the interval of the crater-like recesses (dents) was not less than 5 mm, warpage of the electrode itself was generated between projected portions of the crater pattern, so that there was observed a tendency that the number or volume of the voids for absorbing the expansion would become conspicuously small and the expansion-absorbing effect would hence be reduced.

Thus, it was verified that it is preferable to use a separator provided with a surface layer having an arithmetic mean surface roughness Sa in the range of 1.0 to 4.0 μm.

In addition, according to the evaluation of the level of foil rupture varied due to differences in the rugged surface shape in (c) above, crack or the like damage to the foil was confirmed in the case where the rugged surface shape was other than the pattern of craters and where the value of Sa was small. Besides, some of the specimens showed foil deformation such as foil extension, though the deformation was not so severe as to lead to cracking. On the other hand, the surface layers having a rugged surface shape with a pattern of craters showed neither damage to foil (e.g., crack) nor foil deformation. From these results, it was found that in the case where the surface layer has a rugged surface shape with a pattern of craters, the number or volume of voids is large and the matching between the void size and the active material expansion scale is good, so that the damage to the foil is smaller as compared with the cases of other rugged surface shapes.

<Example 2-1> to <Example 2-4> and <Comparative Example 2-1>

In Examples 2-1 to 2-4 and Comparative Example 2-1, characteristics of batteries were evaluated by use of separators provided with surface layers formed while varying the particle diameter of the inorganic particles.

Example 2-1

A cylindrical type battery was fabricated in the same manner as in Example 1-3, except that the particle diameter of alumina was 2.2 µm (the ratio T/D of the thickness T of the surface layers to the mean particle diameter D was 5). In Example 2-1, the arithmetic mean roughness Sa of the separator surface was 1.1, and the compression ratio of the surface layer was 0.4.

Example 2-2

A cylindrical type battery was fabricated in the same manner as in Example 1-3 wherein the particle diameter of alumina was 0.5 µm (the ratio T/D of the thickness T of the surface layers to the mean particle diameter D was 22). In Example 2-2, the arithmetic mean roughness Sa of the separator surface was 1.2, and the compression ratio of the surface layer was 0.4.

Example 2-3

A cylindrical type battery was fabricated in the same manner as in Example 1-3, except that the particle diameter of alumina was 39.3 nm (the ratio T/D of the thickness T of the surface layers to the mean particle diameter D was 280). In Example 2-3, the arithmetic mean roughness Sa of the separator surface was 1.4, and the compression ratio of the surface layer was 0.5.

Example 2-4

A cylindrical type battery was fabricated in the same manner as in Example 1-3, except that the particle diameter of alumina was 15.7 nm (the ratio T/D of the thickness T of the surface layers to the mean particle diameter D was 700). In Example 2-4, the arithmetic mean roughness Sa of the separator surface was 1.6, and the compression ratio of the surface layer was 0.6.

Comparative Example 2-1

A cylindrical type battery was fabricated in the same manner as in Example 1-3, except that the particle diameter of alumina was 2.4 µm (the ratio T/D of the thickness T of the surface layers to the mean particle diameter D was 4.6). In Comparative Example 2-1, the arithmetic mean roughness Sa of the separator surface was 1.1, and the compression ratio of the surface layer was 0.3.

[Evaluation of Battery]
(a) Checking of Foil Rupture
(b) Examination of Cycle Characteristic The presence/absence of electrode rupture upon the first-time charging and the capacity retention rate upon the 200th cycle were checked and examined in the same manner as in Example 1-1.

The results of evaluation are set forth in Table 2 below.

TABLE 2

| | Base material | | | | Surface layer | | | | | | Capacity |
| | | | | | Inorganic | | | Arithmetic | | Thickness/ | |
| | Material | Thickness (µm) | Resin material | Inorganic particles | particle diameter (nm) | Thickness (µm) | Rugged surface shape | mean roughness Sa (µm) | Compression ratio, B/A | (Inorganic particle diameter) | Foil rupture | retention rate (%) |
|---|---|---|---|---|---|---|---|---|---|---|---|---|
| Example 2-1 | porous film of PE | 13 | PVdF | alumina | 2200 | 11 | ridges (MD direction) | 1.1 | 0.4 | 5 | absent | 90 |
| Example 2-2 | | | | | 500 | | | 1.2 | 0.4 | 22 | absent | 90 |
| Example 2-3 | | | | | 39.3 | | | 1.4 | 0.5 | 280 | absent | 89 |
| Example 2-4 | | | | | 15.7 | | | 1.6 | 0.6 | 700 | absent | 91 |
| Comparative Example 2-1 | porous film of PE | 13 | PVdF | alumina | 2400 | 11 | ridges (MD direction) | 1.1 | 0.3 | 4.6 | present | 70 |

As seen from Table 2, the cylindrical type batteries obtained in Examples wherein the thickness of the surface layers was not less than five times the particle diameter of the inorganic particles were free of foil rupture upon the first-time charging and were able to show a high capacity retention rate. On the other hand, the cylindrical type battery obtained in Comparative Example 2-1 wherein the thickness of the surface layers was less than five times the particle diameter of the inorganic particles suffered foil rupture upon the first-time charging.

In Comparative Example 2-1, the compression ratio B/A was 0.3, showing that the surface layers are not liable to collapse, since the particle diameter of the inorganic particles are large. In view of this, it is considered that a tensile stress was exerted on the electrode at the time of expansion of the negative electrode, resulting in electrode rupture.

Thus, it was verified that it is preferable to use a separator provided with a surface layer wherein the thickness of the surface layer is not less than five times the particle diameter of the inorganic particles.

<Example 3-1> to <Example 3-3> and
<Comparative Example 3-1> to <Comparative Example 3-3>

In Examples 3-1 to 3-3 and Comparative Examples 3-1 to 3-3, characteristics of batteries were evaluated by use of separators provided with surface layers formed while changing the resin material constituting the surface layer.

Example 3-1

A cylindrical type battery was fabricated in the same manner as in Example 1-3, using a separator wherein the resin material constituting the surface layer was polyvinylidene fluoride (PVdF). In Example 3-1, the arithmetic mean roughness Sa of the separator surface was 1.2, and the compression ratio of the surface layer was 0.4.

Example 3-2

A cylindrical type battery was fabricated in the same manner as in Example 1-3, except that a separator was used in which the resin material constituting the surface layer was an all-aromatic polyamide (aramid). In Example 3-2, the arithmetic mean roughness Sa of the separator surface was 1.5, and the compression ratio of the surface layer was 0.6.

Example 3-3

A cylindrical type battery was fabricated in the same manner as in Example 1-3, except that a separator was used in which the resin material constituting the surface layer was a polyamide-imide (PAI). In Example 3-3, the arithmetic mean roughness Sa of the separator surface was 1.5, and the compression ratio of the surface layer was 0.5.

Comparative Example 3-1

A cylindrical type battery was fabricated in the same manner as in Comparative Example 1-1, using a separator wherein the resin material constituting the surface layer was polyvinylidene fluoride (PVdF) and the surface layers were not provided with a rugged surface shape. In Comparative Example 3-1, the arithmetic mean roughness Sa of the separator surface was 0.4, and the compression ratio of the surface layer was 0.1.

Comparative Example 3-2

A cylindrical type battery was fabricated in the same manner as in Example 1-3, except that a separator was used in which the resin material constituting the surface layer was an all-aromatic polyamide (aramid) and the surface layers were not provided with a rugged surface shape. In Comparative Example 3-2, the arithmetic mean roughness Sa of the surface layer was 0.4, and the compression ratio of the surface layer was 0.1.

Comparative Example 3-3

A cylindrical type battery was fabricated in the same manner as in Example 1-3, except that a separator is used in which the resin material constituting the surface layer was a polyamide-imide (PAI) and the surface layers were not provided with a rugged surface shape. In Comparative Example 3-3, the arithmetic mean roughness Sa of the separator surface was 0.3, and the compression ratio of the surface layer was 0.1.

[Evaluation of Battery]
(a) Checking of Foil Rupture
(b) Examination of Cycle Characteristic The presence/absence of electrode rupture upon the first-time charging and the capacity retention rate upon the 200th cycle were checked and examined in the same manner as in Example 1-1.

The results of evaluation are set forth in Table 3 below.

TABLE 3

| | Base material | | Surface layer | | | | | | | | Capacity |
| | | | | | Inorganic | | | Arithmetic | | Thickness/ | |
| | Material | Thickness ($\mu m$) | Resin material | Inoragnic particles | particle diameter ($\mu m$) | Thickness ($\mu m$) | Rugged surface shape | mean roughness Sa ($\mu m$) | Compression ratio, B/A | (Inorganic particle diameter) | Foil Rupture | retention rate (%) |
|---|---|---|---|---|---|---|---|---|---|---|---|---|
| Example 3-1 | porous film of PE | 13 | PVdF | alumina | 0.5 | 11 | ridges (MD direction) | 1.2 | 0.4 | 22 | absent | 90 |
| Example 3-2 | | | aramid | | | | | 1.5 | 0.6 | | absent | 89 |
| Example 3-3 | | | PAI | | | | | 1.5 | 0.5 | | absent | 88 |
| Comparative Example 3-1 | porous film of PE | 13 | PVdF | alumina | 0.5 | 11 | nil (uniform) | 0.4 | 0.1 | 22 | present | — |
| Comparative Example 3-2 | | | aramid | | | | | 0.4 | 0.1 | | present | — |
| Comparative Example 3-3 | | | PAI | | | | | 0.3 | 0.1 | | present | — |

As seen from Table 3, not only when polyvinylidene fluoride was used as the resin material but also when the aramid or the polyamide-imide was used as the resin material, in Examples, the same effect as above-mentioned was obtainable. On the other hand, where the surface layer was not provided with the rugged surface shape, as in Comparative Examples, even if one of these resin material was used, the compression ratio B/A was as low as 0.1 and it was very difficult to restrain electrode rupture.

<Examples 4-1> to <Example 4-6> and
<Comparative Example 4-1>

In Examples 4-1 to 4-6 and Comparative Example 4-1, characteristics of batteries were evaluated by use of separators wherein only the surface layer on the negative electrode side of the separator was provided with a rugged surface shape.

Example 4-1

A surface layer provided at a separator surface on the positive electrode side was formed with a uniform (flat) surface not having a rugged surface shape. The arithmetic mean roughness Sa of the separator surface on the positive electrode side was 0.3. Besides, only the surface layer provided at the separator surface on the negative electrode side was formed with a rugged surface shape such that the arithmetic mean roughness Sa of the separator surface was 1.1. In this case, the rugged surface shape had a pattern of ridges extending in the longitudinal direction (MD direction) of the separator. A cylindrical type battery was fabricated in the same manner as in Example 1-3, except for the just-mentioned points. In Example 4-1, the compression ratio of the surface layer was 0.5.

Incidentally, in Example 4-1 wherein only the surface layer provided at the separator surface on the negative electrode side was formed with a rugged surface shape, the compression ratio was calculated as B/A, where A is the thickness of the surface layer provided on the negative electrode side and having the rugged surface shape under a load of 3.57 N/cm², and B is the collapse amount of the surface layer provided on the negative electrode side and having the rugged surface shape under a load of 4000 N/cm². Thus, the compression ratio was calculated in the following manner.

Compression ratio={(Thickness of surface layer on negative electrode side under a load of 4000 N/cm²)/(Thickness of surface layer on negative electrode side under a load of 3.57 N/cm²)}

Here, the thickness of the surface layer provided on the negative electrode side and having the rugged surface shape was calculated by subtracting the thickness of the surface layer provided on the positive electrode side and not having a rugged surface shape and the thickness of the base material from the overall thickness of the separator. Specifically, the separator was prepared in which a surface layer having a rugged surface shape was formed on one side of the base material, and a surface layer with a uniform thickness is formed on the other side of the base material. The uniform-thickness surface layer was peeled off from the separator by use of an adhesive cellophane tape, then the thickness of the thus peeled coating film was measured, and the thickness thus measured was taken as the thickness of the surface layer provided on the positive electrode side and not having a rugged surface shape.

Example 4-2

A cylindrical type battery was fabricated in the same manner as in Example 4-1, except that in forming the surface layer having the rugged surface shape with a pattern of ridges on the negative electrode side, the force with which the squeegee was pressed against the resin solution was so controlled that the arithmetic mean roughness Sa of the separator surface would be 1.5. In Example 4-2, the compression ratio of the surface layer was 0.6.

Example 4-3

A cylindrical type battery was fabricated in the same manner as in Example 4-1, except that in forming the surface layer having the rugged surface shape with a pattern of ridges on the negative electrode side, the force with which the squeegee was pressed against the resin solution was so controlled that the arithmetic mean roughness Sa of the separator surface would be 1.8. In Example 4-3, the compression ratio of the surface layer was 0.7.

Example 4-4 to Example 4-6

Cylindrical type batteries of Examples 4-4 to 4-6 were fabricated in the same manner as in Examples 4-1 to 4-3, except that silica was used as the inorganic particles. In Examples 4-4 to 4-6, the compression ratio of the surface layer was 0.5, 0.6 and 0.7, respectively.

Comparative Example 4-1

A cylindrical type battery was fabricated in the same manner as in Example 4-1, except that both the surface layer provided at the separator surface on the positive electrode side and the surface layer provided at the separator surface on the negative electrode side were each formed with a uniform (flat) surface not having a rugged surface shape. In Comparative Example 4-1, the compression ratio of the surface layer was 0.1.

[Evaluation of Battery]
(a) Checking of Foil Rupture

The presence/absence of electrode rupture upon the first-time charging was checked in the same manner as in Example 1-1, except that the upper-limit voltage of charging was set at 4.4 V. Incidentally, when the upper-limit voltage of charging is raised, the positive electrode potential in a fully charged state is raised, resulting in that the vicinity of the positive electrode is exposed to an oxidizing environment. Therefore, the separator in secure contact with the positive electrode is also exposed to the oxidizing environment and is liable to be deteriorated.

The results of evaluation are set forth in Table 4 below.

TABLE 4

Rugged surface shape on positive electrode side: nil (uniform)

| | Base material | | Resin Material | Inorganic particles | Inorganic particle diameter (μm) | Surface layer | | Arithmetic mean roughness Sa (μm) | | Compression ratio, B/A | Thickness/ (Inorganic particle diameter) | Foil rupture |
| | Material | Thickness (μm) | | | | Thickness (μm) | Rugged surface shape on negative electrode side | Positive electrode side surface | Negative electrode side surface | | | |
| --- | --- | --- | --- | --- | --- | --- | --- | --- | --- | --- | --- | --- |
| Example 4-1 | porous film of PE | 13 | PVdF | alumina | 0.5 | 11 | ridges (MD direction) | 0.3 | 1.1 | 0.5 | 22 | absent |
| Example 4-2 | | | | | | | | 0.3 | 1.5 | 0.6 | | absent |
| Example 4-3 | | | | | | | | 0.3 | 1.8 | 0.7 | | absent |
| Example 4-4 | | | | silica | | | | 0.3 | 1.1 | 0.5 | | absent |
| Example 4-5 | | | | | | | | 0.3 | 1.5 | 0.6 | | absent |
| Example 4-6 | | | | | | | | 0.3 | 1.8 | 0.7 | | absent |

TABLE 4-continued

Rugged surface shape on positive electrode side: nil (uniform)

| | Base material | | | | | Surface layer | | | | | |
| --- | --- | --- | --- | --- | --- | --- | --- | --- | --- | --- | --- |
| | | | | | | | Rugged surface shape on negative electrode side | Arithmetic mean roughness Sa (μm) | | | |
| | | | | Inorganic | | | | Positive electrode side surface | Negative electrode side surface | | Thickness/ |
| | Material | Thickness (μm) | Resin Material | Inorganic particles | particle diameter (μm) | Thickness (μm) | | | | Compression ratio, B/A | (Inorganic particle diameter) | Foil rupture |
| Comparative Example 4-1 | porous film of PE | 13 | PVdF | alumina | 0.5 | 11 | nil (uniform) | 0.3 | 0.3 | 0.1 | 22 | present |

As seen from Table 4, it was confirmed that even where the upper-limit voltage of charging is as high as 4.4 V, electrode rupture can be restrained from occurring, by use of a separator wherein only the surface layer on the negative electrode side is provided with a rugged surface shape. On the other hand, where the surface layers are not provided with a rugged surface shape, as in Comparative Example 4-1, it was very difficult to restrain electrode rupture from occurring.

<Example 5-1> to <Example 5-6> and <Comparative Example 5-1>

In Examples 5-1 to 5-6 and Comparative Example 5-1, characteristics of batteries were evaluated by use of separators wherein only the surface layer provided at the separator surface on the positive electrode side had a rugged surface shape.

Example 5-1

The surface layer provided at the separator surface on the negative electrode side was formed with a uniform (flat) surface not having a rugged surface shape. The arithmetic mean roughness Sa of the separator surface on the negative electrode side was 0.3. Besides, only the surface layer provided at the separator surface on the positive electrode side was provided with ridges extending in the longitudinal direction (MD direction) of the separator, the arithmetic mean roughness Sa of the separator surface being 1.1. A cylindrical type battery was fabricated in the same manner as in Example 1-3, except for the just-mentioned points. In Example 5-1, the compression ratio of the surface layer on the negative electrode side was 0.5.

Incidentally, in Example 5-1 wherein only the surface layer provided at the separator surface on the positive electrode side was formed with a rugged surface shape, the compression ratio was calculated as B/A, where A is the thickness of the surface layer provided on the positive electrode side and having the rugged surface shape under a load of 3.57 N/cm², and B is the collapse amount of the surface layer provided on the positive electrode side and having the rugged surface shape under a load of 4000 N/cm². Thus, the compression ratio was calculated in the following manner.

Compression ratio={(Thickness of surface layer on positive electrode side under a load of 4000 N/cm²)/(Thickness of surface layer on positive electrode side under a load of 3.57 N/cm²)}

Here, the thickness of the surface layer provided on the positive electrode side and having the rugged surface shape was calculated by subtracting the thickness of the surface layer provided on the negative electrode side and not having a rugged surface shape and the thickness of the base material from the overall thickness of the separator. Specifically, the thickness of the surface layer provided on the positive electrode side and having the rugged surface shape was calculated by a method similar to the method in Example 4-1.

Example 5-2

A cylindrical type battery was fabricated in the same manner as in Example 5-1, except that in forming the surface layer having the rugged surface shape with a pattern of ridges on the positive electrode side, the force with which the squeegee was pressed against the resin solution was so controlled that the arithmetic mean roughness Sa of the separator surface would be 1.5. In Example 5-2, the compression ratio of the surface layer on the negative electrode side was 0.6.

Example 5-3

A cylindrical type battery was fabricated in the same manner as in Example 5-1, except that in forming the surface layer having the rugged surface shape with a pattern of ridges on the positive electrode side, the force with which the squeegee was pressed against the resin solution was so controlled that the arithmetic mean roughness Sa of the separator surface would be 1.8. In Example 5-3, the compression ratio of the surface layer on the negative electrode side was 0.7.

Example 5-4 to Example 5-6

Cylindrical type batteries of Examples 5-4 to 5-6 were fabricated in the same manner as in Examples 5-1 to 5-3, except that silica was used as the inorganic particles. In Examples 5-4 to 5-6, the compression ratio of the surface layer on the negative electrode side was 0.5, 0.6 and 0.7, respectively.

Comparative Example 5-1

A cylindrical type battery was fabricated in the same manner as in Example 5-1, except that both the surface layer provided at the separator surface on the positive electrode side and the surface layer provided at the separator surface on the negative electrode side were each formed with a uniform (flat) surface not having a rugged surface shape. In Comparative Example 5-1, the compression ratio of the surface layer on the negative electrode side was 0.1.

61

[Evaluation of Battery]

(a) Checking of Foil Rupture

The presence/absence of electrode rupture upon the first-time charging was checked in the same manner as in Example 1-1.

The results of evaluation are set forth in Table 5 below.

62

(Heat Content Per Unit Area, Qs)

Heat content per unit area $Qs$ (0.80 mJ/cm$^2$·K)={[specific heat of alumina particles (0.8 kJ/kg·K)]×[areal density of coating layer (0.94 mg/cm$^2$)]×[mass fraction of alumina particles]}+{[specific heat of binder ($PVdF$)(1.4 kJ/kg·K)]×[areal density of coating layer (0.94 mg/cm$^2$)]×[mass fraction of binder]}

TABLE 5

Rugged surface shape on negative electrode side: nil (uniform)

| | Base material | | | | | Surface layer | | | | | |
| --- | --- | --- | --- | --- | --- | --- | --- | --- | --- | --- | --- |
| | | | | | | | Rugged surface shape on positive electrode side | Arithmetic mean roughness Sa (μm) | | | |
| | Material | Thickness (μm) | Resin material | Inorganic particles | Inorganic particle diameter (μm) | Thickness (μm) | | Positive electrode side surface | Negative electrode side surface | Compression ratio, B/A | Thickness/ (Inorganic particle diameter) | Foil rupture |
| Example 5-1 | porous film of PE | 13 | PVdF | alumina | 0.5 | 11 | ridges (MD direction) | 1.1 | 0.3 | 0.5 | 22 | absent |
| Example 5-2 | | | | | | | | 1.5 | 0.3 | 0.6 | | absent |
| Example 5-3 | | | | | | | | 1.8 | 0.3 | 0.7 | | absent |
| Example 5-4 | | | | silica | | | | 1.1 | 0.3 | 0.5 | | absent |
| Example 5-5 | | | | | | | | 1.5 | 0.3 | 0.6 | | absent |
| Example 5-6 | | | | | | | | 1.8 | 0.3 | 0.7 | | absent |
| Comparative Example 5-1 | porous film of PE | 13 | PVdF | alumina | 0.5 | 11 | nil (uniform) | 0.3 | 0.3 | 0.1 | 22 | present |

As seen from Table 5, it was confirmed that electrode rupture can be restrained occurring, even in the case where a separator wherein only the surface layer on the positive electrode side was provided with a rugged surface shape was used. On the other hand, where the surface layers are not provided with a rugged surface shape, as in Comparative Example 5-1, it was very difficult to restrain electrode rupture from occurring.

Example 6-1

A separator was produced in the following manner.

(Preparation of Resin Solution)

First, alumina (Al$_2$O$_3$) particles as inorganic particles and polyvinylidene fluoride (PVdF) as a resin material were mixed with each other in a volume ratio of 82:18, and the mixture was dispersed in N-methyl-2-pyrrolidone (NMP) to prepare a slurry-formed resin solution.

(Formation of Surface Layer)

Next, the resin solution thus prepared was applied to a polyolefine separator base material in an areal density of 0.94 mg/cm$^2$, and water droplets were sprayed to the resulting resin solution layer, to form a coating layer having a rugged surface shape. In this instance, the area ratio S2/S1 was controlled to 0.45, by regulating the spraying conditions. Subsequently, the separator with the coating layer thereon was passed through water, and then passed through a drying path to remove water. In this manner, a separator provided with a surface layer having a thermal conductivity k0 of 18.1 W/m·K, a thermal conductivity kp of 23.4 W/m·K, a heat content per unit area, Qs, of 0.80 mJ/cm$^2$·K, and an area ratio S2/S1 of 0.45, was produced.

Incidentally, the heat content per unit area, Qs, the thermal conductivity k0 under no load (no pressure), the thermal conductivity kp under a load of 4000 N/cm$^2$, and the area ratio S2/S1 were determined in the following manner.

Mass fraction of alumina particles={[volume ratio of alumina particles (0.82)]×[density of alumina particles (4.0 g/cm$^3$)]}/{[volume ratio of alumina particles (0.82)×[density of alumina particles (4.0 g/cm$^3$)]+[volume ratio of binder ($PVdF$)(0.18)]×[density of binder ($PVdF$)(1.8 g/cm$^3$)]}

Mass fraction of binder={[volume ratio of binder ($PVdF$)(0.18)]×density of binder ($PVdF$)(1.8 g/cm$^3$)]}/{[volume ratio of alumina particles (0.82)]×[density of alumina particles (4.0 g/cm$^3$)]+[volume ratio of binder ($PVdF$)(0.18)]×[density of binder ($PVdF$)(1.8 g/cm$^3$)]}

(Thermal Conductivity k0)

The thermal conductivity k0 is determined by the following formula.

Thermal conductivity $k0$={[thermal conductivity of alumina particles (29.0 W/m·K)]×[volume ratio (one-dimensional direction) of alumina particles]+[thermal conductivity of binder ($PVdF$) (0.1 W/m·K)]×[volume ratio (one-dimensional direction) of binder]}

Volume ratio (one-dimensional direction) of alumina particles=$0.82^{1/3}/(0.82^{1/3}+0.18^{1/3})$ Volume ratio (one-dimensional direction) of $PVdF$=$0.18^{1/3}/(0.82^{1/3}+0.18^{1/3})$ (Thermal Conductivity kp)

The thermal conductivity kp of the surface layer under a load thereon of 4000 N/cm$^2$ is determined by the following formula.

Thermal conductivity kp={[thermal conductivity of alumina particles (29.0 W/m·K)]×[volume ratio (one-dimensional direction) of alumina particles]+[thermal conductivity of binder ($PVdF$) (0.1 W/m·K)]×volume ratio (one-dimensional direction) of binder ($PVdF$)]}

Volume ratio (one-dimensional direction) of alumina particles="$0.82^{1/3}/\{0.82^{1/3}+(1-[\text{compression ratio}(0.60)])\times 0.18^{1/3}\}$"

Volume ratio (one-dimensional direction) of binder $(PVdF)$="(1−[compression ratio (0.60)])×$0.18^{1/3}$/{$0.82^{1/3}$+(1−[compression ratio (0.60)])×$0.18^{1/3}$}"

Incidentally, the compression ratio was measured in the same manner as in Example 1-1.

(Area Ratio S2/S1)

The separator surface after compression under a load of 4000 N/cm$^2$ was observed by a three-dimensional measurement system, and the sum total of the areas exclusive of voids in a predetermined region in a section at a position of 2 μm from the surface was determined as a contact surface S2 (cm$^2$). In addition, the area of the just-mentioned predetermined region was determined as the projected area S1 (cm$^2$) of the surface layer. From the S1 and S2 determined, the area ratio S2/S1 was calculated.

Example 6-2

Silica (SiO$_2$) particles were used in place of alumina (Al$_2$O$_3$) particles as inorganic particles. A resin solution prepared was applied to a polyolefine separator base material in an areal density of 1.05 mg/cm$^2$. In the same manner as in Example 6-1 except for the just-mentioned point, a separator provided with the following surface layer was produced.

Surface Layer:
Thermal conductivity k0: 0.9 W/m·K
Thermal conductivity kp: 1.1 W/m·K
Heat content per unit area, Qs: 0.85 mJ/cm$^2$·K
Area ratio S2/S1: 0.45

Incidentally, the heat content per unit area, Qs, the thermal conductivity k0 of the surface layer under no load (no pressure), and the thermal conductivity kp of the surface layer under a load thereon of 4000 N/cm$^2$ were determined in the following manner.

(Heat Content Per Unit Area, Qs)

Heat content per unit area $Qs$ (0.85 mJ/cm$^2$·K)={[specific heat of silica particles (0.7 kJ/kg·K)]×[areal density of coating layer (1.05 mg/cm$^2$)]×[mass fraction of silica particles]}+{[specific heat of binder $(PVdF)$(1.4 kJ/kg·K)]×[areal density of coating layer (1.05 mg/cm$^2$)]×[mass fraction of binder]}

Mass fraction of silica particles={[volume ratio of silica particles (0.82)]×[density of silica particles (2.2 g/cm$^3$)]}/{[volume ratio of silica particles (0.82)×[density of silica particles (2.2 g/cm$^3$)]+[volume ratio of binder $(PVdF)$ (0.18)]×[density of binder $(PVdF)$(1.8 g/cm$^3$)]}

Mass fraction of binder={[volume ratio of binder $(PVdF)$(0.18)]×density of binder $(PVdF)$(1.8 g/cm$^3$)]}/{[volume ratio of silica particles (0.82)]×[density of silica particles (2.2 g/cm$^3$)]+[volume ratio of binder $(PVdF)$(0.18)]×[density of binder $(PVdF)$(1.8 g/cm$^3$)]}

(Thermal Conductivity k0)

The thermal conductivity k0 is determined by the following formula.

Thermal conductivity $k0$={[thermal conductivity of silica particles (1.4 W/m·K)]×[volume ratio (one-dimensional direction) of silica particles]+[thermal conductivity of binder $(PVdF)$(0.1 W/m·K)]×[volume ratio (one-dimensional direction) of binder]}

Volume ratio (one-dimensional direction) of silica particles=$0.82^{1/3}/(0.82^{1/3}+0.18^{1/3})$ Volume ratio (one-dimensional direction) of $PVdF$=$0.18^{1/3}/(0.82^{1/3}+0.18^{1/3})$ (Thermal Conductivity kp)

The thermal conductivity kp of the surface layer under a load thereon of 4000 N/cm$^2$ is determined by the following formula.

Thermal conductivity $kp$={[thermal conductivity of silica particles (1.4 W/m·K)]×[volume ratio (one-dimensional direction) of silica particles]}+{[thermal conductivity of binder $(PVdF)$(0.1 W/m·K)]×volume ratio (one-dimensional direction) of binder $(PVdF)$]}

Volume ratio (one-dimensional direction of silica particles="$0.82^{1/3}/\{0.82^{1/3}$+(1−[compression ratio (0.60)])×$0.18^{1/3}\}$"

Volume ratio (one-dimensional direction) of binder $(PVdF)$="(1−[compression ratio (0.60)])×$0.18^{1/3}$/{$0.82^{1/3}$+(1−[compression ratio (0.60)])×$0.18^{1/3}$}"

Incidentally, the compression ratio was measured in the same manner as in Example 1-1.

Example 6-3

The area ratio S2/S1 was controlled to 0.60, by regulating the spraying conditions in spraying water droplets to a resin solution layer formed on a separator base material. In the same manner as in Example 6-1 except for the just-mentioned point, a separator provided with the following surface layer was produced.

Surface Layer:
Thermal conductivity k0: 18.1 W/m·K
Thermal conductivity kp: 21.3 W/m·K
Heat content per unit area, Qs: 0.80 mJ/cm$^2$·K
Area ratio S2/S1: 0.60

Example 6-4

The area ratio S2/S1 was controlled to 0.60, by regulating the spraying condition in spraying water droplets to a resin solution layer formed on a separator base material. In the same manner as in Example 6-2 except for the just-mentioned point, a separator provided with the following surface layer was produced.

Surface Layer:
Thermal conductivity k0: 0.9 W/m·K
Thermal conductivity kp: 1.1 W/m·K
Heat content per unit area, Qs: 0.85 mJ/cm$^2$·K
Area ratio S2/S1: 0.60

Example 6-5

A resin solution prepared was applied to a polyolefine separator base material in an areal density of 0.70 mg/cm$^2$. In the same manner as in Example 6-1 except for the just-mentioned point, a separator provided with the following surface layer was produced.

Surface Layer:
Thermal conductivity k0: 18.1 W/m·K
Thermal conductivity kp: 23.4 W/m·K
Heat content per unit area, Qs: 0.60 mJ/cm$^2$·K
Area ratio S2/S1: 0.45

Example 6-6

A resin solution prepared was applied to a polyolefine separator base material in an areal density of 0.79 mg/cm$^2$. In the same manner as in Example 6-2 except for the just-mentioned point, a separator provided with the following surface layer was produced.
Surface Layer:
Thermal conductivity k0: 0.9 W/m·K
Thermal conductivity kp: 1.1 W/m·K
Heat content per unit area, Qs: 0.64 mJ/cm$^2$·K
Area ratio S2/S1: 0.45

Example 6-7

A resin solution prepared was applied to a polyolefine separator base material in an areal density of 0.70 mg/cm$^2$. The area ratio S2/S1 was controlled to 0.60, by regulating the spraying conditions in spraying water droplets to a resin solution layer formed on the separator base material. In the same manner as in Example 6-1 except for the just-mentioned points, a separator provided with the following surface layer was produced.
Surface Layer:
Thermal conductivity k0: 18.1 W/m·K
Thermal conductivity kp: 21.3 W/m·K
Heat content per unit area, Qs: 0.60 mJ/cm$^2$·K
Area ratio S2/S1: 0.60

Example 6-8

A resin solution prepared was applied to a polyolefine separator base material in an areal density of 0.79 mg/cm$^2$. The area ratio S2/S1 was controlled to 0.60, by regulating the spraying conditions in spraying water droplets to the resin solution layer formed on the separator base material. In the same manner as in Example 6-2 except for the just-mentioned points, a separator provided with the following surface layer was produced.
Surface Layer:
Thermal conductivity k0: 0.9 W/m·K
Thermal conductivity kp: 1.1 W/m·K
Heat content per unit area, Qs: 0.64 mJ/cm$^2$·K
Area ratio S2/S1: 0.60

Comparative Example 6-1

A resin solution prepared was applied to a polyolefine separator base material in an areal density of 0.47 mg/cm$^2$. In the same manner as in Example 6-3 except for the just-mentioned point, a separator provided with the following surface layer was produced.
Surface Layer:
Thermal conductivity k0: 18.1 W/m·K
Thermal conductivity kp: 21.3 W/m·K
Heat content per unit area, Qs: 0.40 mJ/cm$^2$·K
Area ratio S2/S1: 0.60

Comparative Example 6-2

A resin solution prepared was applied to a polyolefine separator base material in an areal density of 0.35 mg/cm$^2$. In the same manner as in Example 6-3 except for the just-mentioned point, a separator provided with the following surface layer was produced.
Surface Layer:
Thermal conductivity k0: 18.1 W/m·K
Thermal conductivity kp: 21.3 W/m·K
Heat content per unit area, Qs: 0.30 mJ/cm$^2$·K
Area ratio S2/S1: 0.60

Comparative Example 6-3

A resin solution prepared was applied to a polyolefine separator base material in an areal density of 0.12 mg/cm$^2$. In the same manner as in Example 6-3 except for the just-mentioned point, a separator provided with the following surface layer was produced.
Surface Layer:
Thermal conductivity k0: 18.1 W/m·K
Thermal conductivity kp: 21.3 W/m·K
Heat content per unit area, Qs: 0.10 mJ/cm$^2$·K
Area ratio S2/S1: 0.60

Comparative Example 6-4

The volume ratio of alumina ($Al_2O_3$) particles as inorganic particles and polyvinylidene fluoride (PVdF) as a resin material was changed to 90:10. In addition, a resin solution prepared was applied to a polyolefine separator base material in an areal density of 0.70 mg/cm$^2$. Further, the area ratio S2/S1 was controlled to 0.20, by regulating the spraying conditions in spraying water droplets to the resin solution layer formed on the separator base material. In the same manner as in Example 6-1 except for the just-mentioned points, a separator provided with the following surface layer was produced.
Surface Layer:
Thermal conductivity k0: 19.6 W/m·K
Thermal conductivity kp: 25.4 W/m·K
Heat content per unit area, Qs: 0.58 mJ/cm$^2$·K
Area ratio S2/S1: 0.20

Comparative Example 6-5

A resin solution prepared was applied to a polyolefine separator base material in an areal density of 0.70 mg/cm$^2$. In addition, the area ratio S2/S1 was controlled to 0.80, by regulating the spraying conditions in spraying water droplets to the resin solution layer formed on the separator base material. In the same manner as in Example 6-1 except for the just-mentioned points, a separator provided with the following surface layer was produced.
Surface Layer:
Thermal conductivity k0: 18.1 W/m·K
Thermal conductivity kp: 19.6 W/m·K
Heat content per unit area, Qs: 0.60 mJ/cm$^2$·K
Area ratio S2/S1: 0.80

Comparative Example 6-6

A resin solution prepared was applied to a polyolefine separator base material in an areal density of 0.70 mg/cm$^2$. Besides, the area ratio S2/S1 was controlled to 0.90, by regulating the spraying conditions in spraying water droplets to the resin solution layer formed on the separator base material. In the same manner as in Example 6-1 except for the just-mentioned points, a separator provided with the following surface layer was produced.
Surface Layer:
Thermal conductivity k0: 18.1 W/m·K
Thermal conductivity kp: 19.2 W/m·K Heat content per unit area, Qs: 0.60 mJ/cm²·K
Area ratio S2/S1: 0.90

(Evaluation)

The separators produced in Examples 6-1 to 6-8 and Comparative Examples 6-1 to 6-6 as above were put to the following crushing test.

(Crushing Test)

A crushing test was conducted to thereby evaluate the presence/absence of thermal runaway at the time of crushing. First, by using the separators obtained in Examples 6-1 to 6-8 and Comparative Examples 6-1 to 6-6, cylindrical type batteries were fabricated in the same manner as in Example 1-1. Ten cylindrical type batteries were fabricated for each of Examples and Comparative Examples. The cylindrical type batteries were subjected to 300 cycles of charging-and-discharging under the conditions of a temperature of 40° C., a charge/discharge current of 0.5 C, a discharge finish voltage of 3.0 V, and a charging finish voltage of 4.2 V. Each of the cylindrical type batteries in the charged state after the 300 charge-discharge cycles was laid down, with a side surface on the lower side. Each of the batteries was crushed down with a round rod having a circular end face with a diameter of 16 mm, oriented orthogonal to the battery, so that the widthwise size of the battery was reduced to ¼ times the original size. For each of Examples 6-1 to 6-8 and Comparative Examples 6-1 to 6-6, the ten batteries were put to this crushing test, and the number of the batteries brought to thermal runaway was counted and compared.

The results of the crushing test are set forth in Table 6 below.

surface layer did not satisfy the condition of the formula (2): $0.30 \times k0 < (S2/S1) \times kp < 0.70 \times kp$. Although the influence of this was slighter than in the case where the heat content of the surface layer was low, the number of the samples brought to thermal runaway increased when the contact surface was smaller.

In Comparative Examples 6-5 and 6-6, the area ratio S2/S1 was as high as 0.80 and 0.90, respectively; hence, $(S2/S1) \times kp > 0.70 \times kp$. In other words, the surface layers in these cases did not satisfy the formula (2): $0.30 \times k0 < (S2/S1) \times kp < 0.70 \times kp$. Due to the large contact area, therefore, the quantity of heat transferred to the base material was increased, resulting in an increase in the number of samples brought to thermal runaway. From these results, it was verified that a restraining effect on thermal runaway can be obtained when the condition of Qs>0.5 and the condition of $0.30 \times k0 < (S2/S1) \times kp < 0.70 \times kp$ are satisfied.

While the present application has been described by showing some embodiments and Examples thereof, but the present application is not restricted to the embodiments and Examples, and various modifications are possible. For instance, while the secondary batteries having a wound structure have been described in the above embodiments and Examples, the present application may be applied also to secondary batteries having a structure wherein a positive electrode and a negative electrode are folded or stacked.

Besides, while the cases where a nonaqueous electrolyte solution or a gel electrolyte is used have been described in the above embodiments and Examples, the present application is applicable also to cases where other form of nonaqueous

TABLE 6

| | Inorganic particles | Areal density of coating (mg/cm²) | *P/B (volume ratio) | Heat content Qs (mJ/cm²·K) | Thermal conductivity k0 (W/m·K) | Thermal conductivity kp (W/m·K) | Compression ratio | Area ratio S2/S1 | 0.30 × k0 | (S2/S1) × kp | 0.70 × kp | Result of crushing test |
|---|---|---|---|---|---|---|---|---|---|---|---|---|
| Example 6-1 | Al₂O₃ | 0.94 | 82/18 | 0.80 | 18.1 | 23.4 | 0.60 | 0.45 | 5.43 | 10.53 | 16.38 | 0/10 |
| Example 6-2 | SiO₂ | 1.05 | 82/18 | 0.85 | 0.9 | 1.1 | 0.60 | 0.45 | 0.27 | 0.50 | 0.77 | 0/10 |
| Example 6-3 | Al₂O₃ | 0.94 | 82/18 | 0.80 | 18.1 | 21.3 | 0.40 | 0.60 | 5.43 | 12.78 | 14.91 | 0/10 |
| Example 6-4 | SiO₂ | 1.05 | 82/18 | 0.85 | 0.9 | 1.1 | 0.40 | 0.60 | 0.27 | 0.66 | 0.77 | 0/10 |
| Example 6-5 | Al₂O₃ | 0.70 | 82/18 | 0.60 | 18.1 | 23.4 | 0.60 | 0.45 | 5.43 | 10.53 | 16.38 | 0/10 |
| Example 6-6 | SiO₂ | 0.79 | 82/18 | 0.64 | 0.9 | 1.1 | 0.60 | 0.45 | 0.27 | 0.50 | 0.77 | 0/10 |
| Example 6-7 | Al₂O₃ | 0.70 | 82/18 | 0.60 | 18.1 | 21.3 | 0.40 | 0.60 | 5.43 | 12.78 | 14.91 | 0/10 |
| Example 6-8 | SiO₂ | 0.79 | 82/18 | 0.64 | 0.9 | 1.1 | 0.40 | 0.60 | 0.27 | 0.66 | 0.77 | 0/10 |
| Comparative Example 6-1 | Al₂O₃ | 0.47 | 82/18 | 0.40 | 18.1 | 21.3 | 0.40 | 0.60 | 5.43 | 12.78 | 14.91 | 0/10 |
| Comparative Example 6-2 | Al₂O₃ | 0.35 | 82/18 | 0.30 | 18.1 | 21.3 | 0.40 | 0.60 | 5.43 | 12.78 | 14.91 | 2/10 |
| Comparative Example 6-3 | Al₂O₃ | 0.12 | 82/18 | 0.10 | 18.1 | 21.3 | 0.40 | 0.60 | 5.43 | 12.78 | 14.91 | 4/10 |
| Comparative Example 6-4 | Al₂O₃ | 0.70 | 90/10 | 0.58 | 19.6 | 25.4 | 0.70 | 0.20 | 5.88 | 5.08 | 17.78 | 1/10 |
| Comparative Example 6-5 | Al₂O₃ | 0.70 | 82/18 | 0.60 | 18.1 | 19.6 | 0.20 | 0.80 | 5.43 | 15.68 | 13.72 | 1/10 |
| Comparative Example 6-6 | Al₂O₃ | 0.70 | 82/18 | 0.60 | 18.1 | 19.2 | 0.15 | 0.90 | 5.43 | 17.28 | 13.44 | 2/10 |

*P/B = (inorganic particles)/(binder)

As seen from Table 6, the following was confirmed. In Examples 6-1 to 6-8, the heat content per unit area, Qs, was in the range of Qs>0.5, and the condition of $0.30 \times k0 < (S2/S1) \times kp < 0.70 \times kp$ was satisfied. As a result, no sample showed thermal runaway. On the other hand, in Comparative Examples 6-1 to 6-3, the heat content per unit area, Qs, was in the range of Qs≤0.5, so that the heat generated by the electrode could not be absorbed, and, as a result, some samples showed thermal runaway.

In Comparative Example 6-4, the area ratio S2/S1 was as low as 0.20; hence, $0.30 \times k0 > (S2/S1) \times kp$. In other words, the electrolyte is used. Examples of the other form of nonaqueous electrolyte include a totally solid-state electrolyte that does not contain a nonaqueous electrolyte solution. Furthermore, in the third to seventh embodiments, the separator according to the second embodiment may be used in place of the separator according to the first embodiment.

Embodiments of the present application can take the following configurations.

According to an embodiment, a separator is provided. The separator includes a base layer and a surface layer, wherein the surface layer is on at least one side of the base layer, and wherein the surface layer is structured so as to collapse at time of charging to prevent damage to a negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the porous structure has a porosity that ranges from 60% to 90%.

In an embodiment, the surface layer has a three-dimensional structure.

In an embodiment, the surface layer has a surface roughness that ranges from 1 micron to 4 microns.

In an embodiment, the surface layer has a compression ratio (B/A) not less than 0.4, where A is a thickness of the surface layer under a load of 3.57 N/cm$^2$, and where B is a collapse amount of the surface layer under a load of 4000 N/cm$^2$.

In an embodiment, the surface layer includes at least one projection on at least a portion of the surface layer.

In an embodiment, the at least one projection ranges in size from 1 micron to 100 microns.

In another embodiment, a battery is provided. The battery including a separator and a negative electrode, wherein the separator includes a base layer and a surface layer, wherein the surface layer is on at least one side of the base layer, and wherein the surface layer is structured so as to collapse at time of charging to prevent damage to the negative electrode due to expansion thereof.

In an embodiment, a positive electrode is further provided, wherein at least one of the positive electrode and the negative electrode faces the separator.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

In further embodiments, an electric device, an electrical vehicle, and an electrical storage device including the battery are provided.

In yet another embodiment, a method of manufacturing a separator is provided. The method includes forming a base layer and a surface layer, wherein the surface layer is on at least one side of the base layer, and wherein the surface layer is structured so as to collapse at time of charging to prevent damage to a negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

In yet another embodiment, a method of manufacturing a battery is provided. The method includes forming a negative electrode and a separator, the separator including a base layer and a surface layer, wherein the surface layer is on at least one side of the base layer, and wherein the surface layer is structured so as to collapse at time of charging to prevent damage to the negative electrode due to expansion thereof.

In an embodiment, the surface layer has a porous structure that contains a resin material and an inorganic particle dispersed within the resin material.

In an embodiment, the porous structure is on at least a portion of the surface layer.

In an embodiment, the surface layer includes at least one projection on at least a portion of the surface layer.

In an embodiment, the at least one projection ranges in size from 1 micron to 100 microns.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A separator comprising:
   a base layer; and
   a surface layer having a porous structure that contains a resin material and inorganic particles dispersed within the resin material, wherein the surface layer is on at least one side of the base layer, wherein the surface layer has a nonuniform thickness due to the inorganic particles forming a surface roughness that ranges from 1 micron to 4 microns, and wherein a ratio T/D is greater than or equal to 5, where T represents a thickness of the surface layer under a compressive load, and D represents a mean particle diameter of the inorganic particles.

2. The separator of claim 1, wherein the porous structure is on at least a portion of the surface layer.

3. The separator of claim 1, wherein the porous structure has a porosity that ranges from 60% to 90%.

4. The separator of claim 1, wherein the surface layer has a three-dimensional structure.

5. The separator of claim 1, wherein the surface layer has a compression ratio (B/A) not less than 0.4, where A is a thickness of the surface layer under a load of 3.57 N/cm$^2$, and where B is a collapse amount of the surface layer under a load of 4000 N/cm$^2$.

6. The separator of claim 1, wherein the surface layer includes at least one projection on at least a portion of the surface layer.

7. The separator of claim 6, wherein the at least one projection ranges in size from 1 micron to 100 microns.

8. The separator of claim 1, wherein the surface layer comprises a plurality of voids between the inorganic particles.

9. The separator of claim 1, wherein a pitch of projections or recesses in the surface layer is 1 μm or more and 1.0 mm or less.

10. The separator of claim 1, wherein the surface layer comprises at least one pattern of pyramids, ridges, and craters.

11. A battery comprising:
    a separator; and
    a negative electrode, wherein the separator includes a base layer, and a surface layer having a porous structure that contains a resin material and inorganic particles dispersed within the resin material, wherein the surface layer is on at least one side of the base layer, wherein the surface layer has a nonuniform thickness due to the inorganic particles forming a surface roughness that ranges from 1 micron to 4 microns, and wherein a ratio T/D is greater than or equal to 5, where T represents a thickness of the surface layer under a compressive load, and D represents a mean particle diameter of the inorganic particles.

12. The battery of claim 11, further comprising a positive electrode, wherein at least one of the positive electrode and the negative electrode faces the separator.

13. The battery of claim 11, wherein the porous structure is on at least a portion of the surface layer.

14. The battery of claim 11, wherein the surface layer includes at least one projection on at least a portion of the surface layer.

15. The battery of claim 14, wherein the at least one projection ranges in size from 1 micron to 100 microns.

16. The battery of claim 12, comprising a wound electrode body in which the positive electrode and the negative electrode are stacked and are wound, wherein the separator is provided between the positive electrode and the negative electrode.

17. The battery of claim 11, wherein the surface layer comprises at least one pattern of pyramids, ridges, and craters.

18. An electric device comprising the battery of claim 11.

19. An electric vehicle comprising the battery of claim 11.

20. An electrical storage device comprising the battery of claim 11.

* * * * *